(12) United States Patent
Swanson et al.

(10) Patent No.: US 12,493,494 B2
(45) Date of Patent: Dec. 9, 2025

(54) BUILDING MANAGEMENT SYSTEMS WITH SUSTAINABILITY IMPROVEMENT ARCHITECTURES

(71) Applicant: Tyco Fire & Security GmbH, Neuhausen am Rheinfall (CH)

(72) Inventors: Trent M. Swanson, Wellington, FL (US); Miguel Galvez, Westford, MA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/900,098

(22) Filed: Sep. 27, 2024

(65) Prior Publication Data

US 2025/0110789 A1    Apr. 3, 2025

Related U.S. Application Data

(60) Provisional application No. 63/541,743, filed on Sep. 29, 2023, provisional application No. 63/541,746, (Continued)

(51) Int. Cl.
*G06F 9/50* (2006.01)
*G05B 23/02* (2006.01)
(Continued)

(52) U.S. Cl.
CPC ......... *G06F 9/5027* (2013.01); *G05B 23/024* (2013.01); *G05B 23/027* (2013.01);
(Continued)

(58) Field of Classification Search
None
See application file for complete search history.

(56) References Cited

U.S. PATENT DOCUMENTS 7,877,751 B2 *  1/2011  Maeda ................. G06F 9/4893
                                                  713/300
10,908,627 B2 *  2/2021  Uzmezler ........... H04L 12/2825
(Continued)

FOREIGN PATENT DOCUMENTS

DE    11 2021 004 364 T5    6/2023
DE    10 2024 103 805 A1    8/2024
(Continued)

OTHER PUBLICATIONS

Chen et al.; "Green-Aware Workload Scheduling in Geographically Distributed Data Centers"; 2012 IEEE 4th International Conference on Cloud Computing Technology and Science; (Chen_2012.pdf, pp. 82-89) (Year: 2012).*
(Continued)

*Primary Examiner* — Hiren P Patel
(74) *Attorney, Agent, or Firm* — Foley & Lardner LLP

(57) ABSTRACT

A method for processing compute activities of a building management system of a building, the method including receiving, by one or more processors, a selection from a user of a sustainability tuning level from among a plurality of sustainability tuning levels, the plurality of sustainability tuning levels representing different levels of weighting to be placed on mitigating a sustainability impact of computing workloads balanced against one or more other factors, receiving, by one or more processors, a computing workload to be processed by the building system, determining, by the one or more processors, an execution plan for processing the computing workload based at least in part on the selected sustainability tuning level, and causing, by the one or more processors, the computing workload to be processed in accordance with the execution plan.

19 Claims, 25 Drawing Sheets

Related U.S. Application Data filed on Sep. 29, 2023, provisional application No. 63/541,748, filed on Sep. 29, 2023.

(51) Int. Cl.
  *G06F 3/04847* (2022.01)
  *G06F 11/3604* (2025.01)

(52) U.S. Cl.
  CPC ...... *G06F 3/04847* (2013.01); *G06F 11/3612* (2013.01); *G06F 2209/501* (2013.01)

(56) References Cited

U.S. PATENT DOCUMENTS

| | | | |
|---|---|---|---|
| 11,269,756 B1 | 3/2022 | Hristu et al. | |
| 11,598,544 B1* | 3/2023 | Schubert | G05D 23/1917 |
| 11,875,191 B1* | 1/2024 | Plenderleith | H04W 64/003 |
| 12,190,172 B2* | 1/2025 | Wong | G06Q 30/018 |
| 2005/0278338 A1 | 12/2005 | Todorova et al. | |
| 2010/0107171 A1* | 4/2010 | Amsterdam | G06Q 10/06 423/210 |
| 2011/0040417 A1* | 2/2011 | Wolfe | G06Q 10/0631 700/291 |
| 2011/0246987 A1* | 10/2011 | Diwakar | G06F 9/5094 718/1 |
| 2013/0174128 A1 | 7/2013 | Kansal et al. | |
| 2015/0066225 A1 | 3/2015 | Chen et al. | |
| 2020/0082289 A1* | 3/2020 | Swierc | H02J 3/14 |
| 2020/0241482 A1 | 7/2020 | Sinha et al. | |
| 2020/0348038 A1* | 11/2020 | Risbeck | F24F 11/47 |
| 2020/0348739 A1 | 11/2020 | Guo | |
| 2021/0088984 A1 | 3/2021 | Sinha et al. | |
| 2021/0191343 A1 | 6/2021 | Lee et al. | |
| 2021/0191348 A1 | 6/2021 | Lee et al. | |
| 2021/0200807 A1 | 7/2021 | Ploegert et al. | |
| 2021/0373973 A1 | 12/2021 | Ekins et al. | |
| 2022/0026864 A1 | 1/2022 | Murugesan et al. | |
| 2022/0058545 A1 | 2/2022 | Warake et al. | |
| 2022/0058556 A1 | 2/2022 | Warake et al. | |
| 2022/0067851 A1 | 3/2022 | Sinha et al. | |
| 2023/0017632 A1* | 1/2023 | Herb | G06F 9/505 |
| 2023/0055415 A1* | 2/2023 | Desaulniers | G06F 18/2113 |
| 2023/0085641 A1 | 3/2023 | Jones et al. | |
| 2023/0110033 A1 | 4/2023 | Schubert et al. | |
| 2023/0111459 A1 | 4/2023 | Schubert et al. | |
| 2023/0114427 A1 | 4/2023 | Schubert et al. | |
| 2023/0115095 A1 | 4/2023 | Schubert et al. | |
| 2023/0138727 A1* | 5/2023 | Wong | G06Q 10/06375 705/7.37 |
| 2023/0169220 A1 | 6/2023 | Ramanasankaran et al. | |
| 2023/0185983 A1 | 6/2023 | Ramanasankaran et al. | |
| 2023/0204241 A1 | 6/2023 | Schubert et al. | |
| 2023/0213909 A1 | 7/2023 | Galvez et al. | |
| 2024/0004361 A1* | 1/2024 | Morris | G05B 15/02 |
| 2024/0036537 A1 | 2/2024 | Gupta et al. | |
| 2024/0077841 A1 | 3/2024 | Sinha et al. | |
| 2024/0093883 A1 | 3/2024 | Fread et al. | |
| 2024/0126227 A1 | 4/2024 | Kammela et al. | |
| 2024/0134643 A1* | 4/2024 | Antinori | G06Q 30/018 |
| 2024/0201675 A1* | 6/2024 | Copperthite | G05B 19/41885 |
| 2024/0232773 A9 | 7/2024 | Warake et al. | |
| 2024/0256339 A1* | 8/2024 | Morrison | G06F 9/5027 |
| 2024/0272926 A1 | 8/2024 | Lu et al. | |
| 2024/0295336 A1 | 9/2024 | Warake et al. | |
| 2024/0311733 A1* | 9/2024 | Ibanez | G06Q 50/06 |
| 2024/0403766 A1* | 12/2024 | Menon | G06Q 10/06375 |
| 2024/0403893 A1* | 12/2024 | Menon | G06Q 10/06375 |
| 2024/0403894 A1* | 12/2024 | Menon | G06Q 10/0637 |

FOREIGN PATENT DOCUMENTS

| | | |
|---|---|---|
| WO | WO-2020/159471 A1 | 8/2020 |
| WO | WO-2022/040217 A1 | 2/2022 |

OTHER PUBLICATIONS

Wang et al.; "Sustainability-aware Resource Provisioning in Data Centers"; 2020 IEEE 6th International Conference on CIC; DOI: 10.1109/CIC50333.2020.00018; (Wang_2020.pdf; pp. 60-69) (Year: 2020).*

International Search Report and Written Opinion on PCT Appl. No. PCT/US2024/049054 dated Feb. 24, 2025 (34 pages).

Roukh et al., "Eco-Physic: Eco-Physical design initiative for very large databases," Information Systems, 2017, vol. 68 (pp. 44-63).

* cited by examiner

BUILDING MANAGEMENT SYSTEMS WITH SUSTAINABILITY IMPROVEMENT ARCHITECTURES

CROSS-REFERENCE TO RELATED APPLICATIONS

This application claims priority to and the benefit of U.S. Provisional Patent Application Nos. 63/541,743, 63/541,748, and 63/541,746, each filed Sep. 29, 2023, and each of which is incorporated herein by reference in its entirety.

BACKGROUND

This application relates generally to building devices and systems. According to various example implementations, this application relates more particular to systems and methods for managing computing workloads in buildings, monitoring and improving machine learning model performance in buildings, improving sustainability of buildings, testing building device software, and detecting and configuring building devices, such as sensors.

SUMMARY

At least one aspect relates to a method for processing compute activities of a building management system. The building management system can include multiple on-premises building devices, the multiple on-premises building devices include a first on-premises building device and a second on-premises building device. The method can include receiving, by one or more processors, a computing workload to be processed by the building system. The method can include determining, by the one or more processors using one or more workload characteristics of the computing workload and one or more device characteristics of the first on-premises building device and/or the second on-premises building device, one or more of the first on-premises building device or the second on-premises building device to process the computing workload. The method can include causing, by the one or more processors, the computing workload to be processed by the determined one or more of the first on-premises building device or the second on-premises building device.

In some implementations, the one or more processors are part of a third on-premises building device separate from the first on-premises building device and the second on-premises building device. In some implementations, determining one or more of the first on-premises building device or the second on-premises building device to process the computing workload includes assigning, by the third on-premises building device, the computing workload to the one or more of the first on-premises building device or the second on-premises building device. In some implementations, the one or more processors are part of an off-premises building device, and determining one or more of the first on-premises building device or the second on-premises building device to process the computing workload includes assigning, by the off-premises building device, the computing workload to the one or more of the first on-premises building device or the second on-premises building device. In some implementations, the one or more processors are part of the first on-premises building device, and determining one or more of the first on-premises building device or the second on-premises building device to process the computing workload includes assigning, by the first on-premises building device, at least a portion of the computing workload to the second on-premises building device.

In some implementations, the workload characteristics include an amount of computing resources required to process the computing workload and the device characteristics include an amount of available computing resources of the first building device. In some implementations, determining one or more of the first on-premises building device or the second on-premises building device to process the computing workload includes: analyzing the amount of computing resources required and the available computing resources of the first building device, and, based on the analysis, assigning the at least a portion of the computing workload to the second on-premises building device. In some implementations, assigning the at least a portion of the computing workload to the second on-premises building device includes assigning the entire computing workload to the second on-premises building device. In some implementations, analyzing the amount of computing resources required and the available computing resources of the first building device includes determining the amount of computing resources required exceeds the available computing resources of the first building device or determining the amount of computing resources required exceeds a threshold amount of the available computing resources of the first building device. In some implementations, the first on-premises building device and the second on-premises building device include edge building devices.

At least one aspect relates to a method for processing compute activities of a building management system. The building management system can include a first on-premises building device. The method can include receiving, by one or more processors, a computing workload to be processed by the building system. The method can include determining, by the one or more processors using one or more workload characteristics of the computing workload, one or more of the first on-premises building device or an off-premises system to process the computing workload. The method can include causing, by the one or more processors, the computing workload to be processed by the determined one or more of the first on-premises building device or the off-premises system.

In some implementations, the off-premises system is a first off-premises system and the one or more processors are part of the first off-premises system, a second off-premises system, or a second on-premises building device. In some implementations, determining one or more of the first on-premises building device or the off-premises system to process the computing workload includes assigning, by the first off-premises system, the second off-premises system, or the second on-premises building device, the computing workload to the one or more of the first on-premises building device or the off-premises system.

In some implementations, the one or more processors are part of the first on-premises building device, and determining one or more of the first on-premises building device or the off-premises system to process the computing workload includes assigning, by the first on-premises building device, at least a portion of the computing workload to the off-premises system. In some implementations, the workload characteristics include an amount of computing resources required to process the computing workload. In some implementations, determining one or more of the first on-premises building device or the off-premises system to process the computing workload includes: analyzing the amount of computing resources required and an amount of available computing resources of the first building device, and based on the analysis, assigning the at least a portion of the computing workload to the off-premises system.

In some implementations, assigning the at least a portion of the computing workload to the off-premises system includes assigning the entire computing workload to the off-premises system. In some implementations, analyzing the amount of computing resources required and the available computing resources of the first building device includes determining the amount of computing resources required exceeds the available computing resources of the first building device or determining the amount of computing resources required exceeds a threshold amount of the available computing resources of the first building device.

In some implementations, the one or more workload characteristics include a latency characteristic for the computing workload. In some implementations, determining the one or more of the first on-premises building device or the off-premises system to process the computing workload includes determining whether to process the computing workload on the first on-premises building device, the off-premises system, or both using the latency characteristic. In some implementations, the latency characteristic includes at least one of a maximum latency or a target latency.

In some implementations, the one or more workload characteristics includes a timeframe for completing processing of the computing workload. In some implementations, determining the one or more of the first on-premises building device or the off-premises system to process the computing workload includes determining whether to process the computing workload on the first on-premises building device, the off-premises system, or both using the timeframe for completing processing of the computing workload. In some implementations, the computing workload includes a set of recurring processing tasks, the one or more workload characteristics includes at least one of a frequency or a time at which the recurring processing tasks are to be executed. In some implementations, determining the one or more of the first on-premises building device or the off-premises system to process the computing workload includes determining whether to process the computing workload on the first on-premises building device, the off-premises system, or both using the at least one of the frequency or the time at which the recurring processing tasks are to be executed.

At least one aspect relates to a method for enhancing performance of a machine learning model executing on an edge building device of a building. The method can include executing, by one or more processors of the edge building device, the machine learning model. The method can include generating, by the one or more processors of the edge building device, an assessment of the performance of the machine learning model on the edge building device. The method can include responsive to the assessment indicating the performance of the machine learning model is below a first level, retraining, by the one or more processors of the edge building device, the machine learning model at the edge building device. The method can include, responsive to the assessment indicating the performance of the machine learning model is below a first level, causing, by the one or more processors of the edge building device, a device other than the edge building device to retrain the machine learning model.

In some implementations, generating the assessment of the performance of the machine learning model includes generating a score indicating the performance of the machine learning model. In some implementations, the assessment indicates the performance of the machine learning model is below the first level responsive to the score being below a threshold level. In some implementations, the method further includes receiving operational data of the building generated by at least one of the edge building device or one or more other building devices, wherein the machine learning model is retrained using the operational data of the building. In some implementations, the method further includes executing the machine learning model includes initially executing the machine learning model without the machine learning model having been trained on data specific to the building or an entity associated with the building.

In some implementations, the method further includes retraining the machine learning model at the edge device using the operational data. In some implementations, the method further includes causing a cloud computing system or other off-premises computing system to retrain the machine learning model. In some embodiments, the method further includes selecting the machine learning model for executing by the edge building device from among a plurality of machine learning models based on at least one of design data or operational data for the building. In some embodiments, generating the assessment of the performance of the machine learning model includes monitoring the performance of the machine learning model over a timeframe, wherein the machine learning model is retrained and/or caused to be retrained responsive to detecting that the performance of the machine learning model has degraded below the first level.

At least one aspect relates to a method for enhancing performance of a machine learning model for a building. The method can include executing, by one or more processors, the machine learning model. The method can include generating an assessment of the performance of the machine learning model. The method can include responsive to the assessment indicating the performance of the machine learning model is below a first level, generating an alert to an analyst to review the performance of the machine learning model.

In some implementations, generating the alert to the analyst includes generating a request to the analyst to validate whether the performance of the machine learning model is attributable to the machine learning model itself or an external factor. In some implementations, the method further includes receiving a response that the analyst has reviewed the performance of the machine learning model, the response indicating whether the analyst has determined the performance to be attributable to the machine learning model itself, the external factor, or both. In some implementations, the method further includes retraining the model using the response. In some implementations, the method further includes generating a dashboard for presentation to the analyst, the dashboard including an indication of at least one of an output of the machine learning model and input data utilized by the machine learning model. In some implementations, the dashboard further includes an indication of a predicted problem causing the performance of the machine learning model to be below the first level. In some implementations, the machine learning model is executed on an edge building device.

At least one aspect relates to a method for enhancing performance of a machine learning model for a building. The method can include executing, by one or more processors, the machine learning model. The method can include generating an assessment of the performance of the machine learning model. The method can include responsive to the assessment indicating the performance of the machine learning model is below a first level, generating a request to one or more occupants of the building to provide feedback relating to the machine learning model. The method can include receiving the feedback from the one or more occupants. The method can include validating the performance of the machine learning model using the feedback.

In some implementations, validating the performance of the machine learning model includes validating whether the performance of the machine learning model is attributable to the machine learning model itself or an external factor using the feedback from the one or more occupants. In some implementations, the method further includes retraining the model using the feedback from the one or more occupants. In some implementations, the machine learning model is executed on an edge building device.

At least one aspect relates to a method for processing compute activities of a building management system. The building management system can include multiple on-premises building devices. The method can include aggregating, by one or more processors, computing resources of the plurality of on-premises building devices into a pool of available resources. The method can include receiving, by the one or more processors, a computing workload to be processed. The method can include assigning, by the one or more processors using one or more workload characteristics of the computing workload, one or more of the plurality of on-premises building devices to process the computing workload by assigning the computing resources of the one or more of the plurality of on-premises building devices from among the pool of available resources.

In some implementations, assigning the one or more on-premises building devices to process the computing workload includes assigning the computing resources of the one or more on-premises building devices from among the pool of available resources without considering a type of device of the assigned one or more on-premises building devices. In some implementations, the plurality of on-premises building devices include edge building devices.

At least one aspect relates to a method for processing compute activities for a first building associated with a first entity. The method can include receiving, by one or more processors, a computing workload to be processed for the first entity. The method can include determining, by the one or more processors using one or more workload characteristics of the computing workload, whether to process the computing workload using one or more first on-premises building devices of the first building or using computing resources of a second entity different than the first entity. The method can include responsive to determining the process the computing working using computing resources of the second entity, causing, by the one or more processors, the computing resources of the second entity to process the computing workload.

In some implementations, causing the computing resources of the second entity to process the computing workload includes transmitting, by the one or more processors, a request to a system of the second entity to process the computing workload. In some implementations, the second entity is associated with a second building. In some implementations, determining to process the computing workload includes determining to process the computing workload using one or more second on-premises building devices of the second building. In some implementations, the one or more first on-premises building devices and the one or more second on-premises building devices include edge building devices. In some implementations, the method further includes receiving a second computing workload to be processed for the second entity and causing the second computing workload to be processed using at least one of the one or more first on-premises building devices of the first building associated with the first entity.

In some implementations, the workload characteristics of the computing workload include an amount of computing resources to process the computing workload. In some implementations, determining whether to process the computing workload using the one or more first on-premises building devices of the first building or using the computing resources of a second entity different than the first entity includes determining, by the one or more processors, whether to process the computing workload using the one or more first on-premises building devices or using the computing resources of a second entity based on the amount of computing resources to process the computing workload and an amount of available computing resources for the one or more first on-premises building devices and the computing resources of the second entity. In some implementations, determining whether to process the computing workload using the one or more first on-premises building devices of the first building or using the computing resources of a second entity different than the first entity includes determining, by the one or more processors, whether to process the computing workload using the one or more first on-premises building devices or using the computing resources of a second entity based on a first sustainability impact of processing the computing workload using the one or more first on-premises building devices and a second sustainability impact of processing the computing workload using the computing resources of a second entity.

In some implementations, determining whether to process the computing workload using the one or more first on-premises building devices or using the computing resources of a second entity based on a first sustainability impact of processing the computing workload using the one or more first on-premises building devices and a second sustainability impact of processing the computing workload using the computing resources of a second entity includes selecting a first allocation of the computing workload between the one or more first on-premises building devices, the computing resources of the second entity, or a combination thereof that is predicted to result in reduced carbon emissions as compared to a second allocation of the computing workload between the one or more first on-premises building devices, the computing resources of the second entity, or a combination thereof.

In some implementations, determining whether to process the computing workload using the one or more first on-premises building devices of the first building or using the computing resources of a second entity different than the first entity includes determining, by the one or more processors, whether to process the computing workload using the one or more first on-premises building devices or using the computing resources of a second entity based on a first sustainability impact of processing the computing workload using the one or more first on-premises building devices and a second sustainability impact of processing the computing workload using the computing resources of a second entity.

At least one aspect relates to a method for processing compute activities of a building management system of a building. The method can include receiving, by one or more processors, a computing workload to be processed by the building system. The method can include partitioning, by the one or more processors, the computing workload into a plurality of logical processing blocks, the plurality of logical processing blocks including a first logical processing block and a second logical processing block. The method can include determining, by the one or more processors, a plurality of devices to process the plurality of logical processing blocks, the plurality of devices including a first device and a second device, wherein determining the plurality of devices to process the logical processing blocks includes assigning the first logical processing block to the first device and assigning the second logical processing block to the second device. The method can include determining, by the one or more processors, a plurality of devices to process the plurality of logical processing blocks, the plurality of devices including a first device and a second device, wherein determining the plurality of devices to process the logical processing blocks includes assigning the first logical processing block to the first device and assigning the second logical processing block to the second device. The method can include causing, by the one or more processors, the computing workload to be processed by the determined plurality of devices. The method can further include causing, by the one or more processors, the computing workload to be processed by the determined plurality of devices.

In some implementations, the first device and the second device are on-premises building devices of the building. In some implementations, the first device is an on-premises building device of the building and the second device is an off-premises computing system. In some implementations, the building is a first building associated with a first entity, and wherein the first device is an on-premises building device of the first building and the second device is an on-premises building device of a second building. In some implementations, the second building is associated with a second entity different than the first entity. In some implementations, the second building is associated with the first entity. In some implementations, the plurality of devices to process the logical processing blocks are determined based on a sustainability impact of processing the logical processing blocks at different combinations of the plurality of devices. In some implementations, determining the plurality of devices to process the logical processing blocks based on the sustainability impact includes selecting a first allocation of the computing workload between the plurality of devices that is predicted to result in reduced carbon emissions as compared to a second allocation of the computing workload between the plurality of devices.

At least one aspect relates to a method for processing compute activities of a building management system of a building. The method can include receiving, by one or more processors, a computing workload to be processed by the building system. The method can include receiving, by one or more processors, a computing workload to be processed by the building system. The method can include partitioning, by the one or more processors, the computing workload into a plurality of logical processing blocks, the plurality of logical processing blocks including a first logical processing block and a second logical processing block. The method can include determining, by the one or more processors, a plurality of times for one or more devices to process the plurality of logical processing blocks, wherein determining plurality of times includes assigning the first logical processing block to be processed at a first time and assigning the second logical processing block to be processed at a second time different than the first time. The method can include causing, by the one or more processors, the computing workload to be processed by the one or more devices at the determined plurality of times.

In some implementations, determining the plurality of times for the one or more devices to process the plurality of logical processing blocks includes assigning the first logical processing block to be processed at the first time by a first device of the one or more devices and assigning the second logical processing block to be processed at the second time by a second device of the one or more devices. In some implementations, the first device and the second device are on-premises building devices of the building. In some implementations, the first device is an on-premises building device of the building and the second device is an off-premises computing system. In some implementations, the building is a first building associated with a first entity, and wherein the first device is an on-premises building device of the first building and the second device is an on-premises building device of a second building.

In some implementations, the second building is associated with a second entity different than the first entity. In some implementations, the second building is associated with the first entity. In some implementations, the plurality of times to process the logical processing blocks are determined based on a sustainability impact of processing the logical processing blocks at different times. In some implementations, determining the plurality of times to process the logical processing blocks based on the sustainability impact includes selecting a first allocation of the computing workload between the plurality of times that is predicted to result in reduced carbon emissions as compared to a second allocation of the computing workload between the plurality of times. In some implementations, a completion timeframe requirement of the first logical block is longer than a completion timeframe requirement of the second logical block, and wherein the first time is later than the second time. In some implementations, the first time is an off-peak time of reduced computing load on the one or more devices as compared to the second time. In some implementations, the first time is earlier than the second time, and wherein the first logical processing block includes generating an initial output using a less computationally intensive algorithm and the second logical processing block includes generating a final output using a more computationally intensive algorithm.

At least one other aspect relates to other systems, methods, apparatus, and/or computer-readable storage media including one or more aspects of the present disclosure as discussed above.

At least one aspect relates to a method for processing compute activities of a building management system of a building. The method can include receiving, by one or more processors, a computing workload to be processed by the building system. The method can include determining, by the one or more processors, a time for processing the computing workload based at least in part on a sustainability impact of processing the computing workload. The method can include causing, by the one or more processors, the computing workload to be processed at the determined time.

In some implementations, the method can further include partitioning, by the one or more processors, the computing workload into a plurality of logical processing blocks, the plurality of logical processing blocks including a first logical processing block and a second logical processing block, wherein determining a time for processing the computing workload includes determining a first time for processing the first logical processing block and a second time for processing the second logical processing block based at least in part on the sustainability impact of processing the first logical processing block and the second logical processing block.

In some implementations, determining the first time for processing the first logical processing block and the second time for processing the second logical processing block based at least in part on the sustainability impact includes assigning the first logical processing block to be processed at the first time by a first device and assigning the second logical processing block to be processed at the second time by a second device. In some implementations, the first device and the second device are on-premises building devices of the building. In some implementations, the first device is an on-premises building device of the building and the second device is an off-premises computing system. In some implementations, the building is a first building associated with a first entity, and wherein the first device is an on-premises building device of the first building and the second device is an on-premises building device of a second building.

In some implementations, the second building is associated with a second entity different than the first entity. In some implementations, the second building is associated with the first entity. In some implementations, determining the time to process the computing workload based at least in part on the sustainability impact includes selecting a first time from among a plurality of times that is predicted to result in reduced carbon emissions as compared to a second time of the plurality of times. In some implementations, determining the time to process the computing workload includes delaying processing of the computing workload to a later time at which processing of the computing workload is predicted to result in a reduced carbon emissions as compared to processing the computing workload at a time the computing workload was received.

In some implementations, determining the time to process the computing workload based at least in part on the sustainability impact includes determining environmental conditions affecting the sustainability impact of processing the computing workload at a plurality of times and selecting a first time from among the plurality of times responsive to predicting processing the computing workload at the first time will result in reduced carbon emissions as compared to processing the computing workload at a second time of the plurality of times based on the environmental conditions at the first time and the second time. In some implementations, the environmental conditions includes at least one of a temperature or a humidity of a geographic area of the building. In some implementations, the first time is selected responsive to predicting that processing the computing workload at the first time will require less active cooling or heating of one or more devices processing the computing workload than the second time.

At least one aspect relates to a method for processing compute activities of a building management system of a building. The method can include receiving, by one or more processors, a computing workload to be processed by the building system. The method can include determining, by the one or more processors, one or more devices from among a plurality of devices for processing the computing workload based at least in part on a sustainability impact of processing the computing workload. The method can include causing, by the one or more processors, the computing workload to be processed by the determined one or more devices.

In some implementations, partitioning, by the one or more processors, the computing workload into a plurality of logical processing blocks, the plurality of logical processing blocks including a first logical processing block and a second logical processing block, wherein determining the one or more devices for processing the computing workload includes determining a first device of the plurality of devices for processing the first logical processing block and a second device of the plurality of devices for processing the second logical processing block based at least in part on the sustainability impact of processing the first logical processing block and the second logical processing block In some implementations, determining the one or more devices for processing the computing workload includes determining whether to assign the computing workload to a first device of the plurality of devices or a second device of the plurality of devices based at least in part on the sustainability impact of processing the computing workload using the first device and the second device. In some implementations, the first device and the second device are on-premises building devices of the building. In some implementations, the first device is an on-premises building device of the building and the second device is an off-premises computing system. In some implementations, the building is a first building associated with a first entity, and wherein the first device is an on-premises building device of the first building and the second device is an on-premises building device of a second building. In some implementations, the second building is associated with a second entity different than the first entity. In some implementations, the second building is associated with the first entity.

In some implementations, determining the one or more devices for processing the computing workload includes assigning a first portion of the computing workload to the first device and assigning a second portion of the computing workload to the second device based at least in part on the sustainability impact of processing the computing workload using the first device and the second device. In some implementations, determining the one or more devices for processing the computing workload includes selecting a first set of one or more of the devices to process the computing workload that is predicted to result in reduced carbon emissions as compared to processing the workload with a second set of one or more of the devices. In some implementations, the one or more devices includes a first device in a first location and a second device in a second location. In some implementations, determining the one or more devices for processing the computing workload includes determining environmental conditions at the first location and the second location affecting the sustainability impact of processing the computing workload and selecting the first device to process the computing workload responsive to predicting processing the computing workload using the first device will result in reduced carbon emissions as compared to processing the computing workload using the second device based on the environmental conditions at the first location and the second location.

In some implementations, the environmental conditions includes at least one of a temperature or a humidity. In some implementations, the first device is selected responsive to predicting that processing the computing workload at the first device will require less active cooling or heating of device as compared to processing the computing workload than the second device. In some implementations, the one or more devices for processing the computing workload are determined further based on a computing performance impact of processing the computing workload at different devices or combinations of devices of the one or more devices. In some implementations, the computing performance impacts includes at least one of a latency, an accuracy, a completeness, or a bandwidth impact of performing the processing at different devices or combinations of devices of the one or more devices.

At least one aspect relates to a method for processing compute activities of a building management system of a building. The method can include receiving, by one or more processors, a computing workload to be processed by the building system. The method can include determining, by the one or more processors, one or more of an on-premises building device of the building or an off-premises system for processing the computing workload based at least in part on a sustainability impact of processing the computing workload. The method can include causing, by the one or more processors, the computing workload to be processed by the determined one or more of the on-premises building device or the off-premises system.

In some implementations, the method further includes partitioning, by the one or more processors, the computing workload into a plurality of logical processing blocks, the plurality of logical processing blocks including a first logical processing block and a second logical processing block, wherein determining the one or more of the on-premises building device or the off-premises system for processing the computing workload includes assigning the on-premises building device for processing the first logical processing block and the off-premises system for processing the second logical processing block based at least in part on the sustainability impact of processing the first logical processing block and the second logical processing block.

In some implementations, determining the one or more of the on-premises building device or the off-premises system for processing the computing workload includes assigning a first portion of the computing workload to the one-premises building device and assigning a second portion of the computing workload to the off-premises system based at least in part on the sustainability impact of processing the computing workload using the on-premises building device and the off-premises system.

In some implementations, determining the one or more of the on-premises building device or the off-premises system for processing the computing workload includes selecting the one of the on-premises building device or the off-premises system that is predicted to result in reduced carbon emissions as compared to processing the workload with the other of the on-premises building device or the off-premises system.

At least one aspect relates to a method for processing compute activities of a building management system of a building. The method can include receiving, by one or more processors, a selection from a user of a sustainability tuning level from among a plurality of sustainability tuning levels, the plurality of sustainability tuning levels representing different levels of weighting to be placed on mitigating a sustainability impact of computing workloads balanced against one or more other factors. The method can include receiving, by one or more processors, a computing workload to be processed by the building system. The method can include determining, by the one or more processors, an execution plan for processing the computing workload based at least in part on the selected sustainability tuning level. The method can include causing, by the one or more processors, the computing workload to be processed in accordance with the execution plan.

In some implementations, the method further includes generating a graphical user interface including a scale or slider representing the plurality of sustainability tuning levels, wherein receiving the selection includes receiving an indication of a selected position on the scale or slider. In some implementations, determining the execution plan includes determining at least one of: one or more devices to process the computing workload, one or more locations at which to process the computing workload, whether to process the computing workload on one or more on-premises devices on one or more off-premises systems, or one or more times at which to process the computing workload.

In some implementations, the method further includes generating a graphical user interface including a plurality of recommendations for processing the computing workload corresponding to the plurality of sustainability tuning levels, wherein receiving the selection includes receiving a selection of one of the plurality of recommendations. In some implementations, the one or more other factors include a computing performance for processing computing workloads. In some implementations, the computing performance includes at least one of a latency, a frequency, an accuracy, a completeness, or a bandwidth impact of processing the computing workload.

At least one other aspect relates to other systems, methods, apparatus, and/or computer-readable storage media including one or more aspects of the present disclosure as discussed above.

At least one aspect relates to a method for testing software in an edge building device of a building. The method can include executing, by one or more processors of the edge building device, a first version of the software to perform a first set of one or more processing tasks for the edge building device. The method can include testing, by the one or more processors of the edge building device, a second version of the software configured to perform a second set of one or more processing tasks for the edge building device. Testing the second version of the software can include executing the second version of the software together with execution of the first version of the software on the edge building device. Testing the second version of the software can include evaluating, by the one or more processors of the edge building device or by causing a separate computing device to perform the evaluation, a performance of the second version of the software on the edge computing device for performing the second set of one or more processing tasks based on an output of the execution of the second version of the software.

In some implementations, testing the second version of the software includes executing the second version of the software without using the output of the execution to control functionality of the edge building device. In some implementations, the method can further include determining, based on the evaluation, that the performance of the second version of the software is above a particular level. In some implementations, the method can further include responsive to determining the performance of the second version of the software is above the particular level, deactivating the first version of the software and activating the second version of the software to perform the second set of one or more processing tasks for the edge building device.

In some implementations, the method can further include determining, based on the evaluation, that the performance of the second version of the software is below a particular level. In some implementations, the method can further include responsive to determining the performance of the second version of the software is below the predetermined level, modifying one or more characteristics of the second version of the software at the edge building device to generate a modified second version of the software and retesting the modified second version of the software at the edge building device. In some implementations, the method can further include determining, based on the evaluation, that the performance of the second version of the software is below a particular level and responsive to determining the performance of the second version of the software is below the predetermined level, providing data to an external computing device for use in modifying one or more characteristics of the second version of the software to generate a modified second version of the software. In some implementations, the software includes an edge connector, and at least one of the tasks of the first set of tasks and at least one of the tasks of the second set of tasks includes allowing the edge building device to interact with one or more other edge building devices.

At least one aspect relates to a method for detection of edge building devices of a building. The method can include providing a mobile sensor configured to be movable through a plurality of spaces of the building, the plurality of spaces including a plurality of edge building devices. The method can include causing the plurality of edge building devices to emit a plurality of unique signals, the plurality of unique signals including first characteristics indicating an identity of the edge building devices and second characteristics usable to determine locations of the plurality of edge building devices within the plurality of spaces. The method can include capturing, by the mobile sensor, the plurality of unique signals as the mobile sensor moves through the plurality of spaces. The method can include determining the identities and locations of the plurality of sensors using the plurality of unique signals captured by the mobile sensor.

In some implementations, the mobile sensor includes a wearable device. In some implementations, the mobile sensor includes an automated mobile sensor. In some implementations, the mobile sensor includes or is coupled to a drone or robot vacuum. In some implementations, the plurality of unique signals include a plurality of predetermined sounds, and wherein the mobile sensor includes a microphone. In some implementations, the first characteristic includes at least one of a frequency, a wavelength, or a pattern of the predetermined sounds, and wherein the second characteristic includes an amplitude or intensity and a directionality of the predetermined sounds. In some implementations, the plurality of unique signals include a plurality of patterns of lights, and wherein the mobile sensor includes a camera and/or other light sensor. In some implementations, the first characteristic includes at least one of a wavelength or particular patterns of the lights, and wherein the second characteristic includes an intensity and a directionality of the lights.

In some implementations, the plurality of unique signals encode one or more characteristics of the plurality of edge building devices, and wherein the method further including processing the plurality of unique signals to extract the encoded characteristics. In some implementations, the mobile sensor is configured to detect the plurality of unique signals using one or more physical and/or virtual device discovery mesh network planes separate from one or more control network planes used to control the plurality of edge building devices. In some implementations, the mobile sensor is configured to communicate with the edge building devices to detect the unique signals over a plurality of different protocols. In some implementations, receiving input from a user and determining the identities and locations of one or more of the plurality of edge building devices at least in part using the input.

At least one other aspect relates to other systems, methods, apparatus, and/or computer-readable storage media including one or more aspects of the present disclosure as discussed above.

At least one aspect relates to a method for enhancing performance of a machine learning model executing on an edge building device of a building. The method includes executing, by one or more processors of the edge building device, the machine learning model, generating, by the one or more processors of the edge building device, an assessment of the performance of the machine learning model on the edge building device, and, responsive to the assessment indicating the performance of the machine learning model is below a first level, retraining, by the one or more processors of the edge building device, the machine learning model at the edge building device, and/or causing, by the one or more processors of the edge building device, a device other than the edge building device to retrain the machine learning model.

In some implementations, generating the assessment of the performance of the machine learning model includes generating a score indicating the performance of the machine learning model. In some implementations, the assessment indicates the performance of the machine learning model is below the first level responsive to the score being below a threshold level. In some implementations, the method further includes receiving operational data of the building generated by at least one of the edge building device or one or more other building devices. In some implementations, the machine learning model is retrained using the operational data of the building.

In some implementations, executing the machine learning model includes initially executing the machine learning model without the machine learning model having been trained on data specific to the building or an entity associated with the building. In some implementations, the method further includes retraining the machine learning model at the edge device using the operational data. In some implementations, the method further includes causing a cloud computing system or other off-premises computing system to retrain the machine learning model. In some implementations, the method further includes selecting the machine learning model for executing by the edge building device from among a plurality of machine learning models based on at least one of design data or operational data for the building.

In some implementations, generating the assessment of the performance of the machine learning model includes monitoring the performance of the machine learning model over a timeframe. In some implementations, the machine learning model is retrained and/or caused to be retrained responsive to detecting that the performance of the machine learning model has degraded below the first level. In some implementations, responsive to the assessment indicating the performance of the machine learning model is below the first level, the method further includes generating an alert to an analyst to review the performance of the machine learning model. In some implementations, generating the alert to the analyst includes generating a request to the analyst to validate whether the performance of the machine learning model is attributable to the machine learning model itself or an external factor.

In some implementations, responsive to the assessment indicating the performance of the machine learning model is below the first level, the method further includes: generating a request to one or more occupants of the building to provide feedback relating to the machine learning model, receiving the feedback from the one or more occupants, and validating the performance of the machine learning model using the feedback.

Another aspect relates to a system for enhancing performance of a machine learning model executing on an edge building device of a building. The system includes one or more non-transitory computer-readable media storing instructions thereon that, when executed by one or more processors, cause the one or more processors to: execute the machine learning model, generate an assessment of the performance of the machine learning model on the edge building device, and, responsive to the assessment indicating the performance of the machine learning model is below a first level: retrain the machine learning model at the edge building device, and/or cause a device other than the edge building device to retrain the machine learning model.

In some implementations, generating the assessment of the performance of the machine learning model includes generating a score indicating the performance of the machine learning model to monitor and/or control a sustainability performance of at least a portion of the building, and the assessment indicates the performance of the machine learning model is below the first level responsive to the score being below a threshold level. In some implementations, the instructions further cause the one or more processors to: receive operational data of the building generated by at least one of the edge building device or one or more other building devices. In some implementations, the machine learning model is retrained using the operational data of the building. In some implementations, executing the machine learning model includes initially executing the machine learning model without the machine learning model having been trained on data specific to the building or an entity associated with the building.

In some implementations, generating the assessment of the performance of the machine learning model includes monitoring the performance of the machine learning model over a timeframe. In some implementations, the machine learning model is retrained and caused to be retrained responsive to detecting that the performance of the machine learning model has degraded below the first level. In some implementations, responsive to the assessment indicating the performance of the machine learning model is below the first level, the instructions further cause the one or more processors to: generate an alert to an analyst to review the performance of the machine learning model. In some implementations, generating the alert to the analyst includes generating a request to the analyst to validate whether the performance of the machine learning model is attributable to the machine learning model itself or an external factor.

In some implementations, responsive to the assessment indicating the performance of the machine learning model is below the first level, the instructions further cause the one or more processors to: generate a request to one or more occupants of the building to provide feedback relating to the machine learning model, receive the feedback from the one or more occupants, and validate the performance of the machine learning model using the feedback.

Another aspect relates to one or more non-transitory storage media storing instructions thereon for enhancing performance of a machine learning model executing on an edge building device of a building that. When executed by one or more processors, the instructions cause the one or more processors to perform operations including executing the machine learning model, generating an assessment of the performance of the machine learning model on the edge building device, wherein the machine learning model is instructed to monitor and/or control a sustainability performance of at least a portion of the building, and responsive to the assessment indicating the performance of the machine learning model to monitor and/or control the sustainability performance of the at least a portion of the building is below a first level: retraining the machine learning model at the edge building device, and/or causing a device other than the edge building device to retrain the machine learning model.

In some implementations, generating the assessment of the performance of the machine learning model includes generating a score indicating the performance of the machine learning model to monitor and/or control carbon emissions of at least a portion of the building. In some implementations, the assessment indicates the performance of the machine learning model to monitor and/or control the sustainability performance of the at least a portion of the building is below the first level responsive to the score being below a threshold level. In some implementations, responsive to the assessment indicating the performance of the machine learning model to monitor and/or control the sustainability performance of the at least a portion of the building is below the first level, the instructions further cause the one or more processors to perform operations including: generating an alert to an analyst to review the performance of the machine learning model, wherein generating the alert to the analyst comprises generating a request to the analyst to validate whether the performance of the machine learning model is attributable to the machine learning model itself or an external factor.

In some implementations, responsive to the assessment indicating the performance of the machine learning model is below the first level, the instructions further cause the one or more processors to perform operations including: generating a request to one or more occupants of the building to provide feedback relating to the machine learning model, receiving the feedback from the one or more occupants, and validating the performance of the machine learning model using the feedback.

At least one aspect relates to a method for testing software in an edge building device of a building. The method includes executing, by one or more processors of the edge building device, a first version of the software to perform a first set of one or more processing tasks for the edge building device, and testing, by the one or more processors of the edge building device, a second version of the software configured to perform a second set of one or more processing tasks for the edge building device, testing the second version of the software including executing the second version of the software together with execution of the first version of the software on the edge building device, and evaluating, by the one or more processors of the edge building device or by causing a separate computing device to perform the evaluation, a performance of the second version of the software on the edge computing device for performing the second set of one or more processing tasks based on an output of the execution of the second version of the software.

In some implementations, testing the second version of the software includes executing the second version of the software without using the output of the execution to control functionality of the edge building device. In some implementations, the method further includes determining, based on the evaluation, that the performance of the second version of the software is above a particular level, the performance of the second version of the software including an ability of the software to monitor and/or control a sustainability performance of at least a portion of the building, and, responsive to determining the performance of the second version of the software is above the particular level, deactivating the first version of the software and activating the second version of the software to perform the second set of one or more processing tasks for the edge building device. In some implementations, the second set of one or more processing tasks comprises monitoring and/or controlling carbon emissions of at least a portion of the building.

In some implementations, the method further includes determining, based on the evaluation, that the performance of the second version of the software is below a particular level, the performance of the second version of the software comprising an ability of the software to monitor and/or control a sustainability performance of at least a portion of the building, and, responsive to determining the performance of the second version of the software is below the predetermined level, determining one or more potential issues impacting the performance.

In some implementations, the method further includes determining, based on the evaluation, that the performance of the second version of the software is below a particular level, the performance of the second version of the software including an ability of the software to monitor and/or control a sustainability performance of at least a portion of the building, and, responsive to determining the performance of the second version of the software is below the predetermined level, modifying one or more characteristics of the second version of the software at the edge building device to generate a modified second version of the software and retesting the modified second version of the software at the edge building device.

In some implementations, the method further includes determining, based on the evaluation, that the performance of the second version of the software is below a particular level, the performance of the second version of the software including an ability of the software to monitor and/or control a sustainability performance of at least a portion of the building, and responsive to determining the performance of the second version of the software is below the predetermined level, providing data to an external computing device for use in modifying one or more characteristics of the second version of the software to generate a modified second version of the software. In some implementations, the software includes an edge connector, and at least one of the tasks of the first set of tasks and at least one of the tasks of the second set of tasks comprises allowing the edge building device to interact with one or more other edge building devices.

At least one aspect relates to a system for testing software in an edge building device of a building. The system includes one or more non-transitory computer readable media storing instructions thereon that, when executed by one or more processors, cause the one or more processors to: execute a first version of the software to perform a first set of one or more processing tasks for the edge building device and test a second version of the software configured to perform a second set of one or more processing tasks for the edge building device. Testing the second version of the software includes executing the second version of the software together with execution of the first version of the software on the edge building device, and evaluating, by the one or more processors of the edge building device or by causing a separate computing device to perform the evaluation, a performance of the second version of the software on the edge computing device for performing the second set of one or more processing tasks based on an output of the execution of the second version of the software.

In some implementations, testing the second version of the software includes executing the second version of the software without using the output of the execution to control functionality of the edge building device. In some implementations, the instructions further cause the one or more processors to: determine, based on the evaluation, that the performance of the second version of the software is above a particular level, the performance of the second version of the software including an ability of the software to monitor and/or control a sustainability performance of at least a portion of the building, and, responsive to determining the performance of the second version of the software is above the particular level, deactivate the first version of the software and activate the second version of the software to perform the second set of one or more processing tasks for the edge building device. In some implementations, the second set of one or more processing tasks includes monitoring and/or controlling carbon emissions of at least a portion of the building.

In some implementations, the instructions further cause the one or more processors to: determine, based on the evaluation, that the performance of the second version of the software is below a particular level, the performance of the second version of the software including an ability of the software to monitor and/or control a sustainability performance of at least a portion of the building, and, responsive to determining the performance of the second version of the software is below the predetermined level, determine one or more potential issues impacting the performance.

In some implementations, the instructions further cause the one or more processors to: determine, based on the evaluation, that the performance of the second version of the software is below a particular level, the performance of the second version of the software including an ability of the software to monitor and/or control a sustainability performance of at least a portion of the building, and responsive to determining the performance of the second version of the software is below the predetermined level, modify one or more characteristics of the second version of the software at the edge building device to generate a modified second version of the software and retesting the modified second version of the software at the edge building device.

In some implementations, the instructions further cause the one or more processors to: determine, based on the evaluation, that the performance of the second version of the software is below a particular level, the performance of the second version of the software including an ability of the software to monitor and/or control a sustainability performance of at least a portion of the building, and responsive to determining the performance of the second version of the software is below the predetermined level, provide data to an external computing device for use in modifying one or more characteristics of the second version of the software to generate a modified second version of the software. In some implementations, the software includes an edge connector, and at least one of the tasks of the first set of tasks and at least one of the tasks of the second set of tasks includes allowing the edge building device to interact with one or more other edge building devices.

At least one aspect relates to one or more non-transitory computer readable storage media storing instructions for testing software in an edge building device of a building thereon. When executed by one or more processors, the instructions cause the one or more processors to perform operations including: executing a first version of the software to perform a first set of one or more processing tasks for the edge building device, the first set of one or more processing tasks including monitoring a sustainability performance of at least a portion of the building, and testing a second version of the software configured to perform a second set of one or more processing tasks for the edge building device, the second set of one or more processing tasks including monitoring and/or controlling a sustainability performance of at least a portion of the building. Testing the second version of the software includes: executing the second version of the software together with execution of the first version of the software on the edge building device and evaluating, by the one or more processors of the edge building device or by causing a separate computing device to perform the evaluation, a performance of the second version of the software on the edge computing device for performing the second set of one or more processing tasks based on an output of the execution of the second version of the software.

In some implementations, testing the second version of the software includes executing the second version of the software without using the output of the execution to control functionality of the edge building device. In some implementations, the instructions further cause the processors to perform operations including: determining, based on the evaluation, that the performance of the second version of the software is above a particular level, the performance of the second version of the software including an ability to monitor carbon emissions of at least a portion of the building, and responsive to determining the performance of the second version of the software is above the particular level, deactivating the first version of the software and activating the second version of the software to perform the second set of one or more processing tasks for the edge building device, the second set of one or more processing tasks including monitoring carbon emissions of the one or more pieces of building equipment of the building.

In some implementations, the instructions further cause the processors to perform operations including: determining, based on the evaluation, that the performance of the second version of the software is below a particular level, the performance of the second version of the software including an ability to monitor carbon emissions of at least a portion of the building, and responsive to determining the performance of the second version of the software is below the predetermined level, determining one or more potential issues impacting the performance.

In some implementations, the instructions further cause the processors to perform operations including: determining, based on the evaluation, that the performance of the second version of the software is below a particular level, the performance of the second version of the software including an ability to monitor carbon emissions of at least a portion of the building, and responsive to determining the performance of the second version of the software is below the predetermined level, modifying one or more characteristics of the second version of the software at the edge building device to generate a modified second version of the software and retesting the modified second version of the software at the edge building device.

In some implementations, instructions further cause the processors to perform operations including: determining, based on the evaluation, that the performance of the second version of the software is below a particular level, the performance of the second version of the software including an ability to monitor carbon emissions of at least a portion of the building, and responsive to determining the performance of the second version of the software is below the predetermined level, providing data to an external computing device for use in modifying one or more characteristics of the second version of the software to generate a modified second version of the software.

At least one aspect relates to a method for processing compute activities of a building management system of a building. The method includes receiving, by one or more processors, a selection from a user of a sustainability tuning level from among a plurality of sustainability tuning levels, the plurality of sustainability tuning levels representing different levels of weighting to be placed on mitigating a sustainability impact of computing workloads balanced against one or more other factors, receiving, by one or more processors, a computing workload to be processed by the building system, determining, by the one or more processors, an execution plan for processing the computing workload based at least in part on the selected sustainability tuning level, and causing, by the one or more processors, the computing workload to be processed in accordance with the execution plan.

In some implementations, the method includes generating a graphical user interface comprising a scale or slider representing the plurality of sustainability tuning levels, wherein receiving the selection comprises receiving an indication of a selected position on the scale or slider. In some implementations determining the execution plan includes determining at least one of: one or more devices to process the computing workload, one or more locations at which to process the computing workload, whether to process the computing workload on one or more on-premises devices on one or more off-premises systems, or one or more times at which to process the computing workload.

In some implementations, the method includes generating a graphical user interface comprising a plurality of recommendations for processing the computing workload corresponding to the plurality of sustainability tuning levels, wherein receiving the selection includes receiving a selection of one of the plurality of recommendations. In some implementations, the one or more other factors includes a computing performance for processing computing workloads. In some implementations, the computing performance includes at least one of a latency, a frequency, an accuracy, a completeness, or a bandwidth impact of processing the computing workload.

In some implementations, the method includes partitioning, by the one or more processors, the computing workload into a plurality of logical processing blocks. In some implementations, the plurality of logical processing blocks includes a first logical processing block and a second logical processing block. In some implementations, determining a time for processing the computing workload includes determining a first time for processing the first logical processing block and a second time for processing the second logical processing block based at least in part on the sustainability impact of processing the first logical processing block and the second logical processing block.

In some implementations, determining a time to process the computing workload based at least in part on the sustainability impact includes determining environmental conditions affecting the sustainability impact of processing the computing workload at a plurality of times, and selecting a first time from among the plurality of times responsive to predicting processing the computing workload at the first time will result in reduced carbon emissions as compared to processing the computing workload at a second time of the plurality of times based on the environmental conditions at the first time and the second time.

At least one aspect relates to a system for processing compute activities of a building management system of a building. The system includes one or more non-transitory computer-readable media storing instructions thereon that, when executed by one or more processors, cause the one or more processors to: receive, by one or more processors, a selection from a user of a sustainability tuning level from among a plurality of sustainability tuning levels, the plurality of sustainability tuning levels representing different levels of weighting to be placed on mitigating a sustainability impact of computing workloads balanced against one or more other factors, receive, by one or more processors, a computing workload to be processed by the building system, determine, by the one or more processors, an execution plan for processing the computing workload based at least in part on the selected sustainability tuning level, and cause, by the one or more processors, the computing workload to be processed in accordance with the execution plan.

In some implementations, the instructions further cause the one or more processors to generate a graphical user interface comprising a scale or slider representing the plurality of sustainability tuning levels. In some implementations, receiving the selection includes receiving an indication of a selected position on the scale or slider. In some implementations, determining the execution plan includes determining at least one of: one or more devices to process the computing workload, one or more locations at which to process the computing workload, whether to process the computing workload on one or more on-premises devices on one or more off-premises systems, or one or more times at which to process the computing workload.

In some implementations, the instructions further cause the one or more processors to generate a graphical user interface including a plurality of recommendations for processing the computing workload corresponding to the plurality of sustainability tuning levels. In some implementations, receiving the selection includes receiving a selection of one of the plurality of recommendations. In some implementations, the one or more other factors include a computing performance for processing computing workloads. In some implementations, the computing performance includes at least one of a latency, a frequency, an accuracy, a completeness, or a bandwidth impact of processing the computing workload.

At least one aspect relates to one or more non-transitory computer-readable storage media storing instructions thereon that, when executed by one or more processors, cause the one or more processors to perform operations including: receiving, by one or more processors, a selection from a user of a sustainability tuning level from among a plurality of sustainability tuning levels, the plurality of sustainability tuning levels representing different levels of weighting to be placed on mitigating a sustainability impact of computing workloads balanced against one or more other factors, receiving, by one or more processors, a computing workload to be processed by the building system, determining, by the one or more processors, an execution plan for processing the computing workload based at least in part on the selected sustainability tuning level, causing, by the one or more processors, the computing workload to be processed in accordance with the execution plan.

In some implementations, the instructions further cause the one or more processors to perform operations including generating a graphical user interface comprising a scale or slider representing the plurality of sustainability tuning levels. In some implementations, receiving the selection includes receiving an indication of a selected position on the scale or slider. In some implementations, determining the execution plan includes determining at least one of: one or more devices to process the computing workload, one or more locations at which to process the computing workload, whether to process the computing workload on one or more on-premises devices on one or more off-premises systems, or one or more times at which to process the computing workload.

In some implementations, the instructions further cause the one or more processors to perform operations including generating a graphical user interface comprising a plurality of recommendations for processing the computing workload corresponding to the plurality of sustainability tuning levels. In some implementations, receiving the selection includes receiving a selection of one of the plurality of recommendations. In some implementations, the one or more other factors include a computing performance for processing computing workloads. In some implementations, the computing performance include at least one of a latency, a frequency, an accuracy, a completeness, or a bandwidth impact of processing the computing workload.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the FIGURES, systems and methods are provided for managing building devices and computing workloads for such devices. Some embodiments of the present disclosure relate to processing computing workloads for building devices and/or building management systems. In some embodiments, the computing workloads are processed by assigning some or all of the computing workloads to one or more of multiple on-premises building devices. In some embodiments, the computing workloads are processed by assigning some or all of the computing workloads to an on-premises building device and/or an off-premises system. In some embodiments, the computing workloads are partitioned into multiple logical processing blocks for handling by one or more devices/systems. In some embodiments, the computing workloads are handled at least in part based on a sustainability impact of processing the computing workloads in different ways (e.g., using different devices/systems, in different locations, at different times, etc.).

Some embodiments relate to assessing and/or improving performance of machine learning models operating on building devices, such as edge building devices. In some embodiments, the performance of the models is scored or otherwise assessed, and the model is retrained in response to determining the model is not performing at a desired level. In some embodiments, feedback from an analyst or one or more occupants is used to validate the model performance.

Some embodiments relate to testing software on edge devices and evaluating the performance of the software on the edge devices. In some such embodiments, new versions of the software are tested together with existing versions of the software prior to making the new versions active on the edge devices. In some such embodiments, the new versions of the software are modified in response to data collected from executing the new versions of the software on the edge devices.

Some embodiments relate to discovering and/or configuring edge devices. In some such embodiments, a mobile sensor is moved around a plurality of spaces of a building, and edge devices are controlled to emit unique signals. The unique signals are used to determine an identity and location of the edge devices. In some implementations, the unique signals may also be used to help configure one or more parameters of the edge devices (e.g., configured the building management system to the detected edge devices using the unique signals).

Building management systems, as discussed herein, may include any types of systems configured or designed to perform any types of tasks in a building or set of buildings, including, but not limited to, monitoring, control, and/or automation of building devices/equipment.

I. Machine Learning Models for Building Management

Figure 1:
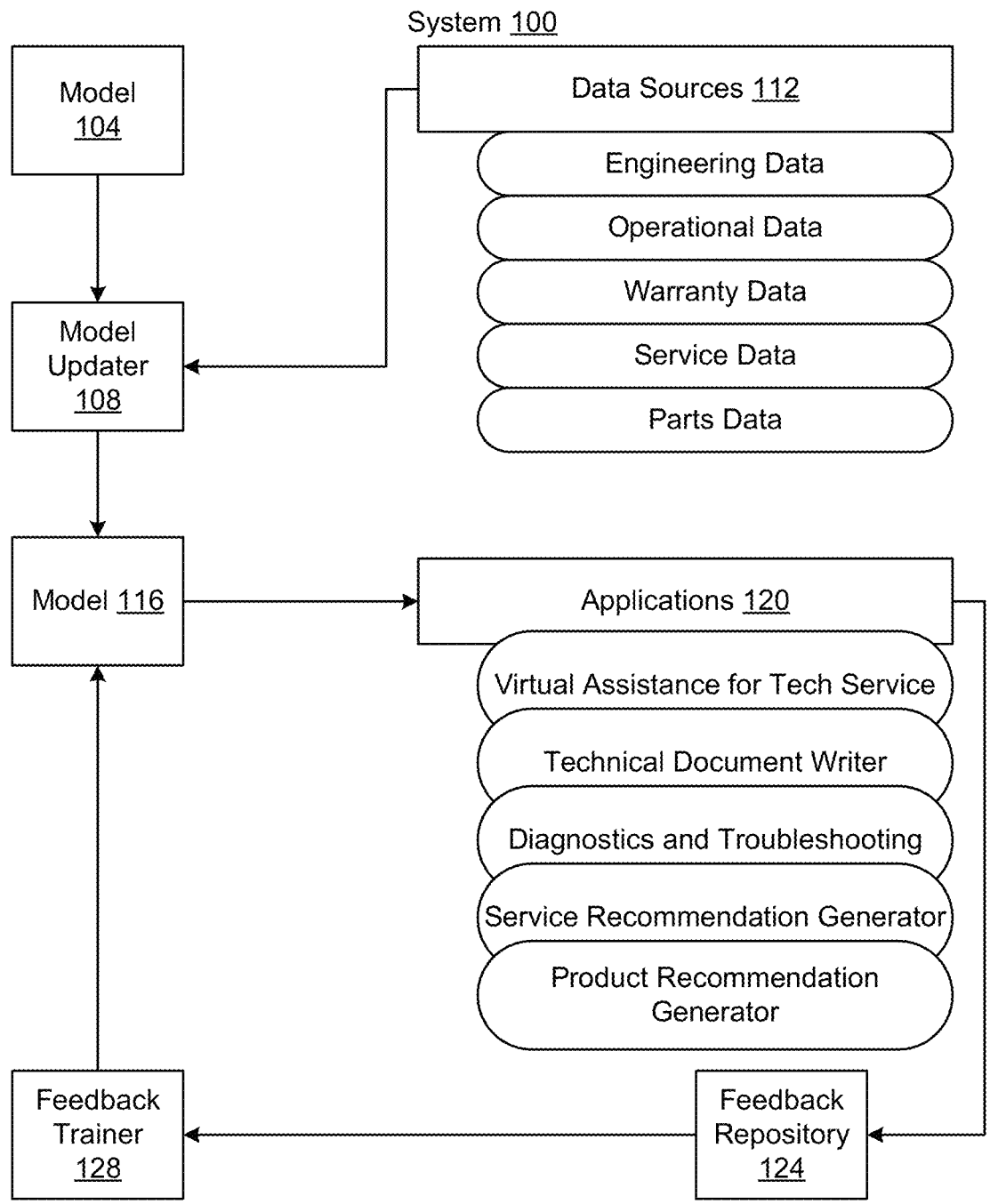
FIG. 1 is a block diagram of an example of a machine learning model-based system for building applications.

FIG. 1 depicts an example of a system 100. The system 100 can implement various operations for configuring (e.g., training, updating, modifying, transfer learning, fine-tuning, etc.) and/or operating various AI and/or ML systems, such as neural networks of LLMs or other generative AI systems. The system 100 can be used to implement various generative AI-based building operations. As illustrated, system 100 shows an example that may be used to implement building equipment servicing features. However, it should be understood that equipment servicing is provided as merely one example of the types of building management features that may be implemented using the systems and methods disclosed herein, and the present disclosure contemplates utilizing the features disclosed herein with any other buildings applications (e.g., security, occupant comfort, productivity, equipment (e.g., HVAC-R equipment) control and/or automation, etc.).

For example, the system 100 can be implemented for operations associated with any of a variety of building management systems (BMSs) or equipment or components thereof. A BMS can include a system of devices that can control, monitor, and manage equipment in or around a building or building area. The BMS can include, for example, a HVAC system, a security system, a lighting system, a fire alerting system, any other system that is capable of managing building functions or devices, or any combination thereof. The BMS can include or be coupled with items of equipment, for example and without limitation, such as heaters, chillers, boilers, air handling units, sensors, actuators, refrigeration systems, fans, blowers, heat exchangers, energy storage devices, condensers, valves, or various combinations thereof.

The items of equipment can operate in accordance with various qualitative and quantitative parameters, variables, setpoints, and/or thresholds or other criteria, for example. In some instances, the system 100 and/or the items of equipment can include or be coupled with one or more controllers for controlling parameters of the items of equipment, such as to receive control commands for controlling operation of the items of equipment via one or more wired, wireless, and/or user interfaces of controller.

Various components of the system 100 or portions thereof, as well as the various other devices and systems discussed herein, can be implemented by one or more processors coupled with or more memory devices (memory). The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors can be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources.

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

Machine Learning Models

The system 100 can include or be coupled with one or more first models 104. The first model 104 can include one or more neural networks, including neural networks configured as generative models. For example, the first model 104 can predict or generate new data (e.g., artificial data; synthetic data; data not explicitly represented in data used for configuring the first model 104). The first model 104 can generate any of a variety of modalities of data, such as text, speech, audio, images, and/or video data. The neural network can include a plurality of nodes, which may be arranged in layers for providing outputs of one or more nodes of one layer as inputs to one or more nodes of another layer. The neural network can include one or more input layers, one or more hidden layers, and one or more output layers. Each node can include or be associated with parameters such as weights, biases, and/or thresholds, representing how the node can perform computations to process inputs to generate outputs. The parameters of the nodes can be configured by various learning or training operations, such as unsupervised learning, weakly supervised learning, semi-supervised learning, or supervised learning.

The first model 104 can include, for example and without limitation, one or more language models, LLMs, attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

For example, the first model 104 can include at least one GPT model. The GPT model can receive an input sequence and can parse the input sequence to determine a sequence of tokens (e.g., words or other semantic units of the input sequence, such as by using Byte Pair Encoding tokenization). The GPT model can include or be coupled with a vocabulary of tokens, which can be represented as a one-hot encoding vector, where each token of the vocabulary has a corresponding index in the encoding vector; as such, the GPT model can convert the input sequence into a modified input sequence, such as by applying an embedding matrix to the token tokens of the input sequence (e.g., using a neural network embedding function), and/or applying positional encoding (e.g., sin-cosine positional encoding) to the tokens of the input sequence. The GPT model can process the modified input sequence to determine a next token in the sequence (e.g., to append to the end of the sequence), such as by determining probability scores indicating the likelihood of one or more candidate tokens being the next token and selecting the next token according to the probability scores (e.g., selecting the candidate token having the highest probability scores as the next token). For example, the GPT model can apply various attention and/or transformer-based operations or networks to the modified input sequence to identify relationships between tokens for detecting the next token to form the output sequence.

The first model 104 can include at least one diffusion model, which can be used to generate image and/or video data. For example, the diffusional model can include a denoising neural network and/or a denoising diffusion probabilistic model neural network. The denoising neural network can be configured by applying noise to one or more training data elements (e.g., images, video frames) to generate noised data, providing the noised data as input to a candidate denoising neural network, causing the candidate denoising neural network to modify the noised data according to a denoising schedule, evaluating a convergence condition based on comparing the modified noised data with the training data instances, and modifying the candidate denoising neural network according to the convergence condition (e.g., modifying weights and/or biases of one or more layers of the neural network). In some implementations, the first model 104 includes a plurality of generative models, such as GPT and diffusion models, that can be trained separately or jointly to facilitate generating multi-modal outputs, such as technical documents (e.g., service guides) that include both text and image/video information.

In some implementations, the first model 104 can be configured using various unsupervised and/or supervised training operations. The first model 104 can be configured using training data from various domain-agnostic and/or domain-specific data sources, including but not limited to various forms of text, speech, audio, image, and/or video data, or various combinations thereof. The training data can include a plurality of training data elements (e.g., training data instances). Each training data element can be arranged in structured or unstructured formats; for example, the training data element can include an example output mapped to an example input, such as a query representing a service request or one or more portions of a service request, and a response representing data provided responsive to the query. The training data can include data that is not separated into input and output subsets (e.g., for configuring the first model 104 to perform clustering, classification, or other unsupervised ML operations). The training data can include human-labeled information, including but not limited to feedback regarding outputs of the models 104, 116. This can allow the system 100 to generate more human-like outputs.

In some implementations, the training data includes data relating to building management systems. For example, the training data can include examples of HVAC-R data, such as operating manuals, technical data sheets, configuration settings, operating setpoints, diagnostic guides, troubleshooting guides, user reports, technician reports. In some implementations, the training data used to configure the first model 104 includes at least some publicly accessible data, such as data retrievable via the Internet.

Referring further to FIG. 1, the system 100 can configure the first model 104 to determine one or more second models 116. For example, the system 100 can include a model updater 108 that configures (e.g., trains, updates, modifies, fine-tunes, etc.) the first model 104 to determine the one or more second models 116. In some implementations, the second model 116 can be used to provide application-specific outputs, such as outputs having greater precision, accuracy, or other metrics, relative to the first model, for targeted applications.

The second model 116 can be similar to the first model 104. For example, the second model 116 can have a similar or identical backbone or neural network architecture as the first model 104. In some implementations, the first model 104 and the second model 116 each include generative AI machine learning models, such as LLMs (e.g., GPT-based LLMs) and/or diffusion models. The second model 116 can be configured using processes analogous to those described for configuring the first model 104.

In some implementations, the model updater 108 can perform operations on at least one of the first model 104 or the second model 116 via one or more interfaces, such as application programming interfaces (APIs). For example, the models 104, 116 can be operated and maintained by one or more systems separate from the system 100. The model updater 108 can provide training data to the first model 104, via the API, to determine the second model 116 based on the first model 104 and the training data. The model updater 108 can control various training parameters or hyperparameters (e.g., learning rates, etc.) by providing instructions via the API to manage configuring the second model 116 using the first model 104.

Data Sources

The model updater 108 can determine the second model 116 using data from one or more data sources 112. For example, the system 100 can determine the second model 116 by modifying the first model 104 using data from the one or more data sources 112. The data sources 112 can include or be coupled with any of a variety of integrated or disparate databases, data warehouses, digital twin data structures (e.g., digital twins of items of equipment or building management systems or portions thereof), data lakes, data repositories, documentation records, or various combinations thereof. In some implementations, the data sources 112 include HVAC-R data in any of text, speech, audio, image, or video data, or various combinations thereof, such as data associated with HVAC-R components and procedures including but not limited to installation, operation, configuration, repair, servicing, diagnostics, and/or troubleshooting of HVAC-R components and systems. Various data described below with reference to data sources 112 may be provided in the same or different data elements, and may be updated at various points. The data sources 112 can include or be coupled with items of equipment (e.g., where the items of equipment output data for the data sources 112, such as sensor data, etc.). The data sources 112 can include various online and/or social media sources, such as blog posts or data submitted to applications maintained by entities that manage the buildings. The system 100 can determine relations between data from different sources, such as by using timeseries information and identifiers of the sites or buildings at which items of equipment are present to detect relationships between various different data relating to the items of equipment (e.g., to train the models 104, 116 using both timeseries data (e.g., sensor data; outputs of algorithms or models, etc.) regarding a given item of equipment and freeform natural language reports regarding the given item of equipment).

The data sources 112 can include unstructured data or structured data (e.g., data that is labeled with or assigned to one or more predetermined fields or identifiers, or is in a predetermined format, such as a database or tabular format). The unstructured data can include one or more data elements that are not in a predetermined format (e.g., are not assigned to fields, or labeled with or assigned with identifiers, that are indicative of a characteristic of the one or more data elements). The data sources 112 can include semi-structured data, such as data assigned to one or more fields that may not specify at least some characteristics of the data, such as data represented in a report having one or more fields to which freeform data is assigned (e.g., a report having a field labeled "describe the item of equipment" in which text or user input describing the item of equipment is provided). The data sources 112 can include data that is incomplete, For example, using the first model 104 and/or second model 116 to process the data can allow the system 100 to extract useful information from data in a variety of formats, including unstructured/freeform formats, which can allow service technicians to input information in less burdensome formats. The data can be of any of a plurality of formats (e.g., text, speech, audio, image, video, etc.), including multi-modal formats. For example, the data may be received from service technicians in forms such as text (e.g., laptop/desktop or mobile application text entry), audio, and/or video (e.g., dictating findings while capturing video).

The data sources 112 can include engineering data regarding one or more items of equipment. The engineering data can include manuals, such as installation manuals, instruction manuals, or operating procedure guides. The engineering data can include specifications or other information regarding operation of items of equipment. The engineering data can include engineering drawings, process flow diagrams, refrigeration cycle parameters (e.g., temperatures, pressures), or various other information relating to structures and functions of items of equipment.

In some implementations, the data sources 112 can include operational data regarding one or more items of equipment. The operational data can represent detected information regarding items of equipment, such as sensor data, logged data, user reports, or technician reports. The operational data can include, for example, service tickets generated responsive to requests for service, work orders, data from digital twin data structures maintained by an entity of the item of equipment, outputs or other information from equipment operation models (e.g., chiller vibration models), or various combinations thereof. Logged data, user reports, service tickets, billing records, time sheets, and various other such data can provide temporal information, such as how long service operations may take, or durations of time between service operations, which can allow the system 100 to predict resources to use for performing service as well as when to request service.

The data sources 112 can include, for instance, warranty data. The warranty data can include warranty documents or agreements that indicate conditions under which various entities associated with items of equipment are to provide service, repair, or other actions corresponding to items of equipment, such as actions corresponding to service requests.

The data sources 112 can include service data. The service data can include data from any of various service providers, such as service reports. The service data can indicate service procedures performed, including associated service procedures with initial service requests and/or sensor data related conditions to trigger service and/or sensor data measured during service processes.

In some implementations, the data sources 112 can include parts data, including but not limited to parts usage and sales data. For example, the data sources 112 can indicate various parts associated with installation or repair of items of equipment. The data sources 112 can indicate tools for performing service and/or installing parts.

The system 100 can include, with the data of the data sources 112, labels to facilitate cross-reference between items of data that may relate to common items of equipment, sites, service technicians, customers, or various combinations thereof. For example, data from disparate sources may be labeled with time data, which can allow the system 100 (e.g., by configuring the models 104, 116) to increase a likelihood of associating information from the disparate sources due to the information being detected or recorded (e.g., as service reports) at the same time or near in time.

For example, the data sources 112 can include data that can be particular to specific or similar items of equipment, buildings, equipment configurations, environmental states, or various combinations thereof. In some implementations, the data includes labels or identifiers of such information, such as to indicate locations, weather conditions, timing information, uses of the items of equipment or the buildings or sites at which the items of equipment are present, etc. This can enable the models 104, 116 to detect patterns of usage (e.g., spikes; troughs; seasonal or other temporal patterns) or other information that may be useful for determining causes of issues or causes of service requests, or predict future issues, such as to allow the models 104, 116 to be trained using information indicative of causes of issues across multiple items of equipment (which may have the same or similar causes even if the data regarding the items of equipment is not identical). For example, an item of equipment may be at a site that is a museum; by relating site usage or occupancy data with data regarding the item of equipment, such as sensor data and service reports, the system 100 can configure the models 104, 116 to determine a high likelihood of issues occurring before events associated with high usage (e.g., gala, major exhibit opening), and can generate recommendations to perform diagnostics or servicing prior to the events.

Model Configuration

Referring further to FIG. 1, the model updater 108 can perform various machine learning model configuration/training operations to determine the second models 116 using the data from the data sources 112. For example, the model updater 108 can perform various updating, optimization, retraining, reconfiguration, fine-tuning, or transfer learning operations, or various combinations thereof, to determine the second models 116. The model updater 108 can configure the second models 116, using the data sources 112, to generate outputs (e.g., completions) in response to receiving inputs (e.g., prompts), where the inputs and outputs can be analogous to data of the data sources 112.

For example, the model updater 108 can identify one or more parameters (e.g., weights and/or biases) of one or more layers of the first model 104, and maintain (e.g., freeze, maintain as the identified values while updating) the values of the one or more parameters of the one or more layers. In some implementations, the model updater 108 can modify the one or more layers, such as to add, remove, or change an output layer of the one or more layers, or to not maintain the values of the one or more parameters. The model updater 108 can select at least a subset of the identified one or parameters to maintain according to various criteria, such as user input or other instructions indicative of an extent to which the first model 104 is to be modified to determine the second model 116. In some implementations, the model updater 108 can modify the first model 104 so that an output layer of the first model 104 corresponds to output to be determined for applications 120.

Responsive to selecting the one or more parameters to maintain, the model updater 108 can apply, as input to the second model 116 (e.g., to a candidate second model 116, such as the modified first model 104, such as the first model 104 having the identified parameters maintained as the identified values), training data from the data sources 112. For example, the model updater 108 can apply the training data as input to the second model 116 to cause the second model 116 to generate one or more candidate outputs.

The model updater 108 can evaluate a convergence condition to modify the candidate second model 116 based at least on the one or more candidate outputs and the training data applied as input to the candidate second model 116. For example, the model updater 108 can evaluate an objective function of the convergence condition, such as a loss function (e.g., L1 loss, L2 loss, root mean square error, cross-entropy or log loss, etc.) based on the one or more candidate outputs and the training data; this evaluation can indicate how closely the candidate outputs generated by the candidate second model 116 correspond to the ground truth represented by the training data. The model updater 108 can use any of a variety of optimization algorithms (e.g., gradient descent, stochastic descent, Adam optimization, etc.) to modify one or more parameters (e.g., weights or biases of the layer(s) of the candidate second model 116 that are not frozen) of the candidate second model 116 according to the evaluation of the objective function. In some implementations, the model updater 108 can use various hyperparameters to evaluate the convergence condition and/or perform the configuration of the candidate second model 116 to determine the second model 116, including but not limited to hyperparameters such as learning rates, numbers of iterations or epochs of training, etc.

As described further herein with respect to applications 120, in some implementations, the model updater 108 can select the training data from the data of the data sources 112 to apply as the input based at least on a particular application of the plurality of applications 120 for which the second model 116 is to be used for. For example, the model updater 108 can select data from the parts data source 112 for the product recommendation generator application 120, or select various combinations of data from the data sources 112 (e.g., engineering data, operational data, and service data) for the service recommendation generator application 120. The model updater 108 can apply various combinations of data from various data sources 112 to facilitate configuring the second model 116 for one or more applications 120.

In some implementations, the system 100 can perform at least one of conditioning, classifier-based guidance, or classifier-free guidance to configure the second model 116 using the data from the data sources 112. For example, the system 100 can use classifiers associated with the data, such as identifiers of the item of equipment, a type of the item of equipment, a type of entity operating the item of equipment, a site at which the item of equipment is provided, or a history of issues at the site, to condition the training of the second model 116. For example, the system 100 combine (e.g., concatenate) various such classifiers with the data for inputting to the second model 116 during training, for at least a subset of the data used to configure the second model 116, which can enable the second model 116 to be responsive to analogous information for runtime/inference time operations.

Applications

Referring further to FIG. 1, the system 100 can use outputs of the one or more second models 116 to implement one or more applications 120. For example, the second models 116, having been configured using data from the data sources 112, can be capable of precisely generating outputs that represent useful, timely, and/or real-time information for the applications 120. In some implementations, each application 120 is coupled with a corresponding second model 116 that is specifically configured to generate outputs for use by the application 120. Various applications 120 can be coupled with one another, such as to provide outputs from a first application 120 as inputs or portions of inputs to a second application 120.

The applications 120 can include any of a variety of desktop, web-based/browser-based, or mobile applications. For example, the applications 120 can be implemented by enterprise management software systems, employee or other user applications (e.g., applications that relate to BMS functionality such as temperature control, user preferences, conference room scheduling, etc.), equipment portals that provide data regarding items of equipment, or various combinations thereof.

The applications 120 can include user interfaces, dashboards, wizards, checklists, conversational interfaces, chatbots, configuration tools, or various combinations thereof. The applications 120 can receive an input, such as a prompt (e.g., from a user), provide the prompt to the second model 116 to cause the second model 116 to generate an output, such as a completion in response to the prompt, and present an indication of the output. The applications 120 can receive inputs and/or present outputs in any of a variety of presentation modalities, such as text, speech, audio, image, and/or video modalities. For example, the applications 120 can receive unstructured or freeform inputs from a user, such as a service technician, and generate reports in a standardized format, such as a customer-specific format. This can allow, for example, technicians to automatically, and flexibly, generate customer-ready reports after service visits without requiring strict input by the technician or manually sitting down and writing reports; to receive inputs as dictations in order to generate reports; to receive inputs in any form or a variety of forms, and use the second model 116 (which can be trained to cross-reference metadata in different portions of inputs and relate together data elements) to generate output reports (e.g., the second model 116, having been configured with data that includes time information, can use timestamps of input from dictation and timestamps of when an image is taken, and place the image in the report in a target position or label based on time correlation).

In some implementations, the applications 120 include at least one virtual assistant (e.g., virtual assistance for technician services) application 120. The virtual assistant application can provide various services to support technician operations, such as presenting information from service requests, receiving queries regarding actions to perform to service items of equipment, and presenting responses indicating actions to perform to service items of equipment. The virtual assistant application can receive information regarding an item of equipment to be serviced, such as sensor data, text descriptions, or camera images, and process the received information using the second model 116 to generate corresponding responses.

For example, the virtual assistant application 120 can be implemented in a UI/UX wizard configuration, such as to provide a sequence of requests for information from the user (the sequence may include requests that are at least one of predetermined or dynamically generated responsive to inputs from the user for previous requests). For example, the virtual assistant application 120 can provide one or more requests for information from users such as service technicians, facility managers, or other occupants, and provide the received responses to at least one of the second model 116 or a root cause detection function (e.g., algorithm, model, data structure mapping inputs to candidate causes, etc.) to determine a prediction of a cause of the issue of the item of equipment and/or solutions. The virtual assistant application 120 can use requests for information such as for unstructured text by which the user describes characteristics of the item of equipment relating to the issue; answers expected to correspond to different scenarios indicative of the issue; and/or image and/or video input (e.g., images of problems, equipment, spaces, etc. that can provide more context around the issue and/or configurations). For example, responsive to receiving a response via the virtual assistant application 120 indicating that the problem is with temperature in the space, the system 100 can request, via the virtual assistant application 120, information regarding HVAC-R equipment associated with the space, such as pictures of the space, an air handling unit, a chiller, or various combinations thereof.

The virtual assistant application 120 can include a plurality of applications 120 (e.g., variations of interfaces or customizations of interfaces) for a plurality of respective user types. For example, the virtual assistant application 120 can include a first application 120 for a customer user, and a second application 120 for a service technician user. The virtual assistant applications 120 can allow for updating and other communications between the first and second applications 120 as well as the second model 116. Using one or more of the first application 120 and the second application 120, the system 100 can manage continuous/real-time conversations for one or more users, and evaluate the users' engagement with the information provided (e.g., did the user, customer, service technician, etc., follow the provided steps for responding to the issue or performing service, did the user discontinue providing inputs to the virtual assistant application 120, etc.), such as to enable the system 100 to update the information generated by the second model 116 for the virtual assistant application 120 according to the engagement. In some implementations, the system 100 can use the second model 116 to detect sentiment of the user of the virtual assistant application 120, and update the second model 116 according to the detected sentiment, such as to improve the experience provided by the virtual assistant application 120.

The applications 120 can include at least one document writer application 120, such as a technical document writer. The document writer application 120 can facilitate preparing structured (e.g. form-based) and/or unstructured documentation, such as documentation associated with service requests. For example, the document writer application 120 can present a user interface corresponding to a template document to be prepared that is associated with at least one of a service request or the item of equipment for which the service request is generated, such as to present one or more predefined form sections or fields. The document writer application 120 can use inputs, such as prompts received from the users and/or technical data provided by the user regarding the item of equipment, such as sensor data, text descriptions, or camera images, to generate information to include in the documentation. For example, the document writer application 120 can provide the inputs to the second model 116 to cause the second model 116 to generate completions for text information to include in the fields of the documentation.

The applications 120 can include, in some implementations, at least one diagnostics and troubleshooting application 120. The diagnostics and troubleshooting application 120 can receive inputs including at least one of a service request or information regarding the item of equipment to be serviced, such as information identified by a service technician. The diagnostics and troubleshooting application 120 can provide the inputs to a corresponding second model 116 to cause the second model 116 to generate outputs such as indications of potential items to be checked regarding the item of equipment, modifications or fixes to make to perform the service, or values or ranges of values of parameters of the item of equipment that may be indicative of specific issues to for the service technician to address or repair.

The applications 120 can at least one service recommendation generator application 120. The service recommendation generator application 120 can receive inputs such as a service request or information regarding the item of equipment to be serviced, and provide the inputs to the second model 116 to cause the second model 116 to generate outputs for presenting service recommendations, such as actions to perform to address the service request.

In some implementations, the applications 120 can include a product recommendation generator application 120. The product recommendation generator application 120 can process inputs such as information regarding the item of equipment or the service request, using one or more second models 116 (e.g., models trained using parts data from the data sources 112), to determine a recommendation of a part or product to replace or otherwise use for repairing the item of equipment.

Feedback Training

Referring further to FIG. 1, the system 100 can include at least one feedback trainer 128 coupled with at least one feedback repository 124. The system 100 can use the feedback trainer 128 to increase the precision and/or accuracy of the outputs generated by the second models 116 according to feedback provided by users of the system 100 and/or the applications 120.

The feedback repository 124 can include feedback received from users regarding output presented by the applications 120. For example, for at least a subset of outputs presented by the applications 120, the applications 120 can present one or more user input elements for receiving feedback regarding the outputs. The user input elements can include, for example, indications of binary feedback regarding the outputs (e.g., good/bad feedback; feedback indicating the outputs do or do not meet the user's criteria, such as criteria regarding technical accuracy or precision); indications of multiple levels of feedback (e.g., scoring the outputs on a predetermined scale, such as a 1-5 scale or 1-10 scale); freeform feedback (e.g., text or audio feedback); or various combinations thereof.

The system 100 can store and/or maintain feedback in the feedback repository 124. In some implementations, the system 100 stores the feedback with one or more data elements associated with the feedback, including but not limited to the outputs for which the feedback was received, the second model(s) 116 used to generate the outputs, and/or input information used by the second models 116 to generate the outputs (e.g., service request information; information captured by the user regarding the item of equipment).

The feedback trainer 128 can update the one or more second models 116 using the feedback. The feedback trainer 128 can be similar to the model updater 108. In some implementations, the feedback trainer 128 is implemented by the model updater 108; for example, the model updater 108 can include or be coupled with the feedback trainer 128. The feedback trainer 128 can perform various configuration operations (e.g., retraining, fine-tuning, transfer learning, etc.) on the second models 116 using the feedback from the feedback repository 124. In some implementations, the feedback trainer 128 identifies one or more first parameters of the second model 116 to maintain as having predetermined values (e.g., freeze the weights and/or biases of one or more first layers of the second model 116), and performs a training process, such as a fine tuning process, to configure parameters of one or more second parameters of the second model 116 using the feedback (e.g., one or more second layers of the second model 116, such as output layers or output heads of the second model 116).

In some implementations, the system 100 may not include and/or use the model updater 108 (or the feedback trainer 128) to determine the second models 116. For example, the system 100 can include or be coupled with an output processor (e.g., an output processor similar or identical to accuracy checker 316 described with reference to FIG. 3) that can evaluate and/or modify outputs from the first model 104 prior to operation of applications 120, including to perform any of various post-processing operations on the output from the first model 104. For example, the output processor can compare outputs of the first model 104 with data from data sources 112 to validate the outputs of the first model 104 and/or modify the outputs of the first model 104 (or output an error) responsive to the outputs not satisfying a validation condition.

Connected Machine Learning Models

Referring further to FIG. 1, the second model 116 can be coupled with one or more third models, functions, or algorithms for training/configuration and/or runtime operations. The third models can include, for example and without limitation, any of various models relating to items of equipment, such as energy usage models, sustainability models, carbon models, air quality models, or occupant comfort models. For example, the second model 116 can be used to process unstructured information regarding items of equipment into predefined template formats compatible with various third models, such that outputs of the second model 116 can be provided as inputs to the third models; this can allow more accurate training of the third models, more training data to be generated for the third models, and/or more data available for use by the third models. The second model 116 can receive inputs from one or more third models, which can provide greater data to the second model 116 for processing.

Automated Service Scheduling and Provisioning

The system 100 can be used to automate operations for scheduling, provisioning, and deploying service technicians and resources for service technicians to perform service operations. For example, the system 100 can use at least one of the first model 104 or the second model 116 to determine, based on processing information regarding service operations for items of equipment relative to completion criteria for the service operation, particular characteristics of service operations such as experience parameters of scheduled service technicians, identifiers of parts provided for the service operations, geographical data, types of customers, types of problems, or information content provided to the service technicians to facilitate the service operation, where such characteristics correspond to the completion criteria being satisfied (e.g., where such characteristics correspond to an increase in likelihood of the completion criteria being satisfied relative to other characteristics for service technicians, parts, information content, etc.). For example, the system 100 can determine, for a given item of equipment, particular parts to include on a truck to be sent to the site of the item of equipment. As such, the system 100, responsive to processing inputs at runtime such as service requests, can automatically and more accurately identify service technicians and parts to direct to the item of equipment for the service operations. The system 100 can use timing information to perform batch scheduling for multiple service operations and/or multiple technicians for the same or multiple service operations. The system 100 can perform batch scheduling for multiple trucks for multiple items of equipment, such as to schedule a first one or more parts having a greater likelihood for satisfying the completion criteria for a first item of equipment on a first truck, and a second one or more parts having a greater likelihood for satisfying the completion criteria for a second item of equipment on a second truck.

Figure 2:
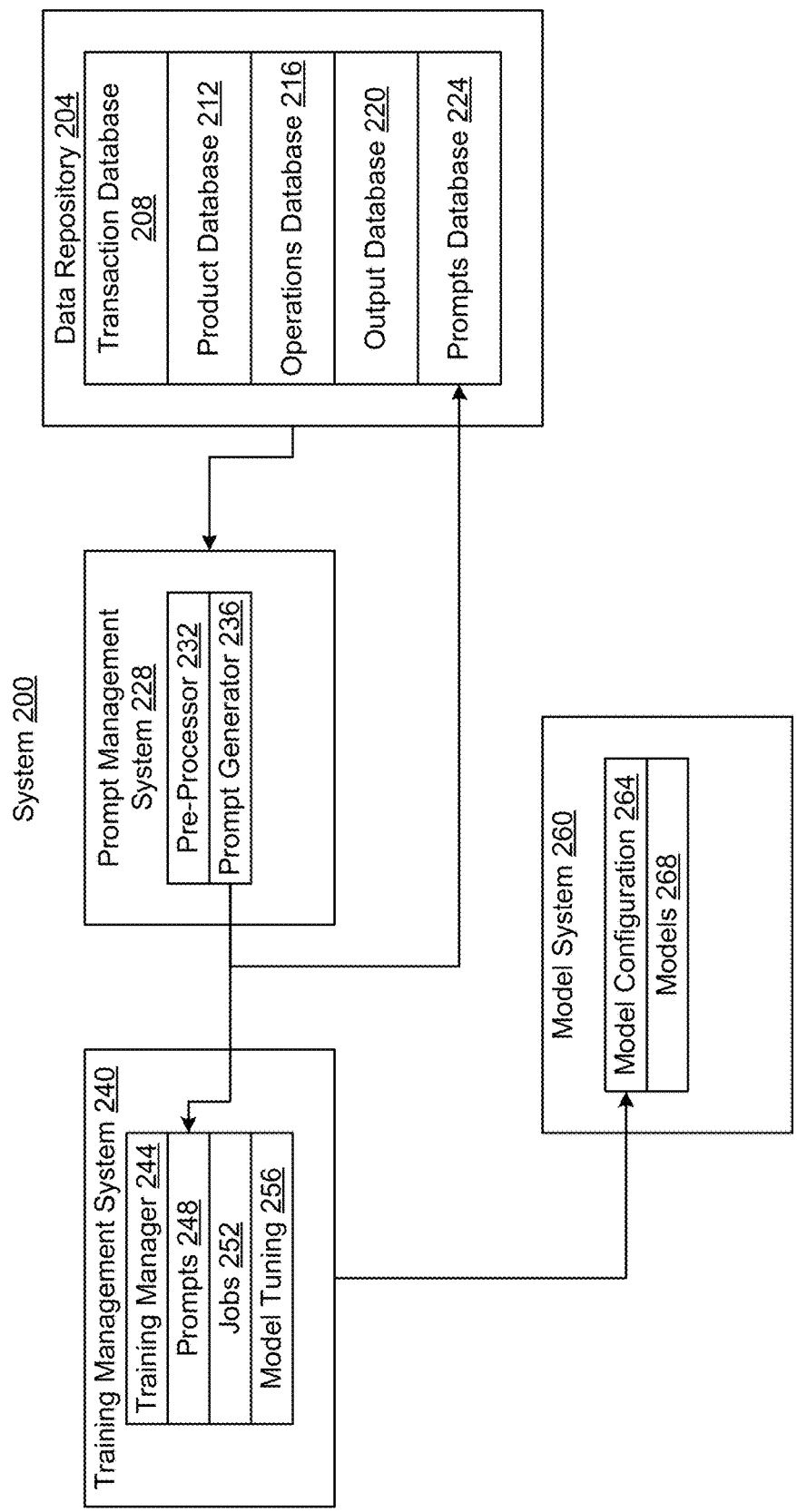
FIG. 2 is a block diagram of an example of a language model-based system for building applications.

II. System Architectures for Generative AI Applications for Building Management Systems FIG. 2 depicts an example of a system 200. The system 200 can include one or more components or features of the system 100, such as any one or more of the first model 104, data sources 112, second model 116, applications 120, feedback repository 124, and/or feedback trainer 128. The system 200 can perform specific operations to enable generative AI applications for building managements systems and equipment servicing, such as various manners of processing input data into training data (e.g., tokenizing input data; forming input data into prompts and/or completions), and managing training and other machine learning model configuration processes. Various components of the system 200 can be implemented using one or more computer systems, which may be provided on the same or different processors (e.g., processors communicatively coupled via wired and/or wireless connections).

The system 200 can include at least one data repository 204, which can be similar to the data sources 112 described with reference to FIG. 1. For example, the data repository 204 can include a transaction database 208, which can be similar or identical to one or more of warranty data or service data of data sources 112. For example, the transaction database 208 can include data such as parts used for service transactions; sales data indicating various service transactions or other transactions regarding items of equipment; warranty and/or claims data regarding items of equipment; and service data.

The data repository 204 can include a product database 212, which can be similar or identical to the parts data of the data sources 112. The product database 212 can include, for example, data regarding products available from various vendors, specifications or parameters regarding products, and indications of products used for various service operations. The products database 212 can include data such as events or alarms associated with products; logs of product operation; and/or time series data regarding product operation, such as longitudinal data values of operation of products and/or building equipment.

The data repository 204 can include an operations database 216, which can be similar or identical to the operations data of the data sources 112. For example, the operations database 216 can include data such as manuals regarding parts, products, and/or items of equipment; customer service data; and or reports, such as operation or service logs.

In some implementations, the data repository 204 can include an output database 220, which can include data of outputs that may be generated by various machine learning models and/or algorithms. For example, the output database 220 can include values of pre-calculated predictions and/or insights, such as parameters regarding operation items of equipment, such as setpoints, changes in setpoints, flow rates, control schemes, identifications of error conditions, or various combinations thereof.

As depicted in FIG. 2, the system 200 can include a prompt management system 228. The prompt management system 228 can include one or more rules, heuristics, logic, policies, algorithms, functions, machine learning models, neural networks, scripts, or various combinations thereof to perform operations including processing data from data repository 204 into training data for configuring various machine learning models. For example, the prompt management system 228 can retrieve and/or receive data from the data repository 228, and determine training data elements that include examples of input and outputs for generation by machine learning models, such as a training data element that includes a prompt and a completion corresponding to the prompt, based on the data from the data repository 228.

In some implementations, the prompt management system 228 includes a pre-processor 232. The pre-processor 232 can perform various operations to prepare the data from the data repository 204 for prompt generation. For example, the pre-processor 232 can perform any of various filtering, compression, tokenizing, or combining (e.g., combining data from various databases of the data repository 204) operations.

The prompt management system 228 can include a prompt generator 236. The prompt generator 236 can generate, from data of the data repository 204, one or more training data elements that include a prompt and a completion corresponding to the prompt. In some implementations, the prompt generator 236 receives user input indicative of prompt and completion portions of data. For example, the user input can indicate template portions representing prompts of structured data, such as predefined fields or forms of documents, and corresponding completions provided for the documents. The user input can assign prompts to unstructured data. In some implementations, the prompt generator 236 automatically determines prompts and completions from data of the data repository 204, such as by using any of various natural language processing algorithms to detect prompts and completions from data. In some implementations, the system 200 does not identify distinct prompts and completions from data of the data repository 204.

Referring further to FIG. 2, the system 200 can include a training management system 240. The training management system 240 can include one or more rules, heuristics, logic, policies, algorithms, functions, machine learning models, neural networks, scripts, or various combinations thereof to perform operations including controlling training of machine learning models, including performing fine tuning and/or transfer learning operations.

The training management system 240 can include a training manager 244. The training manager 244 can incorporate features of at least one of the model updater 108 or the feedback trainer 128 described with reference to FIG. 1. For example, the training manager 244 can provide training data including a plurality of training data elements (e.g., prompts and corresponding completions) to the model system 260 as described further herein to facilitate training machine learning models.

In some implementations, the training management system 240 includes a prompts database 248. For example, the training management system 240 can store one or more training data elements from the prompt management system 228, such as to facilitate asynchronous and/or batched training processes.

The training manager 244 can control the training of machine learning models using information or instructions maintained in a model tuning database 256. For example, the training manager 244 can store, in the model tuning database 256, various parameters or hyperparameters for models and/or model training.

In some implementations, the training manager 244 stores a record of training operations in a jobs database 252. For example, the training manager 244 can maintain data such as a queue of training jobs, parameters or hyperparameters to be used for training jobs, or information regarding performance of training.

Referring further to FIG. 2, the system 200 can include at least one model system 260 (e.g., one or more language model systems). The model system 260 can include one or more rules, heuristics, logic, policies, algorithms, functions, machine learning models, neural networks, scripts, or various combinations thereof to perform operations including configuring one or more machine learning models 268 based on instructions from the training management system 240. In some implementations, the training management system 240 implements the model system 260. In some implementations, the training management system 240 can access the model system 260 using one or more APIs, such as to provide training data and/or instructions for configuring machine learning models 268 via the one or more APIs. The model system 260 can operate as a service layer for configuring the machine learning models 268 responsive to instructions from the training management system 240. The machine learning models 268 can be or include the first model 104 and/or second model 116 described with reference to FIG. 1.

The model system 260 can include a model configuration processor 264. The model configuration processor 264 can incorporate features of the model updater 108 and/or the feedback trainer 128 described with reference to FIG. 1. For example, the model configuration processor 264 can apply training data (e.g., prompts 248 and corresponding completions) to the machine learning models 268 to configure (e.g., train, modify, update, fine-tune, etc.) the machine learning models 268. The training manager 244 can control training by the model configuration processor 264 based on model tuning parameters in the model tuning database 256, such as to control various hyperparameters for training. In various implementations, the system 200 can use the training management system 240 to configure the machine learning models 268 in a similar manner as described with reference to the second model 116 of FIG. 1, such as to train the machine learning models 268 using any of various data or combinations of data from the data repository 204.

Application Session Management

Figure 3:
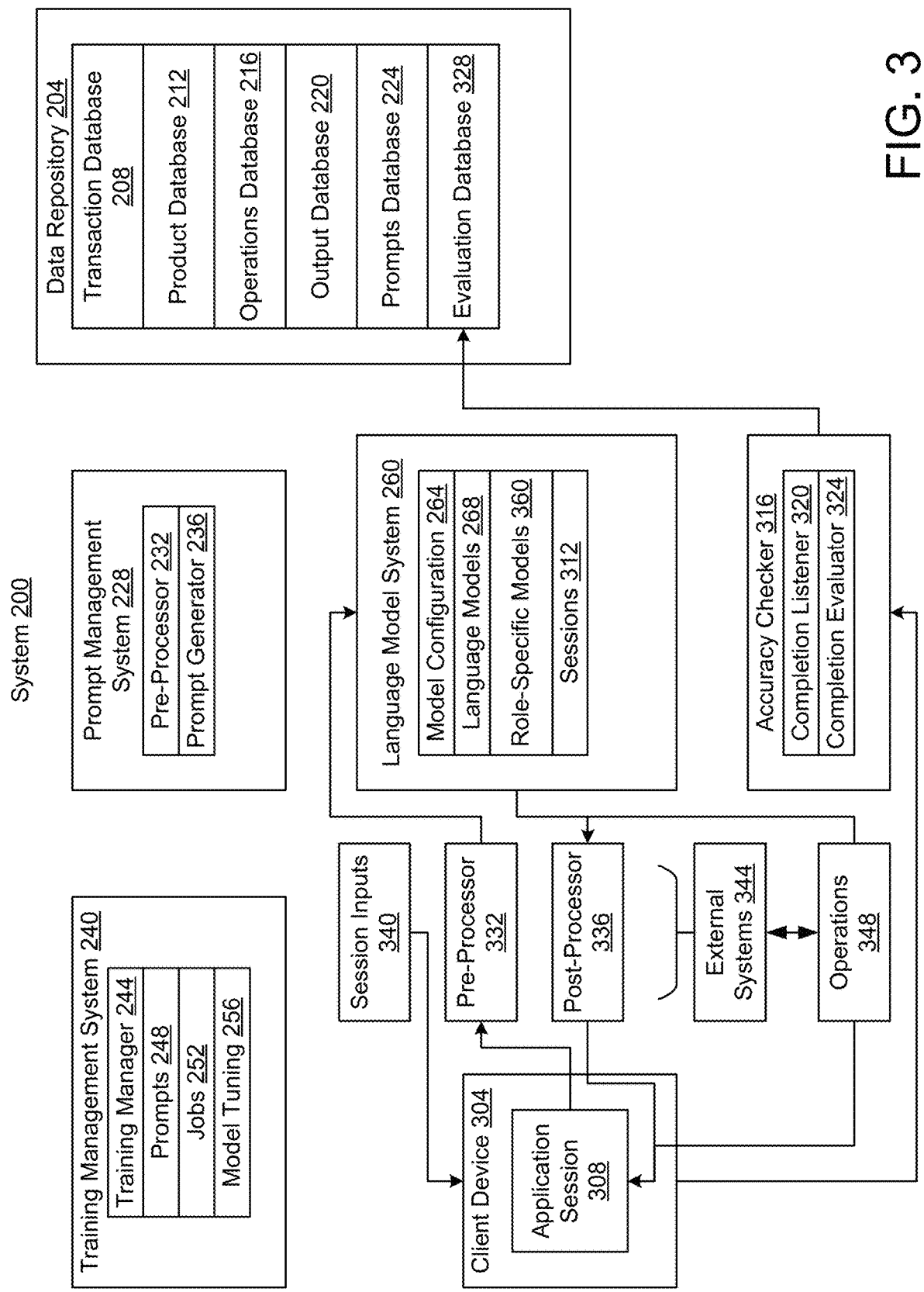
FIG. 3 is a block diagram of an example of the system of FIG. 2 including user application session components.

FIG. 3 depicts an example of the system 200, in which the system 200 can perform operations to implement at least one application session 308 for a client device 304. For example, responsive to configuring the machine learning models 268, the system 200 can generate data for presentation by the client device 304 (including generating data responsive to information received from the client device 304) using the at least one application session 308 and the one or more machine learning models 268.

The client device 304 can be a device of a user, such as a technician or building manager. The client device 304 can include any of various wireless or wired communication interfaces to communicate data with the model system 260, such as to provide requests to the model system 260 indicative of data for the machine learning models 268 to generate, and to receive outputs from the model system 260. The client device 304 can include various user input and output devices to facilitate receiving and presenting inputs and outputs.

In some implementations, the system 200 provides data to the client device 304 for the client device 304 to operate the at least one application session 308. The application session 308 can include a session corresponding to any of the applications 120 described with reference to FIG. 1. For example, the client device 304 can launch the application session 308 and provide an interface to request one or more prompts. Responsive to receiving the one or more prompts, the application session 308 can provide the one or more prompts as input to the machine learning model 268. The machine learning model 268 can process the input to generate a completion, and provide the completion to the application session 308 to present via the client device 304. In some implementations, the application session 308 can iteratively generate completions using the machine learning models 268. For example, the machine learning models 268 can receive a first prompt from the application session 308, determine a first completion based on the first prompt and provide the first completion to the application session 308, receive a second prompt from the application 308, determine a second completion based on the second prompt (which may include at least one of the first prompt or the first completion concatenated to the second prompt), and provide the second completion to the application session 308.

In some implementations, the application session 308 maintains a session state regarding the application session 308. The session state can include one or more prompts received by the application session 308, and can include one or more completions received by the application session 308 from the model system 260. The session state can include one or more items of feedback received regarding the completions, such as feedback indicating accuracy of the completion.

The system 200 can include or be coupled with one or more session inputs 340 or sources thereof. The session inputs 340 can include, for example and without limitation, location-related inputs, such as identifiers of an entity managing an item of equipment or a building or building management system, a jurisdiction (e.g., city, state, country, etc.), a language, or a policy or configuration associated with operation of the item of equipment, building, or building management system. The session inputs 340 can indicate an identifier of the user of the application session 308. The session inputs 340 can include data regarding items of equipment or building management systems, including but not limited to operation data or sensor data. The session inputs 340 can include information from one or more applications, algorithms, simulations, neural networks, machine learning models, or various combinations thereof, such as to provide analyses, predictions, or other information regarding items of equipment. The session inputs 340 can data from or analogous to the data of the data repository 204.

In some implementations, the model system 260 includes at least one sessions database 312. The sessions database 312 can maintain records of application session 308 implemented by client devices 304. For example, the sessions database 312 can include records of prompts provided to the machine learning models 268 and completions generated by the machine learning models 268. As described further with reference to FIG. 4, the system 200 can use the data in the sessions database 312 to fine-tune or otherwise update the machine learning models 268. The sessions database 312 can include one or more session states of the application session 308.

As depicted in FIG. 3, the system 200 can include at least on pre-processor 332. The pre-processor 332 can evaluate the prompt according to one or more criteria and pass the prompt to the model system 260 responsive to the prompt satisfying the one or more criteria, or modify or flag the prompt responsive to the prompt not satisfying the one or more criteria. The pre-processor 332 can compare the prompt with any of various predetermined prompts, thresholds, outputs of algorithms or simulations, or various combinations thereof to evaluate the prompt. The pre-processor 332 can provide the prompt to an expert system (e.g., expert system 700 described with reference to FIG. 7) for evaluation. The pre-processor 332 (and/or post-processor 336 described below) can be made separate from the application session 308 and/or model system 260, which can modularize overall operation of the system 200 to facilitate regression testing or otherwise enable more effective software engineering processes for debugging or otherwise improving operation of the system 200. The pre-processor 332 can evaluate the prompt according to values (e.g., numerical or semantic/text values) or thresholds for values to filter out of domain inputs, such as inputs targeted for jail-breaking the system 200 or components thereof, or filter out values that do not match target semantic concepts for the system 200.

Completion Checking

In some implementations, the system 200 includes an accuracy checker 316. The accuracy checker 316 can include one or more rules, heuristics, logic, policies, algorithms, functions, machine learning models, neural networks, scripts, or various combinations thereof to perform operations including evaluating performance criteria regarding the completions determined by the model system 260. For example, the accuracy checker 316 can include at least one completion listener 320. The completion listener 320 can receive the completions determined by the model system 320 (e.g., responsive to the completions being generated by the machine learning model 268 and/or by retrieving the completions from the sessions database 312).

The accuracy checker 316 can include at least one completion evaluator 324. The completion evaluator 324 can evaluate the completions (e.g., as received or retrieved by the completion listener 320) according to various criteria. In some implementations, the completion evaluator 324 evaluates the completions by comparing the completions with corresponding data from the data repository 204. For example, the completion evaluator 324 can identify data of the data repository 204 having similar text as the prompts and/or completions (e.g., using any of various natural language processing algorithms), and determine whether the data of the completions is within a range of expected data represented by the data of the data repository 204.

In some implementations, the accuracy checker 316 can store an output from evaluating the completion (e.g., an indication of whether the completion satisfies the criteria) in an evaluation database 328. For example, the accuracy checker 316 can assign the output (which may indicate at least one of a binary indication of whether the completion satisfied the criteria or an indication of a portion of the completion that did not satisfy the criteria) to the completion for storage in the evaluation database 328, which can facilitate further training of the machine learning models 268 using the completions and output.

The accuracy checker 316 can include or be coupled with at least one post-processor 336. The post-processor 336 can perform various operations to evaluate, validate, and/or modify the completions generated by the model system 260. In some implementations, the post-processor 336 includes or is coupled with data filters 500, validation system 600, and/or expert system 700 described with reference to FIGS. 5-7. The post-processor 336 can operate with one or more of the accuracy checker 316, external systems 344, operations data 348, and/or role models 360 to query databases, knowledge bases, or run simulations that are granular, reliable, and/or transparent.

Referring further to FIG. 3, the system 200 can include or be coupled with one or more external systems 344. The external systems 344 can include any of various data sources, algorithms, machine learning models, simulations, internet data sources, or various combinations thereof. The external systems 344 can be queried by the system 200 (e.g., by the model system 260) or the pre-processor 332 and/or post-processor 336, such as to identify thresholds or other baseline or predetermined values or semantic data to use for validating inputs to and/or outputs from the model system 260. The external systems 344 can include, for example and without limitation, documentation sources associated with an entity that manages items of equipment.

The system 200 can include or be coupled with operations data 348. The operations data 348 can be part of or analogous to one or more data sources of the data repository 204. The operations data 348 can include, for example and without limitation, data regarding real-world operations of building management systems and/or items of equipment, such as changes in building policies, building states, ticket or repair data, results of servicing or other operations, performance indices, or various combinations thereof. The operations data 348 can be retrieved by the application session 308, such as to condition or modify prompts and/or requests for prompts on operations data 348.

Role-Specific Machine Learning Models

As depicted in FIG. 3, in some implementations, the models 268 can include or otherwise be implemented as one or more role-specific models 360. The models 360 can be configured using training data (and/or have tuned hyperparameters) representative of particular tasks associated with generating accurate completions for the application sessions 308 such as to perform iterative communication of various language model job roles to refine results internally to the model system 260 (e.g., before/after communicating inputs/outputs with the application session 308), such as to validate completions and/or check confidence levels associated with completions. By incorporating distinct models 360 (e.g., portions of neural networks and/or distinct neural networks) configured according to various roles, the models 360 can more effectively generate outputs to satisfy various objectives/key results.

For example, the role-specific models 360 can include one or more of an author model 360, an editor model 360, a validator model 360, or various combinations thereof. The author model 360 can be used to generate an initial or candidate completion, such as to receive the prompt (e.g., via pre-processor 332) and generate the initial completion responsive to the prompt. The editor model 360 and/or validator model 360 can apply any of various criteria, such as accuracy checking criteria, to the initial completion, to validate or modify (e.g., revise) the initial completion. For example, the editor model 360 and/or validator model 360 can be coupled with the external systems 344 to query the external systems 344 using the initial completion (e.g., to detect a difference between the initial completion and one or more expected values or ranges of values for the initial completion), and at least one of output an alert or modify the initial completion (e.g., directly or by identifying at least a portion of the initial completion for the author model 360 to regenerate). In some implementations, at least one of the editor model 360 or the validator model 360 are tuned with different hyperparameters from the author model 360, or can adjust the hyperparameter(s) of the author model 360, such as to facilitate modifying the initial completion using a model having a higher threshold for confidence of outputted results responsive to the at least one of the editor model 360 or the validator model 360 determining that the initial completion does not satisfy one or more criteria. In some implementations, the at least one of the editor model 360 or the validator model 360 is tuned to have a different (e.g., lower) risk threshold than the author model 360, which can allow the author model 360 to generate completions that may fall into a greater domain/range of possible values, while the at least one of the editor model 360 or the validator model 360 can refine the completions (e.g., limit refinement to specific portions that do not meet the thresholds) generated by the author model 360 to fall within appropriate thresholds (e.g., rather than limiting the threshold for the author model 360).

For example, responsive to the validator model 360 determining that the initial completion includes a value (e.g., setpoint to meet a target value of a performance index) that is outside of a range of values validated by a simulation for an item of equipment, the validator model 360 can cause the author model 360 to regenerate at least a portion of the initial completion that includes the value; such regeneration may include increasing a confidence threshold for the author model 360. The validator model 360 can query the author model 360 for a confidence level associated with the initial completion, and cause the author model 360 to regenerate the initial completion and/or generate additional completions responsive to the confidence level not satisfying a threshold. The validator model 360 can query the author model 360 regarding portions (e.g., granular portions) of the initial completion, such as to request the author model 360 to divide the initial completion into portions, and separately evaluate each of the portions. The validator model 360 can convert the initial completion into a vector, and use the vector as a key to perform a vector concept lookup to evaluate the initial completion against one or more results retrieved using the key.

Feedback Training

Figure 4:
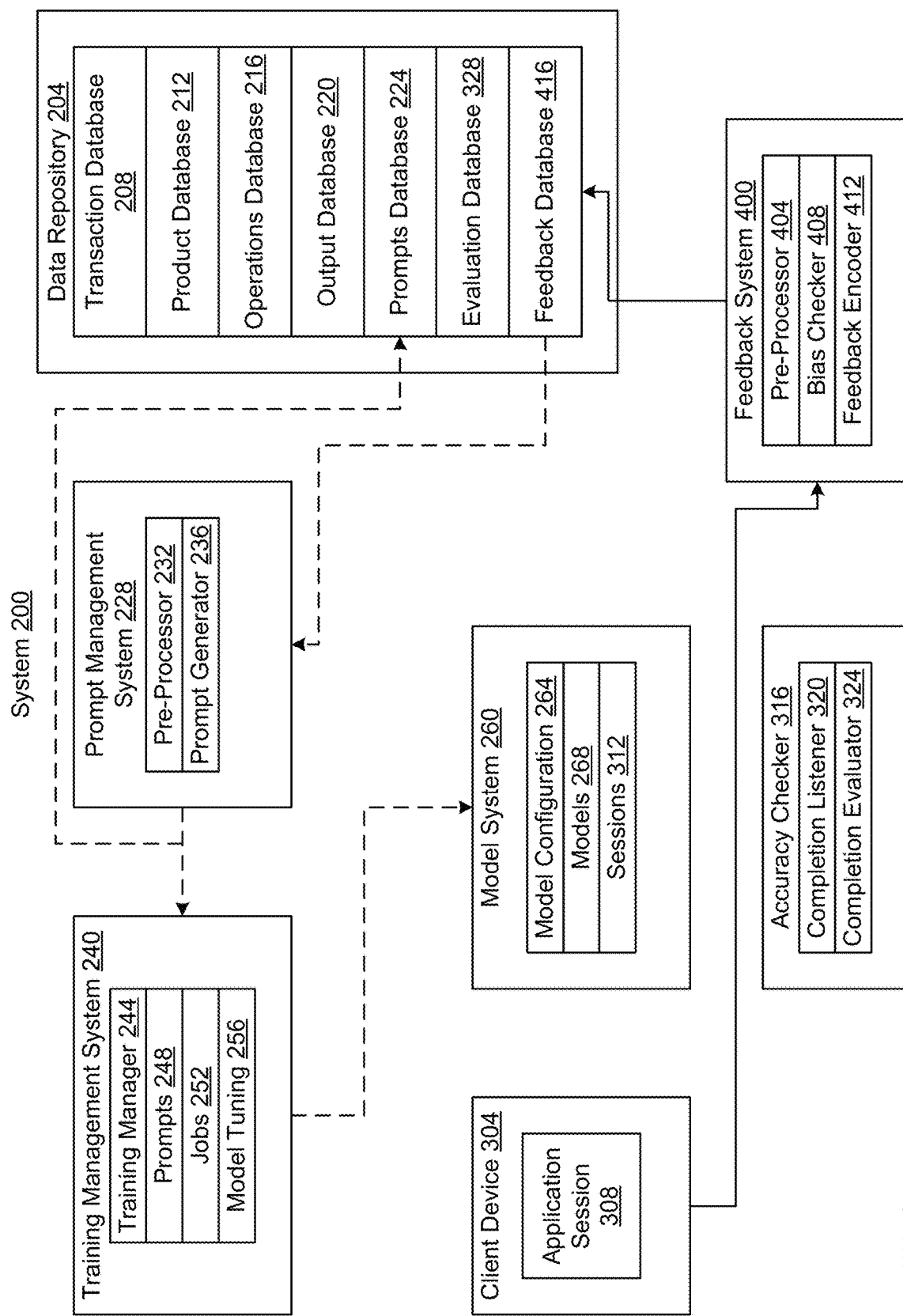
FIG. 4 is a block diagram of an example of the system of FIG. 2 including feedback training components.

FIG. 4 depicts an example of the system 200 that includes a feedback system 400, such as a feedback aggregator. The feedback system 400 can include one or more rules, heuristics, logic, policies, algorithms, functions, machine learning models, neural networks, scripts, or various combinations thereof to perform operations including preparing data for updating and/or updating the machine learning models 268 using feedback corresponding to the application sessions 308, such as feedback received as user input associated with outputs presented by the application sessions 308. The feedback system 400 can incorporate features of the feedback repository 124 and/or feedback trainer 128 described with reference to FIG. 1.

The feedback system 400 can receive feedback (e.g., from the client device 304) in various formats. For example, the feedback can include any of text, speech, audio, image, and/or video data. The feedback can be associated (e.g., in a data structure generated by the application session 308) with the outputs of the machine learning models 268 for which the feedback is provided. The feedback can be received or extracted from various forms of data, including external data sources such as manuals, service reports, or Wikipedia-type documentation.

In some implementations, the feedback system 400 includes a pre-processor 400. The pre-processor 400 can perform any of various operations to modify the feedback for further processing. For example, the pre-processor 400 can incorporate features of, or be implemented by, the pre-processor 232, such as to perform operations including filtering, compression, tokenizing, or translation operations (e.g., translation into a common language of the data of the data repository 204).

The feedback system 400 can include a bias checker 408. The bias checker 408 can evaluate the feedback using various bias criteria, and control inclusion of the feedback in a feedback database 416 (e.g., a feedback database 416 of the data repository 204 as depicted in FIG. 4) according to the evaluation. The bias criteria can include, for example and without limitation, criteria regarding qualitative and/or quantitative differences between a range or statistic measure of the feedback relative to actual, expected, or validated values.

The feedback system 400 can include a feedback encoder 412. The feedback encoder 412 can process the feedback (e.g., responsive to bias checking by the bias checker 408) for inclusion in the feedback database 416. For example, the feedback encoder 412 can encode the feedback as values corresponding to outputs scoring determined by the model system 260 while generating completions (e.g., where the feedback indicates that the completion presented via the application session 308 was acceptable, the feedback encoder 412 can encode the feedback by associating the feedback with the completion and assigning a relatively high score to the completion).

As indicated by the dashed arrows in FIG. 4, the feedback can be used by the prompt management system 228 and training management system 240 to further update one or more machine learning models 268. For example, the prompt management system 228 can retrieve at least one feedback (and corresponding prompt and completion data) from the feedback database 416, and process the at least one feedback to determine a feedback prompt and feedback completion to provide to the training management system 240 (e.g., using pre-processor 232 and/or prompt generator 236, and assigning a score corresponding to the feedback to the feedback completion). The training manager 244 can provide instructions to the model system 260 to update the machine learning models 268 using the feedback prompt and the feedback completion, such as to perform a fine-tuning process using the feedback prompt and the feedback completion. In some implementations, the training management system 240 performs a batch process of feedback-based fine tuning by using the prompt management system 228 to generate a plurality of feedback prompts and a plurality of feedback completion, and providing instructions to the model system 260 to perform the fine-tuning process using the plurality of feedback prompts and the plurality of feedback completions.

Data Filtering and Validation Systems

Figure 5:
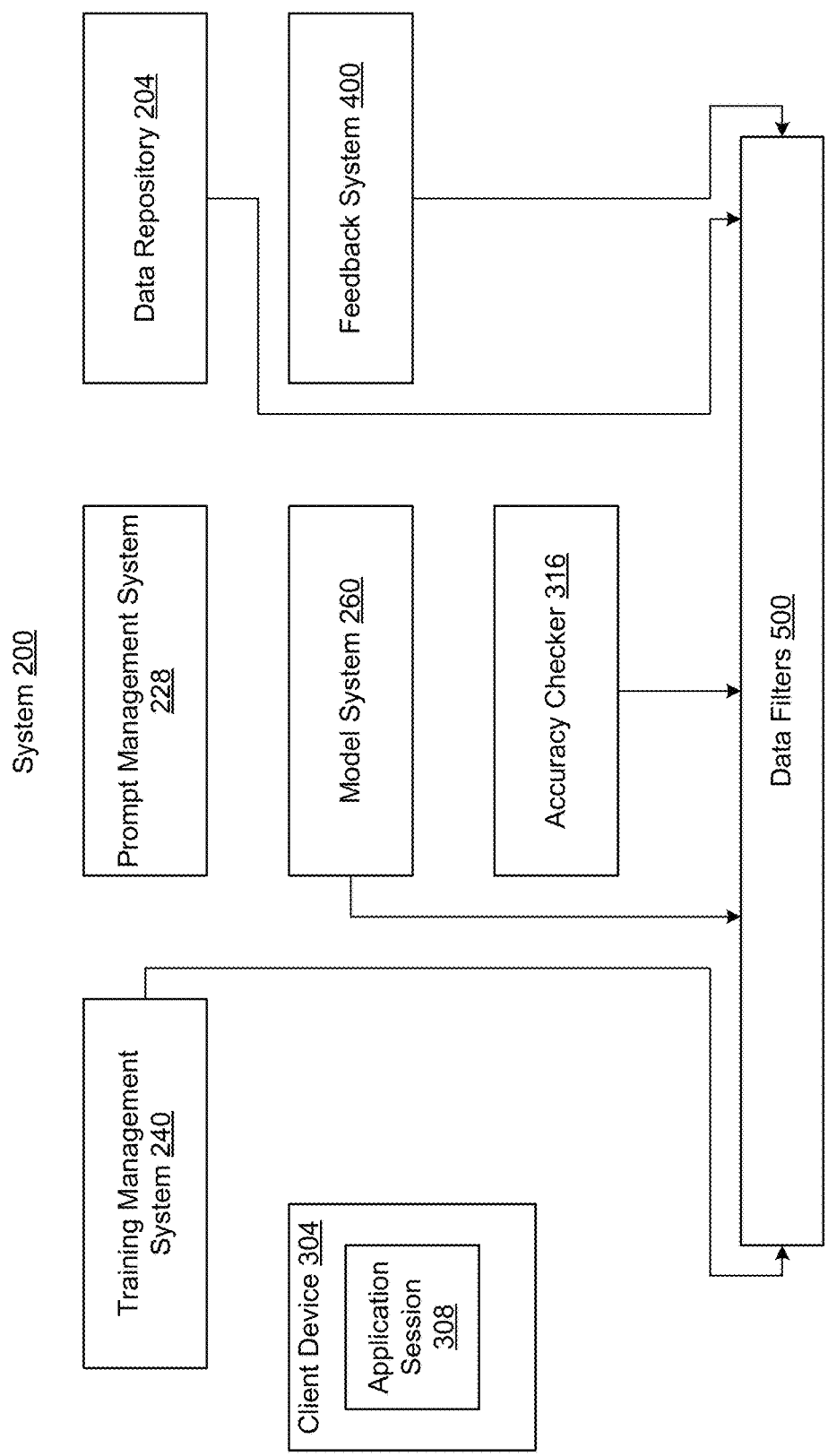
FIG. 5 is a block diagram of an example of the system of FIG. 2 including data filters.

FIG. 5 depicts an example of the system 200, where the system 200 can include one or more data filters 500 (e.g., data validators). The data filters 500 can include any one or more rules, heuristics, logic, policies, algorithms, functions, machine learning models, neural networks, scripts, or various combinations thereof to perform operations including modifying data processed by the system 200 and/or triggering alerts responsive to the data not satisfying corresponding criteria, such as thresholds for values of data. Various data filtering processes described with reference to FIG. 5 (as well as FIGS. 6 and 7) can enable the system 200 to implement timely operations for improving the precision and/or accuracy of completions or other information generated by the system 200 (e.g., including improving the accuracy of feedback data used for fine-tuning the machine learning models 268). The data filters 500 can allow for interactions between various algorithms, models, and computational processes.

For example, the data filters 500 can be used to evaluate data relative to thresholds relating to data including, for example and without limitation, acceptable data ranges, setpoints, temperatures, pressures, flow rates (e.g., mass flow rates), or vibration rates for an item of equipment. The threshold can include any of various thresholds, such as one or more of minimum, maximum, absolute, relative, fixed band, and/or floating band thresholds.

The data filters 500 can enable the system 200 to detect when data, such as prompts, completions, or other inputs and/or outputs of the system 200, collide with thresholds that represent realistic behavior or operation or other limits of items of equipment. For example, the thresholds of the data filters 500 can correspond to values of data that are within feasible or recommended operating ranges. In some implementations, the system 200 determines or receives the thresholds using models or simulations of items of equipment, such as plant or equipment simulators, chiller models, HVAC-R models, refrigeration cycle models, etc. The system 200 can receive the thresholds as user input (e.g., from experts, technicians, or other users). The thresholds of the data filters 500 can be based on information from various data sources. The thresholds can include, for example and without limitation, thresholds based on information such as equipment limitations, safety margins, physics, expert teaching, etc. For example, the data filters 500 can include thresholds determined from various models, functions, or data structures (e.g., tables) representing physical properties and processes, such as physics of psychometrics, thermodynamics, and/or fluid dynamics information.

The system 200 can determine the thresholds using the feedback system 400 and/or the client device 304, such as by providing a request for feedback that includes a request for a corresponding threshold associated with the completion and/or prompt presented by the application session 308. For example, the system 200 can use the feedback to identify realistic thresholds, such as by using feedback regarding data generated by the machine learning models 268 for ranges, setpoints, and/or start-up or operating sequences regarding items of equipment (and which can thus be validated by human experts). In some implementations, the system 200 selectively requests feedback indicative of thresholds based on an identifier of a user of the application session 308, such as to selectively request feedback from users having predetermined levels of expertise and/or assign weights to feedback according to criteria such as levels of expertise.

In some implementations, one or more data filters 500 correspond to a given setup. For example, the setup can represent a configuration of a corresponding item of equipment (e.g., configuration of a chiller, etc.). The data filters 500 can represent various thresholds or conditions with respect to values for the configuration, such as feasible or recommendation operating ranges for the values. In some implementations, one or more data filters 500 correspond to a given situation. For example, the situation can represent at least one of an operating mode or a condition of a corresponding item of equipment.

FIG. 5 depicts some examples of data (e.g., inputs, outputs, and/or data communicated between nodes of machine learning models 268) to which the data filters 500 can be applied to evaluate data processed by the system 200 including various inputs and outputs of the system 200 and components thereof. This can include, for example and without limitation, filtering data such as data communicated between one or more of the data repository 204, prompt management system 228, training management system 240, model system 260, client device 304, accuracy checker 316, and/or feedback system 400. For example, the data filters 500 (as well as validation system 600 described with reference to FIG. 6 and/or expert filter collision system 700 described with reference to FIG. 7) can receive data outputted from a source (e.g., source component) of the system 200 for receipt by a destination (e.g., destination component) of the system 200, and filter, modify, or otherwise process the outputted data prior to the system 200 providing the outputted data to the destination. The sources and destinations can include any of various combinations of components and systems of the system 200.

The system 200 can perform various actions responsive to the processing of data by the data filters 500. In some implementations, the system 200 can pass data to a destination without modifying the data (e.g., retaining a value of the data prior to evaluation by the data filter 500) responsive to the data satisfying the criteria of the respective data filter(s) 500. In some implementations, the system 200 can at least one of (i) modify the data or (ii) output an alert responsive to the data not satisfying the criteria of the respective data filter(s) 500. For example, the system 200 can modify the data by modifying one or more values of the data to be within the criteria of the data filters 500.

In some implementations, the system 200 modifies the data by causing the machine learning models 268 to regenerate the completion corresponding to the data (e.g., for up to a predetermined threshold number of regeneration attempts before triggering the alert). This can enable the data filters 500 and the system 200 selectively trigger alerts responsive to determining that the data (e.g., the collision between the data and the thresholds of the data filters 500) may not be repairable by the machine learning model 268 aspects of the system 200.

The system 200 can output the alert to the client device 304. The system 200 can assign a flag corresponding to the alert to at least one of the prompt (e.g., in prompts database 224) or the completion having the data that triggered the alert.

Figure 6:
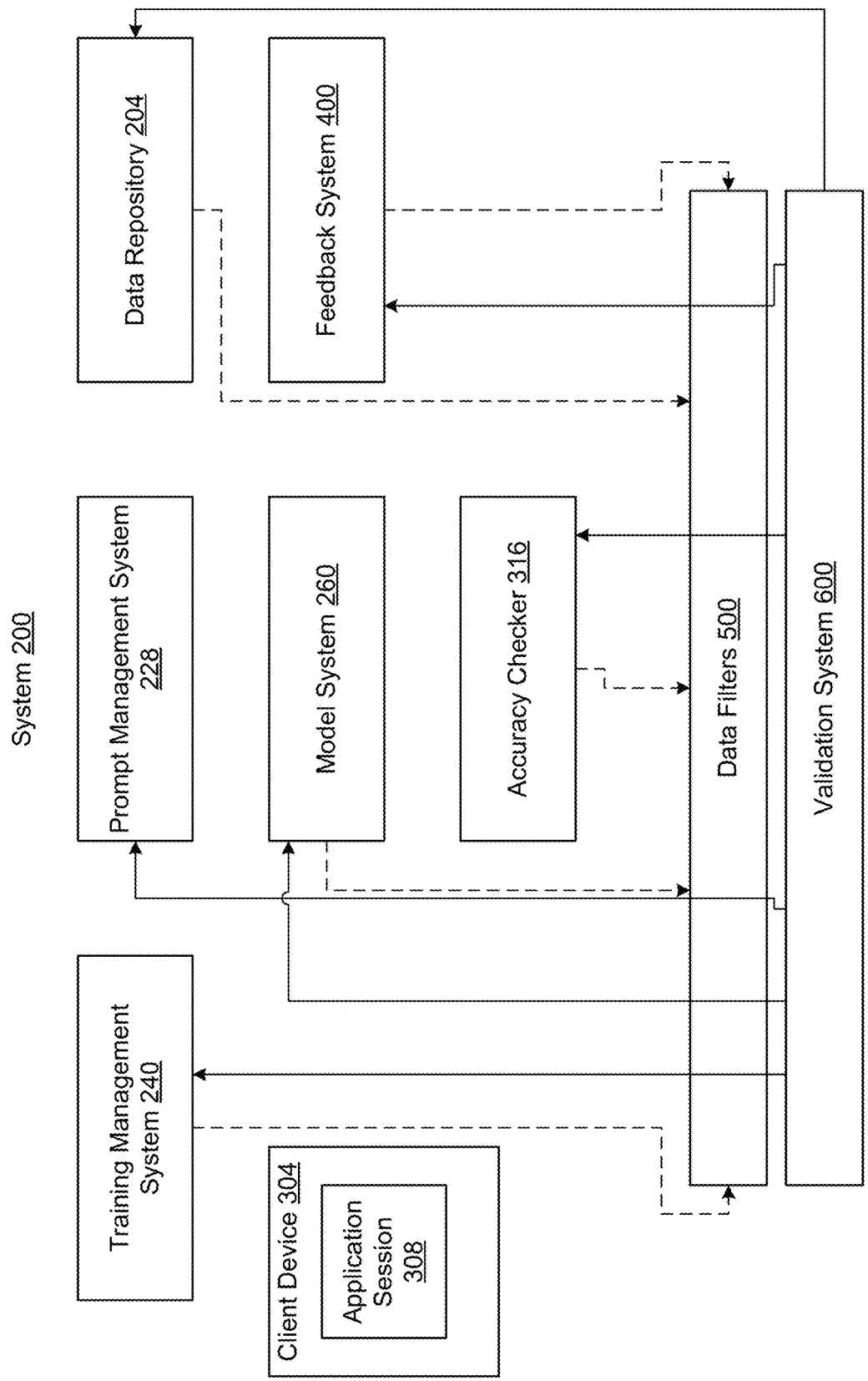
FIG. 6 is a block diagram of an example of the system of FIG. 2 including data validation components.

FIG. 6 depicts an example of the system 200, in which a validation system 600 is coupled with one or more components of the system 200, such as to process and/or modify data communicated between the components of the system 200. For example, the validation system 600 can provide a validation interface for human users (e.g., expert supervisors, checkers) and/or expert systems (e.g., data validation systems that can implement processes analogous to those described with reference to the data filters 500) to receive data of the system 200 and modify, validate, or otherwise process the data. For example, the validation system 600 can provide to human expert supervisors, human checkers, and/or expert systems various data of the system 200, receive responses to the provided data indicating requested modifications to the data or validations of the data, and modify (or validate) the provided data according to the responses.

For example, the validation system 600 can receive data such as data retrieved from the data repository 204, prompts outputted by the prompt management system 228, completions outputted by the model system 260, indications of accuracy outputted by the accuracy checker 316, etc., and provide the received data to at least one of an expert system or a user interface. In some implementations, the validation system 600 receives a given item of data prior to the given item of data being processed by the model system 260, such as to validate inputs to the machine learning models 268 prior to the inputs being processed by the machine learning models 268 to generate outputs, such as completions.

In some implementations, the validation system 600 validates data by at least one of (i) assigning a label (e.g., a flag, etc.) to the data indicating that the data is validated or (ii) passing the data to a destination without modifying the data. For example, responsive to receiving at least one of a user input (e.g., from a human validator/supervisor/expert) that the data is valid or an indication from an expert system that the data is valid, the validation system 600 can assign the label and/or provide the data to the destination.

The validation system 600 can selectively provide data from the system 200 to the validation interface responsive to operation of the data filters 500. This can enable the validation system 600 to trigger validation of the data responsive to collision of the data with the criteria of the data filters 500. For example, responsive to the data filters 500 determining that an item of data does not satisfy a corresponding criteria, the data filters 500 can provide the item of data to the validation system 600. The data filters 500 can assign various labels to the item of data, such as indications of the values of the thresholds that the data filters 500 used to determine that the item of data did not satisfy the thresholds. Responsive to receiving the item of data from the data filters 500, the validation system 600 can provide the item of data to the validation interface (e.g., to a user interface of client device 304 and/or application session 308; for comparison with a model, simulation, algorithm, or other operation of an expert system) for validation. In some implementations, the validation system 600 can receive an indication that the item of data is valid (e.g., even if the item of data did not satisfy the criteria of the data filters 500) and can provide the indication to the data filters 500 to cause the data filters 500 to at least partially modify the respective thresholds according to the indication.

In some implementations, the validation system 600 selectively retrieves data for validation where (i) the data is determined or outputted prior to use by the machine learning models 268, such as data from the data repository 204 or the prompt management system 228, or (ii) the data does not satisfy a respective data filter 500 that processes the data. This can enable the system 200, the data filters 500, and the validation system 600 to update the machine learning models 268 and other machine learning aspects (e.g., generative AI aspects) of the system 200 to more accurately generate data and completions (e.g., enabling the data filters 500 to generate alerts that are received by the human experts/expert systems that may be repairable by adjustments to one or more components of the system 200).

Figure 7:
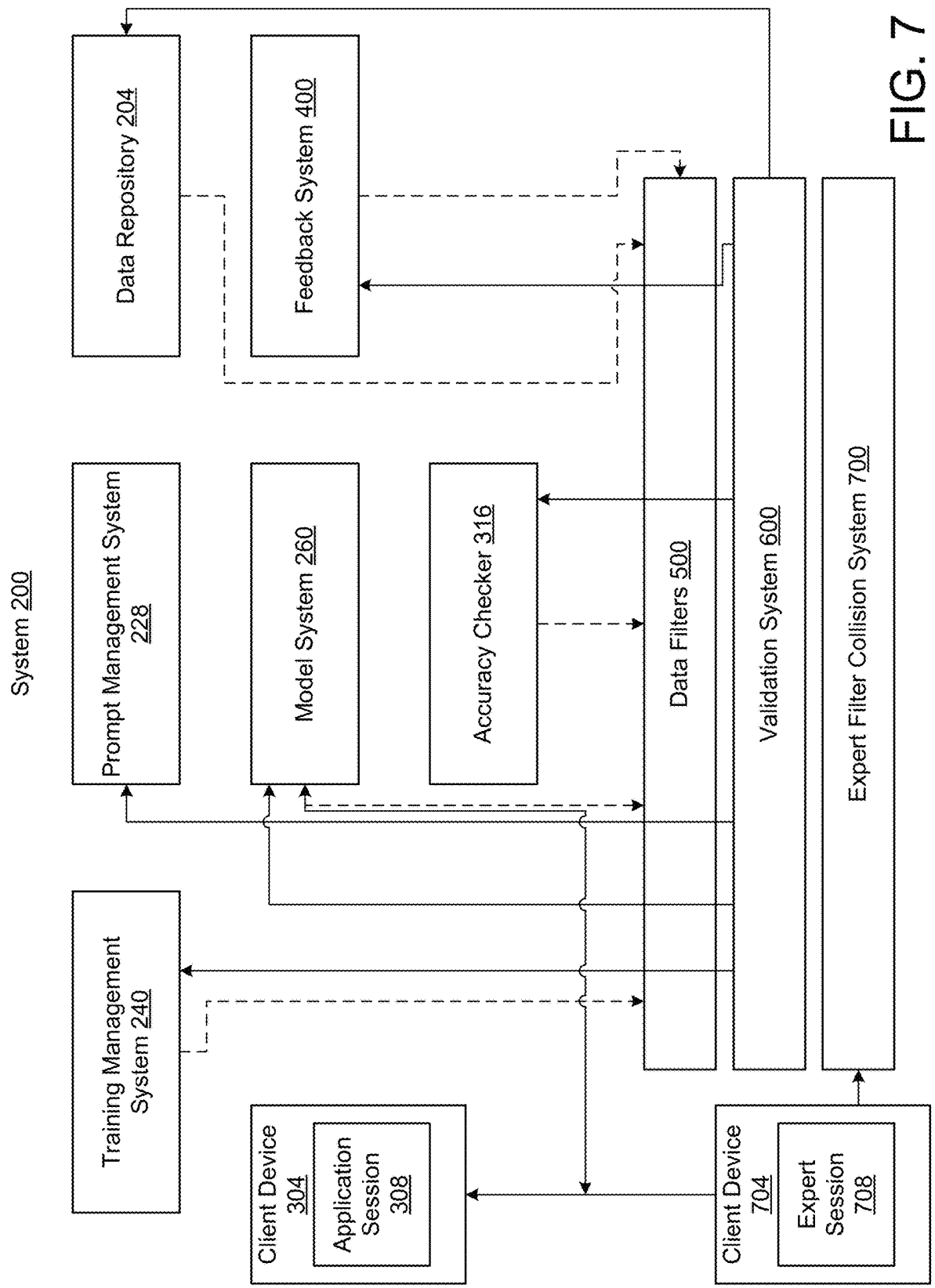
FIG. 7 is a block diagram of an example of the system of FIG. 2 including expert review and intervention components.

FIG. 7 depicts an example of the system 200, in which an expert filter collision system 700 ("expert system" 700) can facilitate providing feedback and providing more accurate and/or precise data and completions to a user via the application session 308. For example, the expert system 700 can interface with various points and/or data flows of the system 200, as depicted in FIG. 7, where the system 200 can provide data to the expert filter collision system 700, such as to transmit the data to a user interface and/or present the data via a user interface of the expert filter collision system 700 that can accessed via an expert session 708 of a client device 704. For example, via the expert session 708, the expert session 700 can enable functions such as receiving inputs for a human expert to provide feedback to a user of the client device 304; a human expert to guide the user through the data (e.g., completions) provided to the client device 304, such as reports, insights, and action items; a human expert to review and/or provide feedback for revising insights, guidance, and recommendations before being presented by the application session 308; a human expert to adjust and/or validate insights or recommendations before they are viewed or used for actions by the user; or various combinations thereof. In some implementations, the expert system 700 can use feedback received via the expert session as inputs to update the machine learning models 268 (e.g., to perform fine-tuning).

In some implementations, the expert system 700 retrieves data to be provided to the application session 308, such as completions generated by the machine learning models 268. The expert system 700 can present the data via the expert session 708, such as to request feedback regarding the data from the client device 704. For example, the expert system 700 can receive feedback regarding the data for modifying or validating the data (e.g., editing or validating completions). In some implementations, the expert system 700 requests at least one of an identifier or a credential of a user of the client device 704 prior to providing the data to the client device 704 and/or requesting feedback regarding the data from the expert session 708. For example, the expert system 700 can request the feedback responsive to determining that the at least one of the identifier or the credential satisfies a target value for the data. This can allow the expert system 708 to selectively identify experts to use for monitoring and validating the data.

In some implementations, the expert system 700 facilitates a communication session regarding the data, between the application session 308 and the expert session 708. For example, the expert session 700, responsive to detecting presentation of the data via the application session 308, can request feedback regarding the data (e.g., user input via the application session 308 for feedback regarding the data), and provide the feedback to the client device 704 to present via the expert session 708. The expert session 708 can receive expert feedback regarding at least one of the data or the feedback from the user to provide to the application session 308. In some implementations, the expert system 700 can facilitate any of various real-time or asynchronous messaging protocols between the application session 308 and expert session 708 regarding the data, such as any of text, speech, audio, image, and/or video communications or combinations thereof. This can allow the expert system 700 to provide a platform for a user receiving the data (e.g., customer or field technician) to receive expert feedback from a user of the client device 704 (e.g., expert technician). In some implementations, the expert system 700 stores a record of one or more messages or other communications between the sessions 308, 708 in the data repository 204 to facilitate further configuration of the machine learning models 268 based on the interactions between the users of the sessions 308, 708.

Building Data Platforms and Digital Twin Architectures

Referring further to FIGS. 1-7, various systems and methods described herein can be executed by and/or communicate with building data platforms, including data platforms of building management systems. For example, the data repository 204 can include or be coupled with one or more building data platforms, such as to ingest data from building data platforms and/or digital twins. The client device 304 can communicate with the system 200 via the building data platform, and can feedback, reports, and other data to the building data platform. In some implementations, the data repository 204 maintains building data platform-specific databases, such as to enable the system 200 to configure the machine learning models 268 on a building data platform-specific basis (or on an entity-specific basis using data from one or more building data platforms maintained by the entity).

For example, in some implementations, various data discussed herein may be stored in, retrieved from, or processed in the context of building data platforms and/or digital twins; processed at (e.g., processed using models executed at) a cloud or other off-premises computing system/device or group of systems/devices, an edge or other on-premises system/device or group of systems/devices, or a hybrid thereof in which some processing occurs off-premises and some occurs on-premises; and/or implemented using one or more gateways for communication and data management amongst various such systems/devices. In some such implementations, the building data platforms and/or digital twins may be provided within an infrastructure such as those described in U.S. patent application Ser. No. 17/134,661 filed Dec. 28, 2020, Ser. No. 18/080,360, filed Dec. 13, 2022, Ser. No. 17/537,046 filed Nov. 29, 2021, and Ser. No. 18/096,965, filed Jan. 13, 2023, and Indian Patent Application number 202341008712, filed Feb. 10, 2023, the disclosures of which are incorporated herein by reference in their entireties.

III. Generative AI-Based Systems and Methods for Building Management

As described above, some systems and methods in accordance with the present disclosure can use machine learning models, including LLMs and other generative AI models, to ingest data regarding building management systems and equipment in various unstructured and structured formats, and generate completions and other outputs targeted to provide useful information to users. Various systems and methods described herein can use machine learning models to support applications for presenting data with high accuracy and relevance.

Implementing GAI Architectures for Building Management Systems

Figure 8:
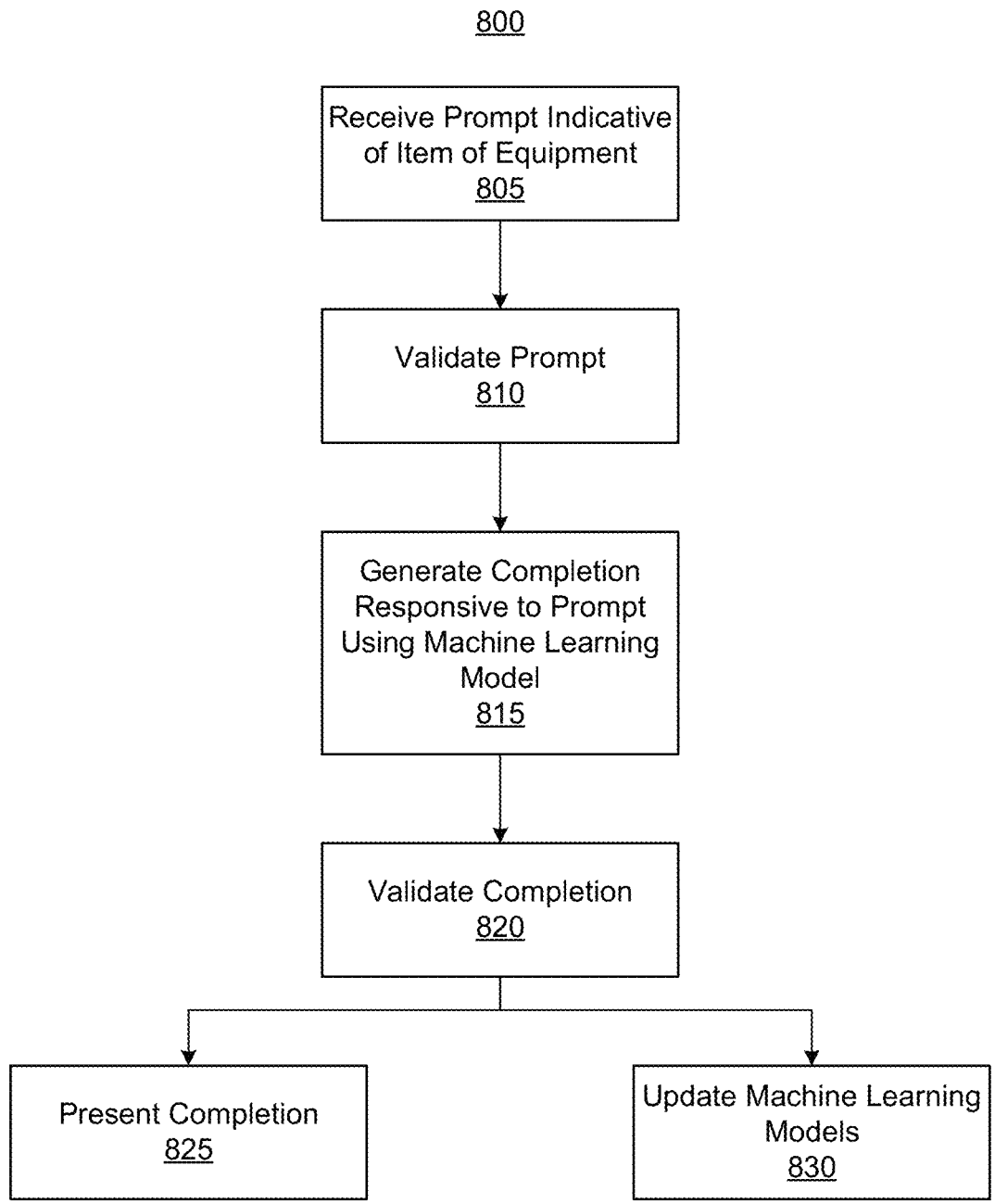
FIG. 8 is a flow diagram of a method of implementing generative artificial intelligence architectures and validation processes for machine learning algorithms for building management systems.

FIG. 8 depicts an example of a method 800. The method 800 can be performed using various devices and systems described herein, including but not limited to the systems 100, 200 or one or more components thereof. Various aspects of the method 800 can be implemented using one or more devices or systems that are communicatively coupled with one another, including in client-server, cloud-based, or other networked architectures. As described with respect to various aspects of the system 200 (e.g., with reference to FIGS. 3-7), the method 800 can implement operations to facilitate more accurate, precise, and/or timely determination of completions to prompts from users regarding items of equipment, such as to incorporate various validation systems to improve accuracy from generative models.

At 805, a prompt can be received. The prompt can be received using a user interface implemented by an application session of a client device. The prompt can be received in any of various data formats, such as text, audio, speech, image, and/or video formats. The prompt can be indicative of an item of equipment, such as a condition of the equipment (e.g., an error detected or fault condition) or a building management system or component thereof. The prompt can indicate a request for a service to perform for the item of equipment. The prompt can indicate one or more characteristics of the item of equipment. In some implementations, the application session provides a conversational interface or chatbot for receiving the prompt, and can present queries via the application to request information for the prompt. For example, the application session can determine that the prompt indicates a type of equipment, and can request information regarding expected issues regarding the equipment (e.g., via iterative generation of completions and communication with machine learning models).

At 810, the prompt is validated. For example, criteria such as one or more rules, heuristics, models, algorithms, thresholds, policies, or various combinations thereof can be evaluated using the prompt. The criteria can be evaluated to determine whether the prompt is appropriate for the item of equipment. In some implementations, the prompt can be evaluated by a pre-processor that may be separate from at least one of the application session or the machine learning models. In some implementations, the prompt can be evaluated using any one or more accuracy checkers, data filters, simulations regarding operation of the item of equipment, or expert validation systems; the evaluation can be used to update the criteria (e.g., responsive to an expert determining that the prompt is valid even if the prompt includes information that does not satisfy the criteria, the criteria can be updated to be capable of being satisfied by the information of the prompt). In some implementations, the prompt is modified according to the evaluation; for example, a request can be presented via the application session for an updated version of the prompt, or the pre-processor can modify the prompt to make the prompt satisfy the one or more criteria. The prompt can be converted into a vector to perform a lookup in a vector database of expected prompts or information of prompts to validate the prompt.

At 815, at least one completion is generated using the prompt (e.g., responsive to validating the prompt). The completion can be generated using one or more machine learning models, including generative machine learning models. For example, the completion can be generated using a neural network comprising at least one transformer, such as GPT model. The completion can be generated using image/video generation models, such as GAN and/or diffusion models. The completion can be generated based on the one or more machine learning models being configured (e.g., trained, updated, fine-tuned, etc.) using training data examples representative of information for items of equipment, including but not limited to unstructured data or semi-structured data such as service technician reports, operating manuals, technical data sheets, etc. Prompts can be iteratively received and completions iteratively generated responsive to the prompts as part of an asynchronous and/or conversational communication session.

In some implementations, generating the prompt comprises using a plurality of machine learning models, which may be configured in similar or different manners, such as by using different training data, model architectures, parameter tuning or hyperparameter fine tuning, or various combinations thereof. In some implementations, the machine learning models are configured in a manner representative of various roles, such as author, editor, validation, external data comparison, etc. roles. For example, a first machine learning model can operate as an author model, such as to have relatively fewer/lesser criteria for generating an initial completion responsive to the prompt, such as to require relatively lower confidence levels or risk criteria. A second machine learning model can be configured to have relatively greater/higher criteria, such as to receive the initial completion, process the initial completion to detect one or more data elements (e.g., tokens or combinations of tokens) that do not satisfy criteria of the second machine learning model, and output an alert or cause the first machine learning model to modify the initial completion responsive to the valuation. For example, the editor model can identify a phrase in the initial completion that does not satisfy an expected value (e.g., expected accuracy criteria determined by evaluating the prompt using a simulation), and can cause the first machine learning model to provide a natural language explanation of factors according to which the initial completion was determined, such as to present such explanations via the application session. The machine learning models can evaluate the completions according to bias criteria. The machine learning models can store the completions and prompts as data elements for further configuration of the machine learning models (e.g., positive/negative examples corresponding to the prompts).

At 820, the completion can be validated. The completion can be validated using various processes described for the machine learning models, such as by comparing the completion to any of various thresholds or outputs of databases or simulations. For example, the machine learning models can configure calls to databases or simulations for the item of equipment indicated by the prompt to validate the completion relative to outputs retrieved from the databases or simulations. The completion can be validated using accuracy checkers, bias checkers, data filters, or expert systems.

At 825, the completion is presented via the application session. For example, the completion can be presented as any of text, speech, audio, image, and/or video data to represent the completion, such as to provide an answer to a query represented by the prompt regarding an item of equipment or building management system. The completion can be presented via iterative generation of completions responsive to iterative receipt of prompts. The completion can be present with a user input element indicative of a request for feedback regarding the completion, such as to enable the prompt and completion to be used for updating the machine learning models.

At 830, the machine learning model(s) used to generate the completion can be updated according to at least one of the prompt, the completion, or the feedback. For example, a training data element for updating the model can include the prompt, the completion, and the feedback, such as to represent whether the completion appropriately satisfied a user's request for information regarding the item of equipment. The machine learning models can be updated according to indications of accuracy determined by operations of the system such as accuracy checking, or responsive to evaluation of completions by experts (e.g., responsive to selective presentation and/or batch presentation of prompts and completions to experts).

Figure 9:
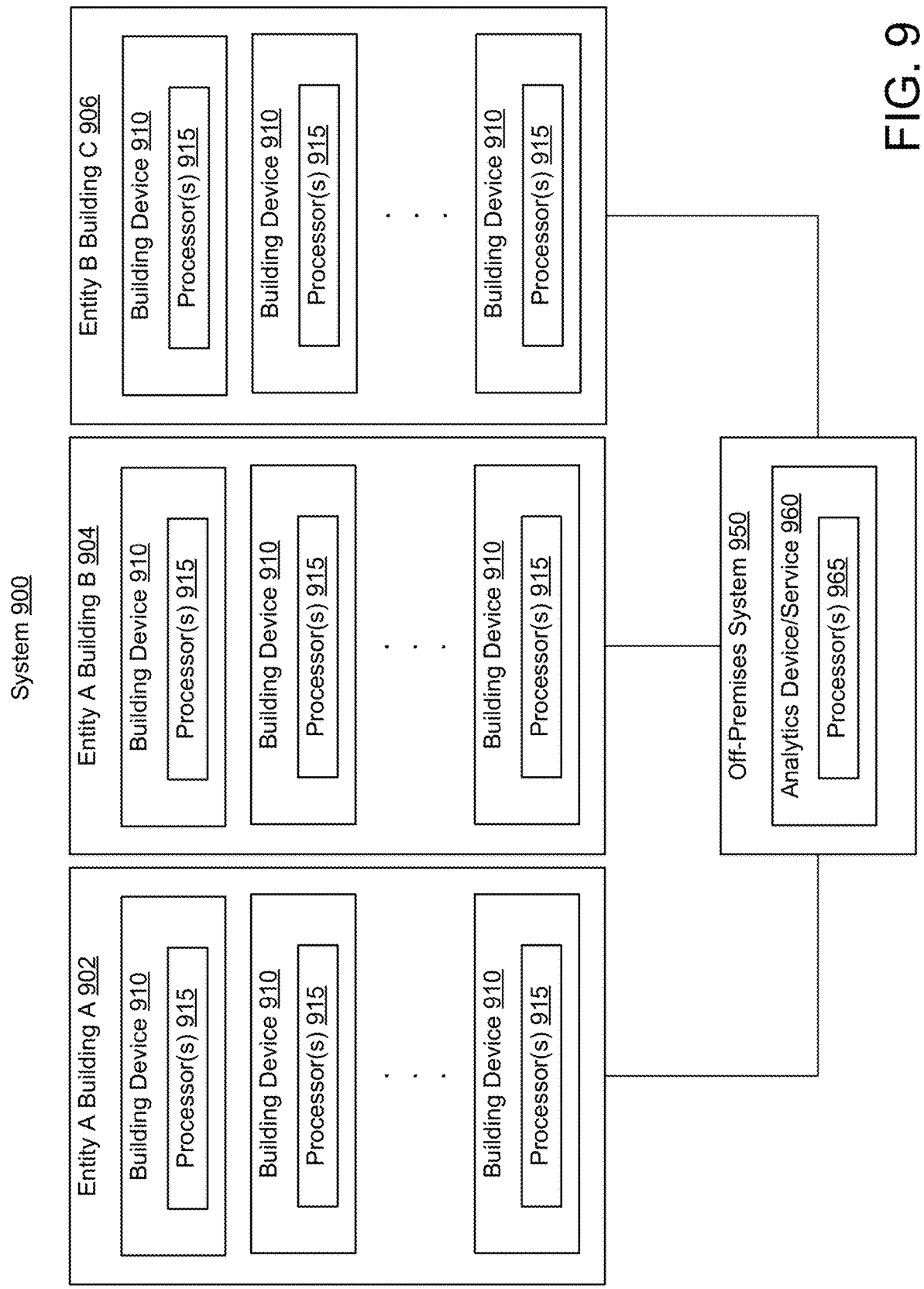
FIG. 9 is a block diagram of an example building management system.

III. Building Management Systems with Dynamic Edge Computing Architectures, Sustainability Improvement Architectures, and/or Intelligent Deployment and Configuration FIG. 9 is a block diagram of an example system 900. System 900 includes an example environment in which building devices 910 are provided across multiple buildings 902, 904, and 906. The building devices 910 can be any type of building devices, including, but not limited to, HVAC-R devices (e.g., chillers, air handling units, etc.), sensors (e.g., occupancy sensors, thermostats, etc.), networking equipment, security equipment (e.g., cameras, access control devices, etc.), office/productivity equipment, or any other type of devices in, coupled to, or otherwise associated with the buildings. The building devices 910, as illustrated, are on-premises building devices located in or on the buildings. In some implementations, some of the building devices 910 may not be on-premises devices or may be devices that can be moved between on-premises and off-premises of the buildings. In some implementations, at least some of the building devices 910 are edge building devices. In some implementations, at least some of the building devices 910 are devices other than edge devices, such as on-premises servers, supervisory controllers, etc. The building devices 910 have one or more processors 915. The processors 915 may be any type of processing circuit configured to perform one or more processing or computing functions for the building devices 910, as discussed elsewhere herein.

System 900 includes building devices 910 across several different buildings 902, 904, and 906. Building 902 is a first building associated with a first Entity A. An entity may be an individual, group of individuals, organization, company, unit of a company, etc. A building may be associated with an entity in any of a variety of ways; for example, the entity may own the building, be a tenant of the building, be a corporate family member (e.g., parent or sibling company) of an owner and/or tenant of the building, etc. Building 904 is a second building associated with the first Entity A. Building 906 is a third building associated with a second Entity B different than Entity A. In some implementations, Entity B may have a relationship with Entity A (e.g., be in the same corporate family, have a contractual relationship with one another, etc.). In some implementations, Entity B may be unrelated to Entity A.

System 900 can also include an off-premises system 950. In various implementations, off-premises system can be or include an off-premises computing system, such as a server, a set of multiple off-premises systems, a distributed computing system, a cloud system or service, or any other type of computing/processing system. Off-premises system 950 includes an analytics device/service 960 and includes one or more processors 965. It should be understood that the off-premises system 950 does not need to include one or more dedicated processors, but may, in some embodiments, be implemented using compute services such as cloud computing services where computing capacity is rented/leased as a service. One or more of the building devices 910 of the buildings 902, 904, and/or 906 may communicate with off-premises system 950 to perform various functions disclosed herein, such as modifying machine learning models, performing off-premises analytic functions, etc.

It should be understood that the number of buildings and building devices shown in FIG. 9 is illustrative only, and, in various implementations, the system can include any number of buildings associated with any number of entities, and the buildings can include any number of (i.e., one or more) building devices.

Figure 10:
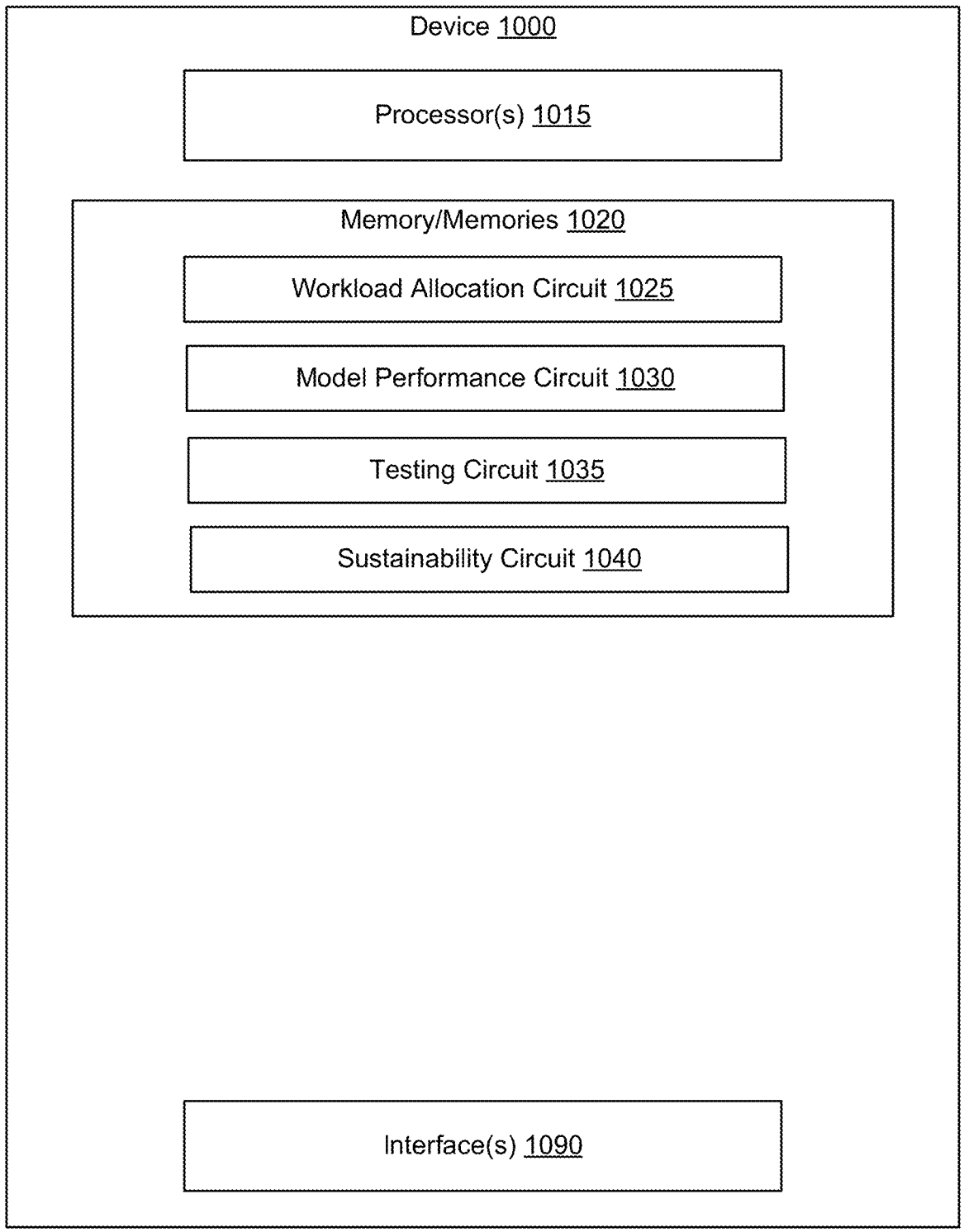
FIG. 10 is a block diagram of an example device.

FIG. 10 is a block diagram of an example device 1000. The device 1000 is one example implementation of the building devices 910 and/or off-premises system 950 shown in FIG. 9. The device 1000 can be used to implement some or all of the various functions disclosed herein, including, but not limited to, those discussed herein with respect to FIGS. 11 through 24 (e.g., for on-premises and/or off-premises devices and/or systems). The device 1000 includes one or more processors 1015 that may be or include any type of processing circuit, as discussed elsewhere herein. The one or more processors may be configured to execute instructions stored on computer-readable storage media, such as one or more memories 1020, to implement various functions. The memory 1020 may be or include any type of computer-readable storage media, as discussed elsewhere herein.

The device 1000 may include one or more circuits configured to perform various functions of the device 1000. In the illustrated implementation, the one or more circuits are implemented within the memory 1020 and include one or more instructions that are executable by the processors 1015 to implement the various functions of the device 1000. In some implementations, the one or more circuits may additionally or alternatively be implemented using hardware (e.g., integrated circuits or other specially designed hardware configured to perform particular tasks), software, or a combination thereof.

The device 1000 may include a workload allocation circuit 1025. The workload allocation circuit 1025 may be configured to receive computing workloads to be processed and determine computing/processing resources to process the computing workloads. In some implementations, the workload allocation circuit 1025 may allocate computing resources of the device 1000 or may assign and/or request one or more computing resources of other devices/systems to perform part or all of the processing of the computing workload. Further detail regarding functions that may be performed by the workload allocation circuit 1025, according to various non-limiting example embodiments, can be found with below reference to FIGS. 11-24.

The device 1000 may include a model performance circuit 1030. The model performance circuit 1030 may be configured to assess the performance of one or more machine learning models (e.g., AI models, including, but not limited to, generative AI models in some implementations). In some implementations, the model performance circuit 1030 may monitor the performance of the models as they operate in the device 1000 (e.g., executing in an edge building device). In some such implementations, the model performance circuit 1030 may monitor the performance of the models to determine if the performance is below, or degrades below, a certain level and may retrain the models or cause the models to be retrained in response. In some implementations, the model performance may be evaluated and/or validated using analyst and/or occupant feedback. In some implementations, the models may be stored within the memory 1020 on the device 1000. Further detail regarding functions that may be performed by the model performance circuit 1030, according to various non-limiting example embodiments, can be found with below reference to FIGS. 11-24.

The device 1000 may include a testing circuit 1035. The testing circuit 1035 may provide for the testing of software, such as new versions of software, within the device 1000. In some implementations, the software may be a new version of software already active on the device 1000, and the testing circuit 1035 may test the new version of the software on the device 1000 without activating it, or using the outputs of the execution of the software (e.g., running the new version as a shadow or apprentice version), to test the real-world performance of the new version of the software in the device 1000. Further detail regarding functions that may be performed by the testing circuit 1035, according to various non-limiting example embodiments, can be found with below reference to FIGS. 11-24.

The device 1000 may include a sustainability circuit 1040. The sustainability circuit 1040 may assess processing activities of the device 1000 and/or other devices and predict/determine/estimate a sustainability impact of the processing activities. In some implementations, the sustainability circuit 1040 may generate output parameters or control signals for building equipment, recommendations for changes in equipment or operating parameters, or other outputs configured to improve a sustainability performance and/or provide options for balancing sustainability performance with other factors. In some implementations, the sustainability circuit 1040 may operate alone or in conjunction with the workload allocation circuit 1025 to allocate workloads and/or provide recommendations/options for allocating workloads based at least in part on the sustainability impact of processing the workloads in different ways. Further detail regarding functions that may be performed by the sustainability circuit 1040, according to various non-limiting example embodiments, can be found with below reference to FIGS. 11-24.

It should be understood that the example methods and functions described below with respect to FIGS. 11-24 may be non-limiting. For example, in some implementations, each of the methods described with respect to FIGS. 11-24 may include steps, aspects, and/or functions to improve sustainability in a building, one or more portions of a building, one or more pieces of equipment of a building, and the like. For example, the methods described with respect to FIGS. 11-24 may be used to monitor, track, and/or improve sustainability and/or sustainable performance in one or more portions of a building and/or one or more pieces of building equipment of a building. Specifically, in some embodiments, the methods described with respect to FIGS. 11-24 may be used to monitor, track, and/or reduce carbon emissions and/or other emissions levels in one or more portions of a building and/or one or more pieces of building equipment of a building, such as by monitoring and/or controlling building equipment, monitoring activities and/or events occurring in the building, etc.

Figure 11:
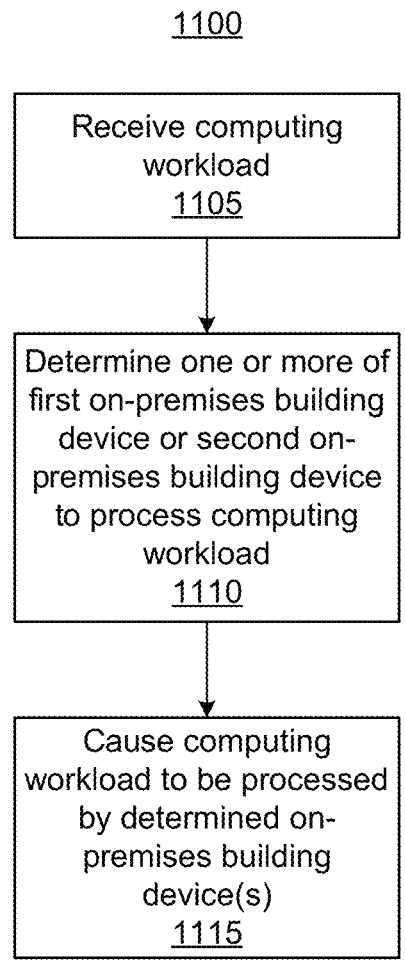
FIG. 11 is a flow diagram of a method for processing compute activities of a building management system.

FIG. 11 is a flow diagram of a method 1100 for processing compute activities of a building management system of a building. In some embodiments, the method 1100 may be performed by one or more components of any of the foregoing systems and devices, including, but not limited to, components of the system 900 and/or the device 1000 (e.g., the workload allocation circuit 1025). The building management system may include a plurality of on-premises building devices, and the plurality of on-premises building devices may include a first on-premises building device (e.g., a thermostat) and a second on-premises building device (e.g., a networking device). The method 1100 and/or any of the other methods disclosed herein (e.g., methods 1200 through 2400) may be performed partially or wholly in an on-premises device, a combination of two or more on-premises devices, an off-premises device, a combination of two or more off-premises devices, a combination or one or more on-premises devices and one or more off-premises devices, on edge devices or non-edge devices, or in any other manner. It should be understood that any discussion herein referring to "processor" or "processing circuit", including but not limited to the discussion of FIGS. 11 through 24, includes performing the stated function/feature using one or more processors and/or processing circuits.

At 1105, a computing workload is received. The computing workload may include any type of computing or processing function to be performed. In some implementations, the computing workload may include processing tasks configured to control building equipment to perform one or more functions, such as controlling HVAC-R equipment, lighting, computing equipment, networking equipment, security equipment, etc. In some implementations, the computing workload may include analytic tasks or other computing tasks to generate, analyze, or otherwise process data, such as training, modifying, executing, analyzing, etc. a machine learning model (e.g., AI model). The computing workload may be a workload for on-premises building devices and/or off-premises devices/systems. Any type of computing workload is contemplated within the scope of the present disclosure.

At 1110, one or more devices are determined to process the computing workload. One or more processors determine one or more of the first on-premises building device or the second on-premises building device to process the computing workload. The processor may determine the one or more of the first on-premises building device or the second on-premises building device to process the computing workload using workload characteristics of the computing workload, alone or in combination with device characteristics of the first on-premises building device and/or the second on-premises building device.

In some implementations, the one or more processors are part of a third on-premises building device separate from the first on-premises building device and the second on-premises building device, and determining one or more of the first on-premises building device or the second on-premises building device to process the computing workload includes assigning, by the third on-premises building device, the computing workload to the one or more of the first on-premises building device or the second on-premises building device. For example, the third on-premises building device may be a controller or server in the building and may assign the processing of the computing workload to two edge devices of the building, such as a security device (e.g., a camera with onboard processing capability) and a HVAC-R device (e.g., an air handling unit). In another example, the third on-premises building device may be an edge building device that assigns the processing tasks to two or more other edge building devices, an edge building device and a non-edge on-premises device, two non-edge on-premises building devices, etc.

In some implementations, the one or more processors are part of an off-premises building device, and determining one or more of the first on-premises building device or the second on-premises building device to process the computing workload includes assigning, by the off-premises building device, the computing workload to the one or more of the first on-premises building device or the second on-premises building device. For example, in some implementations, the off-premises building device may be an off-premises server, cloud system/service, or some other off-premises system configured to receive workload handling requests and determine on-premises devices to handle the requests.

In some implementations, the one or more processors are part of the first on-premises building device, and determining one or more of the first on-premises building device or the second on-premises building device to process the computing workload includes assigning, by the first on-premises building device, at least a portion of the computing workload to the second on-premises building device. For example, in some implementations, the first on-premises device may assign the entire computing workload to another on-premises building device, or may assign a portion of the computing workload to another on-premises building device and process a portion of the workload on the first on-premises device. In some implementations, the first on-premises device may assign the entire computing workload to itself.

The workload characteristics may include one or more of a variety of characteristics about the workload. In some implementations, the workload characteristics include an amount of computing resources required to process the computing workload. In some implementations, the device characteristics may include an amount of available computing resources at one or more of the plurality of on-premises building devices (e.g., an amount of available computing resources at the first on-premises building device). The available computing resources may include a total amount of computing resources and/or an amount of computing resources not already committed/assigned to other tasks. In some such implementations, determining one or more of the first on-premises building device or the second on-premises building device to process the computing workload includes analyzing the amount of computing resources required and the available computing resources of the first building device and based on the analysis, assigning the at least a portion of the computing workload to the second on-premises building device. For example, the processor(s) may determine the amount of computing resources required exceeds the available computing resources of the first building device or exceeds a threshold amount of the available computing resources of the first building device, and part or all of the computing workload may be assigned to the second on-premises building device. In various implementations, the assessment may be based on a total computing capacity/resources of the building device or a portion of the resources not already committed to other tasks. In some implementations, the assessment may be based on a predicted impact processing part or all of the workload on the building device would have on the performance of the building device. For example, if the processor(s) predict that processing the workload on the building device would cause the performance of the building device for performing one or more other tasks to degrade below a particular level, part or all of the workload may be assigned to another device(s).

At 1115, the one or more processors cause the computing workload to be processed by the determined one or more of the first on-premises building device or the second on-premises building device. In some implementations, the one or more processors may be a part of the device(s) determined to process the workload and may directly process the workload. In some implementations, the one or more processors may generate a command or request to the determined first on-premises building device and/or second on-premises building device to cause those determined device(s) to process the computing workload.

Method 1100 and/or various other systems, devices, and methods disclosed herein offer a variety of technical advantages. In some implementations, by processing the workload at on-premises building devices, such as edge building devices, one or more of several technical advantages can be achieved. For example, the workload may be processed using more immediate and/or rich context around the building than may be available to off-premises devices (e.g., data received from other on-premises devices may be used to process the workload without sending such data to off-premises devices). The latency in processing the workload may be reduced as compared to processing the workload in whole or in part off-premises. Processing the workload on-premises may reduce bandwidth issues/constraints associated with sending large amounts of data off-premises. Cost and computing requirements for off-premises systems such as cloud computing resources can be reduced by processing more of the workload on-premises. Power consumption and computing resources associated with transmitting data to off-premises devices and receiving responses from the off-premises devices may be reduced. Some or all of these advantages may be achieved, in some implementations, with no or reduced impact on a performance and/or capabilities of the edge devices by shifting the workload to edge devices with the capacity or other characteristics suited to handle the workloads. For example, computing overhead may be available in certain types of devices that typically use only a small portion of their processing capacity, such as some types of cameras, and that unused capacity can be used without adversely impacting the performance of the camera.

Figure 12:
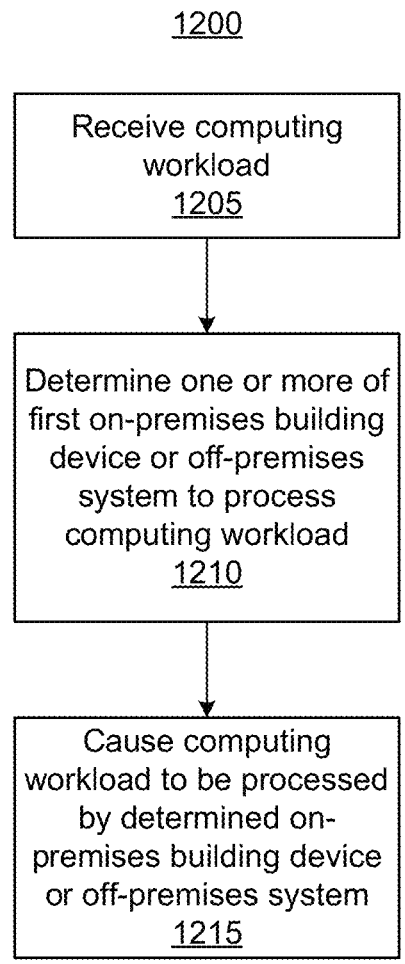
FIG. 12 is a flow diagram of a method for processing compute activities of a building management system.

FIG. 12 is a flow diagram of a method 1200 for processing compute activities of a building management system. In some embodiments, the method 1200 may be performed by one or more components of any of the foregoing systems and devices, including, but not limited, to components of the system 900 and/or the device 1000 (e.g., the workload allocation circuit 1025). The building management system includes one or more on-premises building devices, including a first on-premises building device.

At 1205, a computing workload is received. The computing workload may have one or more workload characteristics.

At 1210, one or more processors determine one or more of the first on-premises building device or an off-premises system to process the computing workload. The device/system to process the computing workload may be determined using the workload characteristics. In some implementations, the one or more processors assign the entire computing workload to either the first on-premises building device, or a combination of two or more on-premises building devices. In some implementations, the one or more processors assign the entire computing workload to the off-premises system (e.g., a cloud system). In some implementations, the processor(s) split the workload and assign a portion of the workload to the first on-premises building device (or two or more on-premises building devices) and a portion to the off-premises system. In some implementations, the workload portability and placement may include a service level indicator (SLI)/service level objective (SLO) based placement. In some such implementations, the workload may have a compute, memory, latency, or other objective, and the determination of whether to assign the workload to the on-premises device, the off-premises system, or a combination thereof may be based in part on the indicator. As an example, a workload running at the edge that includes a latency or uptime objective that is no longer met, or cannot be met by available resources at the edge device, can be dynamically transitioned to a cloud service or other off-premises system.

In some implementations, the off-premises system is a first off-premises system, and the one or more processors performing the assignment of the workload are part of the first off-premises system, a second off-premises system, or a second on-premises building device. In some implementations, the one or more processors are part of the first on-premises building device, and the first on-premises building device may assign the workload. The various workload characteristic factors and determinations described above can be utilized equally with respect to the steps of method 1200 as well as the various other workload handling methods, systems, and devices described herein.

In some implementations, the one or more workload characteristics include a latency characteristic for the computing workload. In some implementations, determining the one or more of the first on-premises building device or the off-premises system to process the computing workload includes determining whether to process the computing workload on the first on-premises building device, the off-premises system, or both using the latency characteristic. In some implementations, the latency characteristic includes at least one of a maximum latency or a target latency. For example, the processor(s) may determine whether to process the workload at the on-premises device, the off-premises system, or both based in part on whether shifting processing of the workload to an off-premises system would result in a latency higher than a maximum or target latency and, if so, assign part of all of the workload to the on-premises device (s).

In some implementations, the one or more workload characteristics includes a timeframe for completing processing of the computing workload. In some implementations, determining the one or more of the first on-premises building device or the off-premises system to process the computing workload includes determining whether to process the computing workload on the first on-premises building device, the off-premises system, or both using the timeframe for completing processing of the computing workload. For example, the processor(s) may determine to process the workload at the off-premises system in response to determine the off-premises system has greater available resources to process the workload in a more timely fashion. In another example, the processor(s) may determine to process the workload at the on-premises device in response to determining the on-premises device has sufficient computing resources and can avoid the delay of sending data to the off-premises device to process the workload.

In some implementations, the computing workload includes a set of recurring processing tasks, the one or more workload characteristics includes at least one of a frequency or a time at which the recurring processing tasks are to be executed. In some implementations, determining the one or more of the first on-premises building device or the off-premises system to process the computing workload includes determining whether to process the computing workload on the first on-premises building device, the off-premises system, or both using the at least one of the frequency or the time at which the recurring processing tasks are to be executed. For example, the processor(s) may assign a workload that is scheduled to run immediately (e.g., in real time or near real time) to the on-premises device, or a workload that is scheduled to be run once to the on-premises device. In another example, the processor(s) may assign a workload that is scheduled to, or allowed to, run during off-peak hours and/or is scheduled to be run periodically on a recurring basis to be processed on the off-premises system (e.g., overnight). In another example, such a workload may be scheduled to be run on the on-premises device(s), such as when the off-premises devices are otherwise on an off-peak or low load conditions (e.g., when a building is not occupied or has a low level of occupancy).

Figure 13:
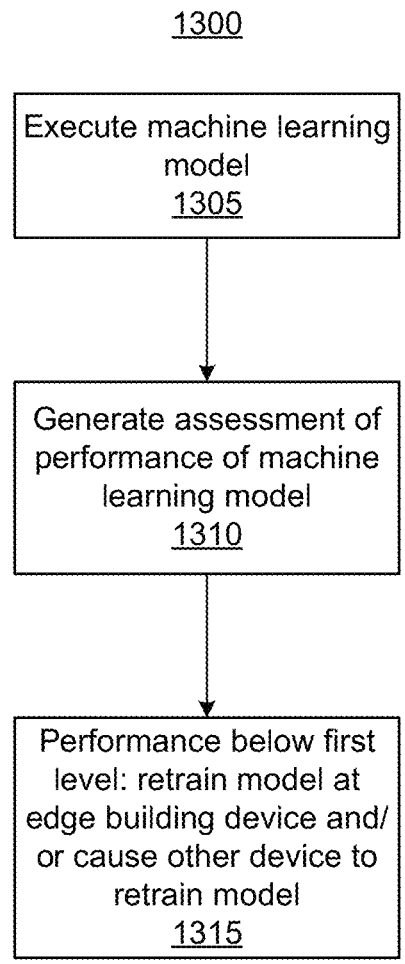
FIG. 13 is a flow diagram of a method for enhancing performance of a machine learning model executing on an edge building device of a building.

FIG. 13 is a flow diagram of a method 1300 for enhancing performance of a machine learning model executing on an edge building device of a building. In some embodiments, the method 1300 may be performed by one or more components of any of the foregoing systems and devices, including, but not limited, to components of the system 900 and/or the device 1000 (e.g., the model performance circuit 1030). While method 1300 and/or other methods herein discuss executing a model on an edge device, it should be understood that, in various embodiments, the methods may apply to executing the model on a non-edge on-premises device or even an off-premises device, and all such embodiments are contemplated within the scope of the present disclosure.

At 1305, a machine learning model is executed on the edge device. The machine learning model may be any type of machine learning model, in various embodiments. In some embodiments, the machine learning model may be or include an AI model, including, but not limited to, a large language model (LLM) or other generative AI model.

At 1310, an assessment of the performance of the machine learning model is generated. In some embodiments, the assessment may be generated at the edge building device by one or more processors of the edge building device.

At 1315, responsive to the assessment indicating the performance of the machine learning model is below a first level, the machine learning model may be retrained. In some implementations, the model may be retrained at the edge device by the one or more processors of the edge device. In some implementations, the processor(s) of the edge device may cause a device other than the edge building device to retrain the machine learning model, such as an off-premises system (e.g., cloud system or service). In some embodiments, generating the assessment of the performance of the machine learning model includes monitoring the performance of the machine learning model over a timeframe, and the machine learning model is retrained and/or caused to be retrained responsive to detecting that the performance of the machine learning model has degraded below the first level. For example, in some circumstances, a model may initially perform at a higher level and performance may degrade over time due to factors such as changing environmental conditions, changing conditions of the building equipment, changes in equipment, changes in occupancy, etc., and retraining may cause the model to perform better for the changed circumstances.

In some implementations, generating the assessment of the performance of the machine learning model includes generating a score indicating the performance of the machine learning model. The score may be generated in one or more of a variety of ways, such as by comparing an actual performance of the machine learning model to an expected or predicted performance of the model (e.g., comparing actual outputs of the model to expected or predicted outputs to determine deviation from an expected performance). The processor(s) may determine the performance is below the first level in response to the score being below a threshold score.

In some implementations, operational data of the building is received that is generated by at least one of the edge building device or one or more other building devices, and the machine learning model is retrained using the operational data of the building. For example, the machine learning model may be retrained using the operational data to customize the machine learning model to the specific building, building equipment, portion of the building, etc. in which/about which the model is deployed. In some implementations, the operational data may be used to improve the performance of a model in response to the assessment of the model indicating the performance is below the first level.

In some implementations, the model as initially deployed may be a non-customer-specific model, or a model that has not been trained on data specific to the building or an entity associated with the building. In some implementations, the model may have been trained on a limited amount of data for the building or the entity, but not an amount sufficient to achieve a particular (e.g., optimized) level of performance. In some such implementations, the model may be initially executed on the edge device without such training, and method 1200 may be used to improve operation of the model and/or customize the model to the building, the space of the building, the entity associated with the building, etc.

In some implementations, the machine learning model is selected for executing by the edge building device from among a plurality of machine learning models based on at least one of design data or operational data for the building. For example, a model may be selected that is predicted to perform best for the particular application based on design data for the building or space(s) thereof and/or operational data received from building devices of the building.

In some implementations, the machine learning model may be configured to monitor and/or control sustainability performance of the building or a portion thereof, such as a room, floor, control loop or set of building equipment, etc. In some such implementations, the system may generate a score indicating a performance of the machine learning model for monitoring and/or controlling the sustainability performance (e.g., carbon emissions). Responsive to the assessment indicating that the performance is below a particular level (e.g., determining that an accuracy with which the monitoring is correctly assessing the actual performance and/or the control is effectively controlling the performance is below a certain level), the model may be retrained and/or one or more other steps may be initiated.

Figure 14:
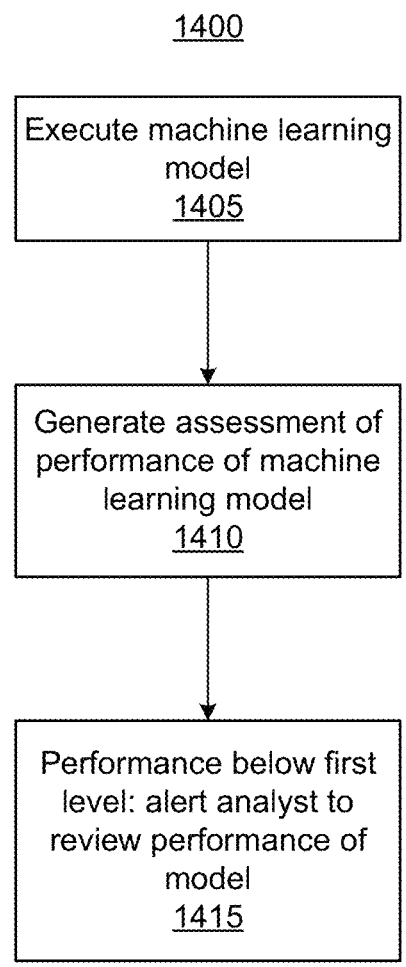
FIG. 14 is a flow diagram of a method for enhancing performance of a machine learning model for a building.

FIG. 14 is a flow diagram of a method 1400 for enhancing performance of a machine learning model for a building. In some embodiments, the method 1400 may be performed by one or more components of any of the foregoing systems and devices, including, but not limited, to components of the system 900 and/or the device 1000 (e.g., the model performance circuit 1030).

At 1405, a machine learning model is executed on the edge device. The machine learning model may be any type of machine learning model, in various embodiments. In some embodiments, the machine learning model may be or include an AI model, including, but not limited to, a large language model (LLM) or other generative AI model.

At 1410, an assessment of the performance of the machine learning model is generated. In some embodiments, the assessment may be generated at the edge building device by one or more processors of the edge building device.

At 1415, responsive to the assessment indicating the performance of the machine learning model is below a first level, an analyst may be alerted to review the performance of the model. In some implementations, generating the alert to the analyst includes generating a request to the analyst to validate whether the performance of the machine learning model is attributable to the machine learning model itself or an external factor. The analyst may review information about the performance of the model, such as information about the actual output of the model, the expected output of the model, one or more inputs to the model, and/or other information usable by the analyst to determine whether the performance is attributable to the model itself or other issues unrelated to the model. In some implementations, a dashboard may be generated for presentation to the analyst. The dashboard can include an indication of at least one of an output of the machine learning model and input data utilized by the machine learning model. In some implementations, the dashboard further includes an indication of a predicted problem causing the performance of the machine learning model to be below the first level. In some such implementations, the prediction of the problem may be generated using the model itself or one or more other algorithms, including, but not limited to, other machine learning models/AI models.

In some implementations, a response is received that the analyst has reviewed the performance of the machine learning model, and the response indicates whether the analyst has determined the performance to be attributable to the machine learning model itself, the external factor, or both. In some implementations, the model may be retrained using the response (e.g., if the response indicates the performance is partially or wholly attributable to the model). In some implementations, one or more actions may be taken to identify, generate an alert regarding, or otherwise response to a potential problem impacting the performance of the model responsive to the analyst response indicating that the performance is attributable to an external factor (e.g., based on the input being abnormal or unexpected and causing issues with the model output).

Figure 15:
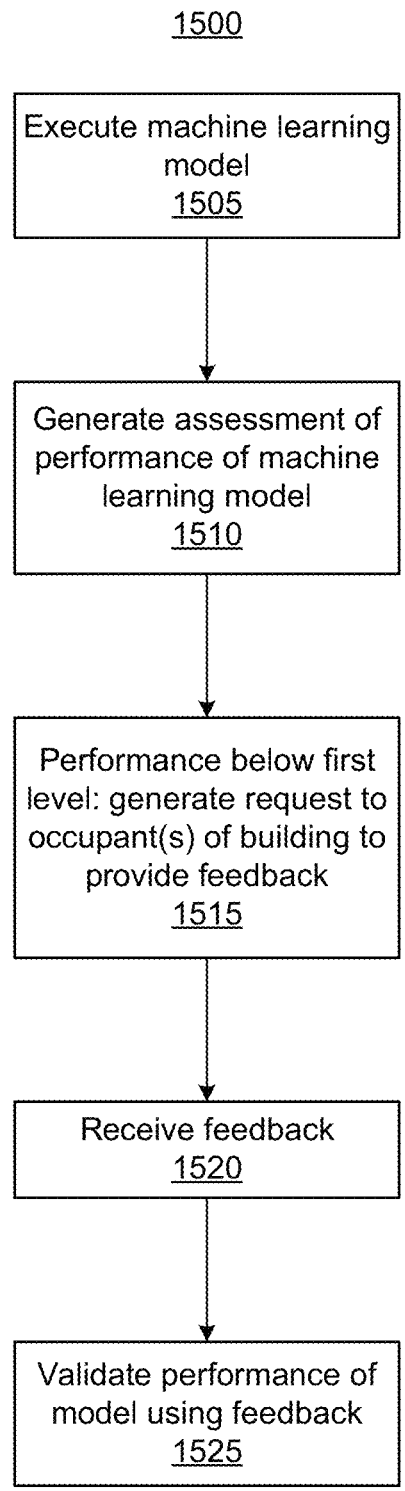
FIG. 15 is a flow diagram of a method for enhancing performance of a machine learning model for a building.

FIG. 15 is a flow diagram of a method 1500 for enhancing performance of a machine learning model for a building. In some embodiments, the method 1500 may be performed by one or more components of any of the foregoing systems and devices, including, but not limited, to components of the system 900 and/or the device 1000 (e.g., the model performance circuit 1030).

At 1505, a machine learning model is executed on the edge device. The machine learning model may be any type of machine learning model, in various embodiments. In some embodiments, the machine learning model may be or include an AI model, including, but not limited to, a large language model (LLM) or other generative AI model.

At 1510, an assessment of the performance of the machine learning model is generated. In some embodiments, the assessment may be generated at the edge building device by one or more processors of the edge building device.

At 1515, responsive to the assessment indicating the performance of the machine learning model is below a first level, a request to one or more occupants of the building to provide feedback relating to the machine learning model may be generated. At 1520, feedback may be received from the occupant(s). At 1525, the performance of the model may be validated using the feedback. As described above in method 1400, in various implementations, the feedback may be used to validate whether the model performance is attributable to the model or an external factor, used to retrain the model, or for other purposes. In various implementations, the occupant feedback may be or include one or more of a variety of factors observable by the occupant, such as a condition of building devices, an objective or subjective environmental condition (e.g., how hot or cold does it feel), or other factors. In some implementations, the occupant feedback may be received via an occupant application, such as a smartphone app.

Figure 16:
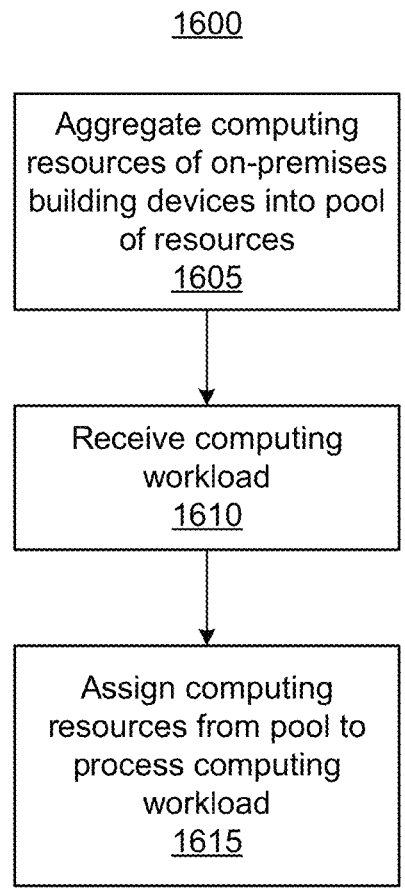
FIG. 16 is a flow diagram of a method for processing compute activities of a building management system.

FIG. 16 is a flow diagram of a method 1600 for processing compute activities of a building management system. In some embodiments, the method 1600 may be performed by one or more components of any of the foregoing systems and devices, including, but not limited, to components of the system 900 and/or the device 1000 (e.g., the workload allocation circuit 1025). The building management system includes a plurality of on-premises building devices, such as edge building devices.

At 1605, one or more computing resources of at least some of the plurality of on-premises devices are aggregated into a pool of computing resources.

At 1610, a computing workload is received. At 1615, computing resources are assigned from the pool of computing resources to process the computing workload. In some implementations, the computing resources of the one or more on-premises building devices are assigned from among the pool of available resources without considering a type of device of the assigned one or more on-premises building devices. For example, portions of computing capacity may be used from a variety of different devices, such as cameras, HVAC-R equipment, access control equipment, networking equipment, data management and processing equipment, or any other types of building devices to form the pool. In some implementations, the system identifies available computing capacity with characteristics sufficient or preferable for processing the workload and assigns the workload to be handled by those computing resources, regardless of the type of device.

Figure 17:
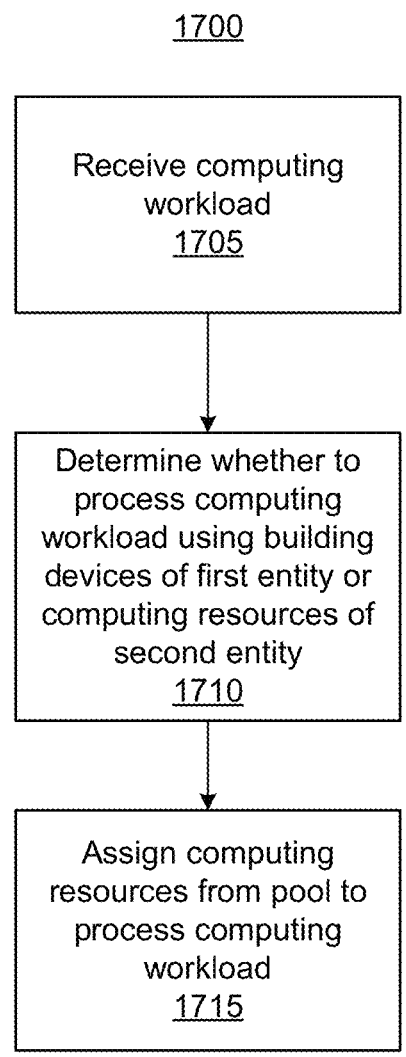
FIG. 17 is a flow diagram of a method for processing compute activities for a first building associated with a first entity.

FIG. 17 is a flow diagram of a method for processing compute activities for a first building associated with a first entity. In some embodiments, the method 1700 may be performed by one or more components of any of the foregoing systems and devices, including, but not limited, to components of the system 900 and/or the device 1000 (e.g., the workload allocation circuit 1025).

At 1705, a computing workload is received for a first building associated with a first entity. At 1710, one or more processors determine whether to process the computing workload using one or more first on-premises building devices of the first building or using computing resources of a second entity different than the first entity. The determination may be made using workload characteristics of the computing workload. At 1715, responsive to determining the process the computing working using computing resources of the second entity, the computing resources of the second entity are caused to process the computing workload (e.g., by generating a request or command to a system of the second entity to process the computing workload).

In some implementations, method 1700 may operate similarly to the methods discussed above in evaluating whether to process the computing workload using devices of the first building or other computing resources. However, method 1700 allows the processor to utilize computing resources of an entity other than the entity for which the computing workload is being processed. In some such implementations, two entities may enter into an arrangement by which one entity's computing resources may be utilized to process computing workloads of another entity. For example, the resources of Entity B may be utilized to process the workload in response to the processor determining that one or more resources of Entity B are at a low utilization level or off-peak level and the devices of Entity A are at a high utilization level or peak level. In some implementations, the entities may enter into a reciprocal arrangement in which, during certain times, resources of Entity A can be used to process computing workloads for Entity B. In some implementations, data security measures may be put in place to protect the security of the data being processed on the other entity's resources. In some implementations, the entities may have a trust relationship with one another (e.g., contractual parties, corporate family members, etc.).

In some implementations, a sustainability impact of processing the computing workload may be considered in determining where to process the computing workload, as discussed in further detail below. For example, the computing resources of Entity B may be utilized to process the computing workload in response to determining the computing resources of Entity B are in a location or have certain characteristics that are predicted to result in a lower level of carbon emissions or other sustainability benefit (e.g., due to requiring less active cooling or heating of the computing devices).

Figure 18A:
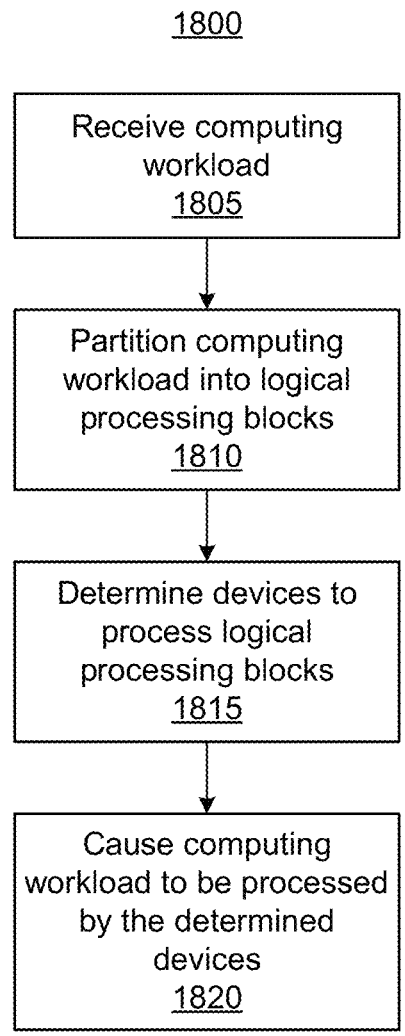
FIG. 18A is a flow diagram of a method for processing compute activities of a building management system.

FIG. 18A is a flow diagram of a method 1800 for processing compute activities of a building management system. In some embodiments, the method 1800 may be performed by one or more components of any of the foregoing systems and devices, including, but not limited, to components of the system 900 and/or the device 1000 (e.g., the workload allocation circuit 1025).

At 1805, a computing workload is received. At 1810, the computing workload is partitioned into a plurality of logical processing blocks. In some implementations, the workload may be received with predetermined processing block partitions. In some implementations, the workload may be received and may be partitioned into logical processing blocks after receipt. In some implementations, the logical processing blocks can be a series of processing steps to be performed sequentially. In some implementations, two or more of the logical processing blocks can be performed in parallel with one another. In one example, a processing workload may include executing an analytic model, and the workload may be partitioned into logical processing blocks including ingesting data (e.g., operating data from building devices) for inputs into the model, transforming the data into a format usable by the model, enriching the data with other data available to the system, processing the data using the model to analyze the data, caching the output data, feeding the cached output data back into the model for subsequent analysis and rounds of processing, and/or other logical processing blocks.

At 1815, a plurality of devices may be determined for processing the logical processing blocks to process the computing workload. The determination may be made in a similar manner as described above. However, instead of assigning the entire workload, different logical processing blocks may be assigned to different devices. For example, logical processing blocks requiring a greater amount of processing capacity may be assigned to devices with a larger amount of processing power or available processing capacity, and logical processing blocks requiring a lower amount of processing capacity may be assigned to devices with a smaller amount of processing power or available processing capacity. At 1820, the computing workload is caused to be processed by the determined devices, by causing the determined devices to process the logical processing blocks assigned to the devices.

Figure 18B:
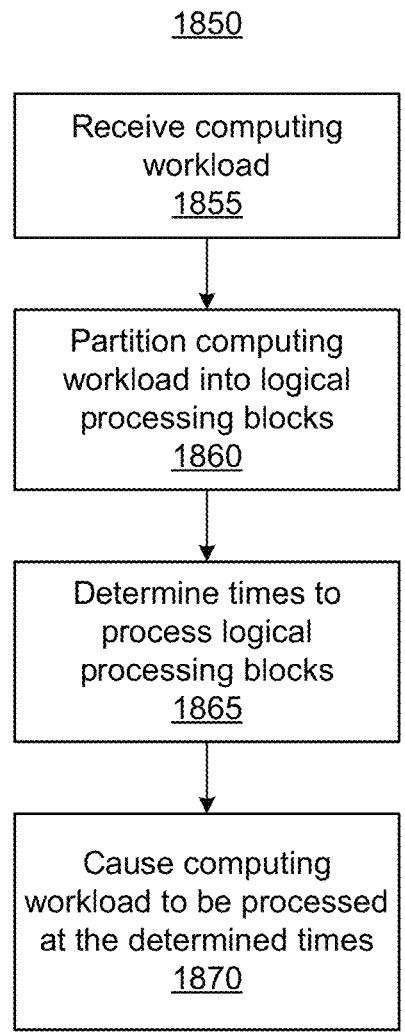
FIG. 18B is a flow diagram of a method for processing compute activities of a building management system.

FIG. 18B is a flow diagram of a method 1850 for processing compute activities of a building management system. In some embodiments, the method 1850 may be performed by one or more components of any of the foregoing systems and devices, including, but not limited, to components of the system 900 and/or the device 1000 (e.g., the workload allocation circuit 1025). Method 1850 is similar to method 1800, and the steps of method 1850 shown in FIG. 18B can be processed similarly to method 1800 and other computing workload processing methods disclosed herein. As compared to method 1800, method 1850 includes determining a plurality of times at which to process the logical processing blocks. For example, more computationally intensive blocks may be performed at a time when greater computing capacity is available (e.g., off-peak time), and less computationally intensive blocks or more time-sensitive blocks can be performed at higher load times.

Figure 19:
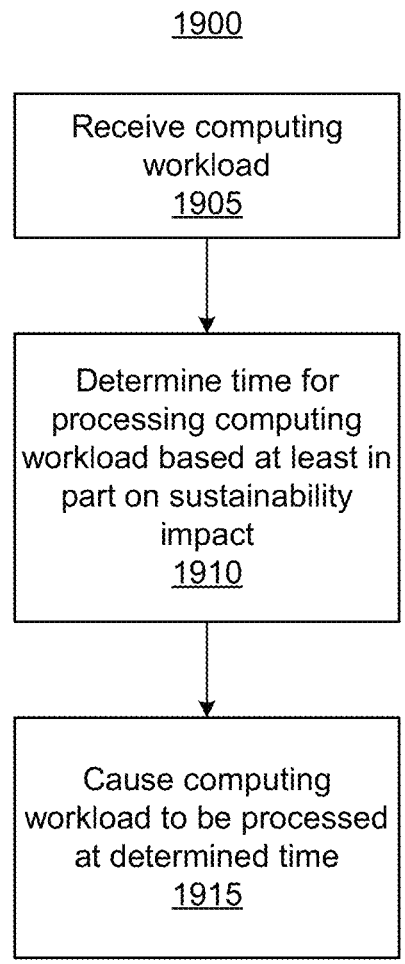
FIG. 19 is a flow diagram of a method for processing compute activities of a building management system.
Figure 20:
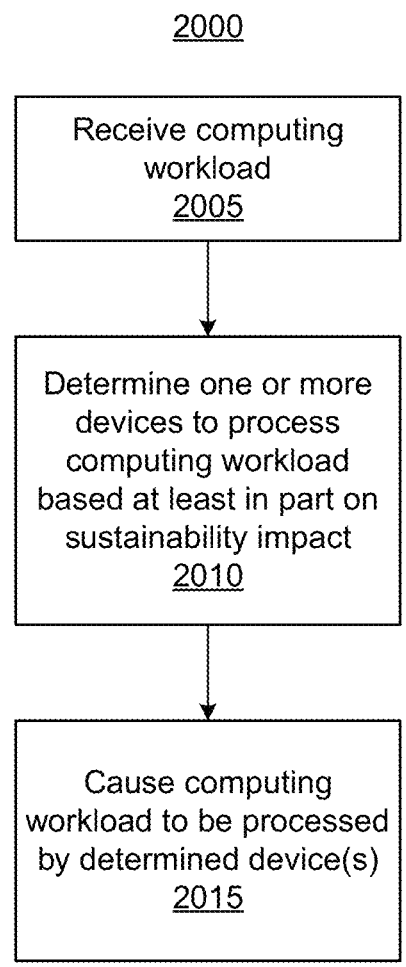
FIG. 20 is a flow diagram of a method for processing compute activities of a building management system.
Figure 21:
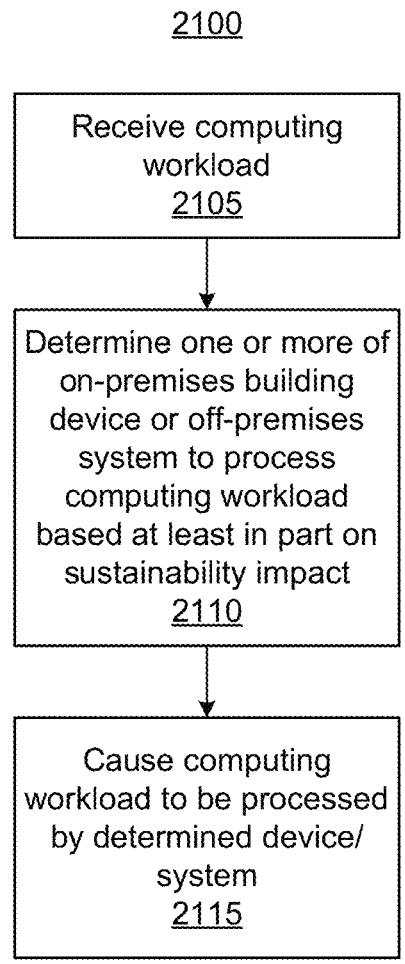
FIG. 21 is a flow diagram of a method for processing compute activities of a building management system.

FIG. 19 is a flow diagram of a method 1900 for processing compute activities of a building management system. FIG. 20 is a flow diagram of a method 2000 for processing compute activities of a building management system. FIG. 21 is a flow diagram of a method 2100 for processing compute activities of a building management system. In some embodiments, the methods 1900, 2000, and 2100 may be performed by one or more components of any of the foregoing systems and devices, including, but not limited, to components of the system 900 and/or the device 1000. Methods 1900, 2000, and 2100 are similar in various respects to the methods described above for determining times, locations, and/or devices to process part or all of the computing workloads. In methods 1900, 2000, and 2100, the computing workloads are handled based at least in part on a sustainability impact of processing the computing workload. For example, one or more processors may assign the computing workload to be performed in whole or in part at an on-premises building device, a combination of two or more on-premises building devices, an off-premises building device, a combination of two or more off-premises building devices, or a combination of one or more on-premises and off-premises building devices based on a prediction of a carbon impact of processing the workload at different locations, devices, and times. For example, a first arrangement of devices, locations, and/or times may be assigned for processing the computing workload in response to determining that the first arrangement would result in a lower predicted amount of carbon emissions than a second arrangement. The sustainability impact may be predicted based on a variety of factors and/or data, including, but not limited to, utility data, types of devices, loads on devices, environmental factors of buildings, environmental factors of locations of processing, etc. In some implementations, the environmental factors may include a humidity and/or temperature. For example, the system may determine to process the workload in a location with a lower humidity and/or temperature, or during a time when the temperature and/or humidity is lower, to reduce the need for active cooling of the computing resources.

Figure 22:
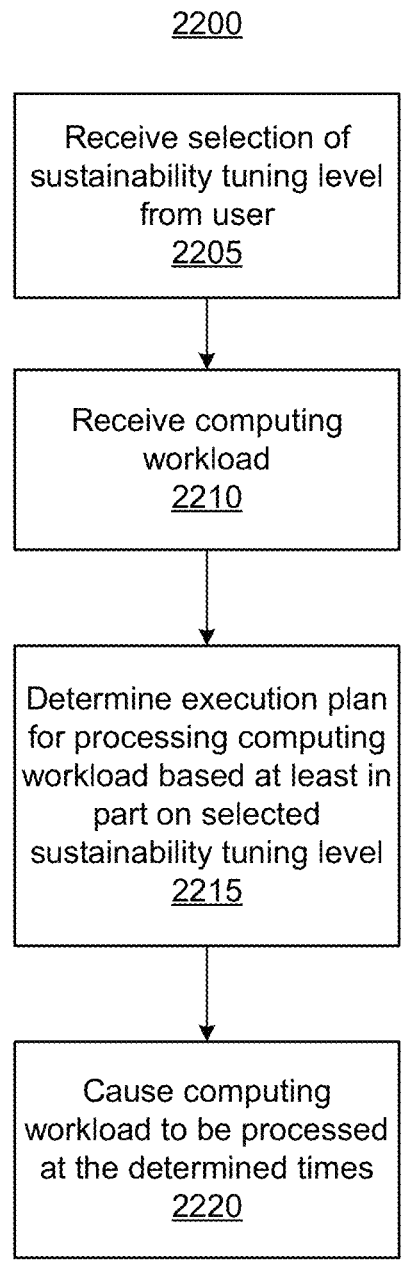
FIG. 22 is a flow diagram of a method for processing compute activities of a building management system.

FIG. 22 is a flow diagram of a method 2200 for processing compute activities of a building management system. In some embodiments, the method 2200 may be performed by one or more components of any of the foregoing systems and devices, including, but not limited, to components of the system 900 and/or the device 1000.

At 2205, a selection of a sustainability tuning level is received from a user. The sustainability level is one of a plurality of sustainability tuning levels, the plurality of sustainability tuning levels representing different levels of weighting to be placed on mitigating a sustainability impact of computing workloads balanced against one or more other factors. In some implementations, a graphical user interface including a scale or slider representing the plurality of sustainability tuning levels is generated, and the selection is received from the user by the user selecting a position on the scale or slider indicating a relative level of importance or focus on sustainability impact in comparison to one or more other factors such as cost, computing performance, latency, and/or various other factors as discussed elsewhere herein. In some implementations, the system is configured to present a plurality of different recommendations or options to the user, and the user selects the sustainability tuning level by selecting one of the presented options.

At 2210, a computing workload is received.

At 2215, an execution plan for processing the computing workload is determined based at least in part on the selected sustainability tuning level. The execution plan can include determining one or more of one or more devices to process the computing workload, one or more locations at which to process the computing workload, whether to process the computing workload on one or more on-premises devices on one or more off-premises systems, or one or more times at which to process the computing workload. For example, a first execution plan for processing the computing workload in response to a sustainability tuning level indicating a lower focus on sustainability may include a selection or combination of devices, locations, and/or times for processing the workload that are predicted to result in higher carbon emissions than other selections or combinations, but at a better computing performance. In another example, a second execution plan in response to a sustainability tuning level indicating a higher focus on sustainability may include a selection or combination of devices, locations, and/or times that are predicted to result in lower carbon emissions and a lower level of computing performance. At 2220, the computing workload is caused to be processed according to the execution plan.

Figure 23:
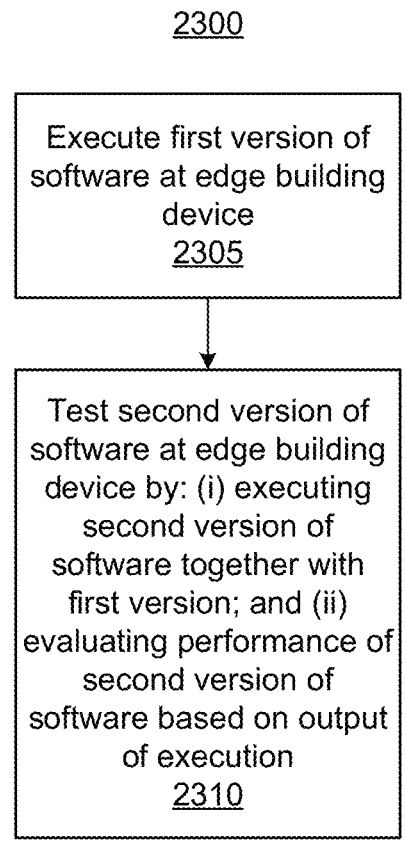
FIG. 23 is a flow diagram of a method for testing software in an edge building device of a building.

FIG. 23 is a flow diagram of a method for testing software in an edge building device of a building. In some embodiments, the method 2300 may be performed by one or more components of any of the foregoing systems and devices, including, but not limited, to components of the system 900 and/or the device 1000.

At 2305, a first version of the software is executed at an edge building device.

At 2310, a second version of the software is tested at the edge building device. The second version of the software is tested by executing the second version of the software together with execution of the first version of the software on the edge building device (e.g., during a same timeframe, but not necessarily at a same time or simultaneously). Testing the second version of the software can include evaluating, by the one or more processors of the edge building device or by causing a separate computing device to perform the evaluation, a performance of the second version of the software on the edge computing device for performing the second set of one or more processing tasks based on an output of the execution of the second version of the software.

In some implementations, testing the second version of the software includes executing the second version of the software without using the output of the execution to control functionality of the edge building device (e.g., executing the second version as a shadow or apprentice copy of the first version). In some implementations, the method can further include determining, based on the evaluation, that the performance of the second version of the software is above a particular level. In some implementations, the method can further include responsive to determining the performance of the second version of the software is above the particular level, deactivating the first version of the software and activating the second version of the software to perform the second set of one or more processing tasks for the edge building device.

In some implementations, the method can further include determining, based on the evaluation, that the performance of the second version of the software is below a particular level. In some implementations, the method can further include responsive to determining the performance of the second version of the software is below the predetermined level, modifying one or more characteristics of the second version of the software at the edge building device to generate a modified second version of the software and retesting the modified second version of the software at the edge building device. In some implementations, the method can further include determining, based on the evaluation, that the performance of the second version of the software is below a particular level and responsive to determining the performance of the second version of the software is below the predetermined level, providing data to an external computing device for use in modifying one or more characteristics of the second version of the software to generate a modified second version of the software. In some implementations, the software includes an edge connector, and at least one of the tasks of the first set of tasks and at least one of the tasks of the second set of tasks includes allowing the edge building device to interact with one or more other edge building devices.

According to various implementations, method 2300 may allow for more accurate testing of new versions of the software (e.g., machine learning models and/or edge connectors). For example, it can be very difficult to effectively test all potential combinations of deployments in a lab setting given the nearly limitless number of variables, such as combinations and configurations of building equipment. Method 2300 allows, in some embodiments, for testing of the software in the actual environment in which the software will be deployed without adversely impacting the end user experience or performance until the software performance has been validated.

In some implementations, the first and/or second versions of the software may be configured to monitor and/or control sustainability performance of the building or a portion thereof, such as a room, floor, control loop or set of building equipment, etc. In some such implementations, the system may assess the performance of the second version of the software for monitoring and/or controlling the sustainability performance (e.g., carbon emissions), such as by generating a score indicating a performance of the second version of the software for monitoring and/or controlling the sustainability performance (e.g., carbon emissions). Responsive to the assessment indicating that the performance is below a particular level/threshold (e.g., determining that an accuracy with which the monitoring is correctly assessing the actual performance and/or the control is effectively controlling the performance is below a certain level), the second version may be rejected, modified, updated or further revised, prevented from being activated and used live to monitor and/or control on the device, and/or other actions may be taken, in various implementations. In some implementations, responsive to the assessment indicating that the performance is above a particular level/threshold, the system may activate the second version of the software (e.g., use the second version of the software for monitoring and/or controlling of the building equipment and other aspects of the building) and/or deactivate the first version.

Figure 24:
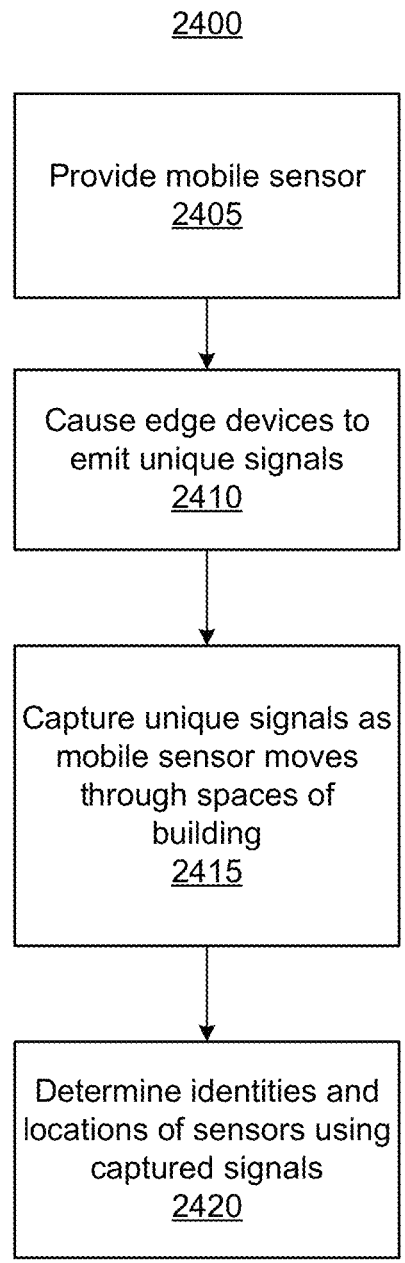
FIG. 24 is a flow diagram of a method for detection of edge building devices of a building.

FIG. 24 is a flow diagram of a method 2300 for detection of edge building devices of a building. In some embodiments, the method 2400 may be performed by one or more components of any of the foregoing systems and devices, including, but not limited, to components of the system 900 and/or the device 1000.

At 2405, a mobile sensor is provided. At 2410, the edge devices are caused to emit unique signals. At 2415, the unique signals are captured by the mobile sensor as the mobile sensor moves through the spaces of the building. At 2420, identities and locations of the edge devices are determined using the captured unique signals.

The plurality of unique signals include first characteristics indicating an identity of the edge building devices and second characteristics usable to determine locations of the plurality of edge building devices within the plurality of spaces. In some implementations, the plurality of unique signals include a plurality of predetermined sounds, and wherein the mobile sensor includes a microphone. In some implementations, the first characteristic includes at least one of a frequency, a wavelength, or a pattern of the predetermined sounds, and wherein the second characteristic includes an amplitude or intensity and a directionality of the predetermined sounds. For example, a first characteristic of the sound can be used to encode information that can be decoded to identify the particular device (e.g., a type of device, a model of device, etc.), and the second characteristic of the sounds can be used to identify a location (e.g., by determining a range from the mobile device to the edge device using the intensity of the sound and a direction to the edge device using the direction from which the sound is emitted). In some implementations, the plurality of unique signals include a plurality of patterns of lights, and wherein the mobile sensor includes a camera and/or other light sensor. In some implementations, the first characteristic includes at least one of a wavelength or particular patterns of the lights, and wherein the second characteristic includes an intensity and a directionality of the lights.

In some implementations, the mobile sensor includes a wearable device. In some implementations, the mobile sensor includes an automated mobile sensor. In some implementations, the mobile sensor includes or is coupled to a drone or robot vacuum. In some implementations, a particular pattern or set of instructions may be provided to control the automated mobile sensor to move through the building or portion thereof.

In some implementations, the plurality of unique signals encode one or more characteristics of the plurality of edge building devices, and wherein the method further including processing the plurality of unique signals to extract the encoded characteristics. In some implementations, the mobile sensor is configured to detect the plurality of unique signals using one or more physical and/or virtual device discovery mesh network planes separate from one or more control network planes used to control the plurality of edge building devices. In some implementations, the mobile sensor is configured to communicate with the edge building devices to detect the unique signals over a plurality of different protocols. In some implementations, receiving input from a user and determining the identities and locations of one or more of the plurality of edge building devices at least in part using the input.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A method for processing compute activities of a building management system of a building, the method comprising:
  receiving, by one or more processors, a selection from a user of a sustainability tuning level from among a plurality of sustainability tuning levels, the plurality of sustainability tuning levels representing different levels of weighting to be placed on mitigating a sustainability impact of computing workloads balanced against one or more other factors when processing the computing workloads, the sustainability impact associated with processing the computing workloads;

receiving, by the one or more processors, a computing workload to be processed by the building management system;

determining, by the one or more processors, an execution plan for processing the computing workload based at least in part on the selected sustainability tuning level, wherein determining the execution plan comprises determining a time to process the computing workload based at least in part on the sustainability impact by:

determining environmental conditions affecting the sustainability impact of processing the computing workload at a plurality of times; and selecting a first time from among the plurality of times responsive to predicting processing the computing workload at the first time will result in reduced carbon emissions as compared to processing the computing workload at a second time of the plurality of times based on the environmental conditions at the first time and the second time; and causing, by the one or more processors, the computing workload to be processed in accordance with the execution plan.

2. The method of claim 1, further comprising generating a graphical user interface comprising a scale or slider representing the plurality of sustainability tuning levels, wherein receiving the selection comprises receiving an indication of a selected position on the scale or slider.

3. The method of claim 1, wherein determining the execution plan comprises determining at least one of:
one or more devices to process the computing workload;
one or more locations at which to process the computing workload; or
whether to process the computing workload on one or more on-premises devices on one or more off-premises systems; or
one or more times at which to process the computing workload.

4. The method of claim 1, further comprising generating a graphical user interface comprising a plurality of recommendations for processing the computing workload corresponding to the plurality of sustainability tuning levels, wherein receiving the selection comprises receiving a selection of one of the plurality of recommendations.

5. The method of claim 1, wherein the one or more other factors comprise a computing performance for processing computing workloads.

6. The method of claim 5, wherein the computing performance comprises at least one of a latency, a frequency, an accuracy, a completeness, or a bandwidth impact of processing the computing workload.

7. The method of claim 1, further comprising partitioning, by the one or more processors, the computing workload into a plurality of logical processing blocks, the plurality of logical processing blocks comprising a first logical processing block and a second logical processing block, wherein determining a time for processing the computing workload comprises determining a first time for processing the first logical processing block and a second time for processing the second logical processing block based at least in part on the sustainability impact of processing the first logical processing block and the second logical processing block.

8. A system for processing compute activities of a building management system of a building, the system comprising:
one or more non-transitory computer-readable media storing instructions thereon that, when executed by one or more processors, cause the one or more processors to:
receive, by the one or more processors, a selection from a user of a sustainability tuning level from among a plurality of sustainability tuning levels, the plurality of sustainability tuning levels representing different levels of weighting to be placed on mitigating a sustainability impact of computing workloads balanced against one or more other factors when processing the computing workloads, the sustainability impact associated with processing the computing workloads;
receive, by the one or more processors, a computing workload to be processed by the building management system;
determine, by the one or more processors, an execution plan for processing the computing workload based at least in part on the selected sustainability tuning level by:
partitioning the computing workload into a plurality of logical processing blocks, the plurality of logical processing blocks comprising a first logical processing block and a second logical processing block; and
determining a time for processing the computing workload by determining a first time for processing the first logical processing block and a second time for processing the second logical processing block based at least in part on the sustainability impact of processing the first logical processing block and the second logical processing block; and
cause, by the one or more processors, the computing workload to be processed in accordance with the execution plan.

9. The system of claim 8, wherein the instructions further cause the one or more processors to generate a graphical user interface comprising a scale or slider representing the plurality of sustainability tuning levels, wherein receiving the selection comprises receiving an indication of a selected position on the scale or slider.

10. The system of claim 8, wherein determining the execution plan comprises determining at least one of:
one or more devices to process the computing workload;
one or more locations at which to process the computing workload; or
whether to process the computing workload on one or more on-premises devices on one or more off-premises systems; or
one or more times at which to process the computing workload.

11. The system of claim 8, wherein the instructions further cause the one or more processors to generate a graphical user interface comprising a plurality of recommendations for processing the computing workload corresponding to the plurality of sustainability tuning levels, wherein receiving the selection comprises receiving a selection of one of the plurality of recommendations.

12. The method system of claim 8, wherein the one or more other factors comprise a computing performance for processing computing workloads.

13. The method system of claim 12, wherein the computing performance comprises at least one of a latency, a frequency, an accuracy, a completeness, or a bandwidth impact of processing the computing workload.

14. One or more non-transitory computer-readable storage media storing instructions thereon that, when executed by one or more processors, cause the one or more processors to perform operations comprising:

receiving, by the one or more processors, a selection from a user of a sustainability tuning level from among a plurality of sustainability tuning levels, the plurality of sustainability tuning levels representing different levels of weighting to be placed on mitigating a sustainability impact of computing workloads balanced against one or more other factors when processing the computing workloads, the sustainability impact associated with processing the computing workloads;

receiving, by the one or more processors, a computing workload to be processed by a building system;

determining, by the one or more processors, an execution plan for processing the computing workload based at least in part on the selected sustainability tuning level, wherein determining the execution plan comprises:

(i) determining environmental conditions affecting the sustainability impact of processing the computing workload at a plurality of times and selecting a first time from among the plurality of times at which to process the computing workload responsive to predicting processing the computing workload at the first time will result in reduced carbon emissions as compared to processing the computing workload at a second time of the plurality of times based on the environmental conditions at the first time and the second time; or (ii) partitioning the computing workload into a plurality of logical processing blocks, the plurality of logical processing blocks comprising a first logical processing block and a second logical processing block, and determining a time for processing the computing workload by determining a first time for processing the first logical processing block and a second time for processing the second logical processing block based at least in part on the sustainability impact of processing the first logical processing block and the second logical processing block; and causing, by the one or more processors, the computing workload to be processed in accordance with the execution plan.

15. The one or more non-transitory computer-readable storage media of claim 14, wherein the instructions further cause the one or more processors to perform operations comprising generating a graphical user interface comprising a scale or slider representing the plurality of sustainability tuning levels, wherein receiving the selection comprises receiving an indication of a selected position on the scale or slider.

16. The one or more non-transitory computer-readable storage media of claim 14, wherein determining the execution plan comprises determining at least one of:

one or more devices to process the computing workload;

one or more locations at which to process the computing workload; or whether to process the computing workload on one or more on-premises devices on one or more off-premises systems; or one or more times at which to process the computing workload.

17. The one or more non-transitory computer-readable storage media of claim 14, wherein the instructions further cause the one or more processors to perform operations comprising generating a graphical user interface comprising a plurality of recommendations for processing the computing workload corresponding to the plurality of sustainability tuning levels, wherein receiving the selection comprises receiving a selection of one of the plurality of recommendations.

18. The one or more non-transitory computer-readable storage media of claim 14, wherein the one or more other factors comprise a computing performance for processing computing workloads.

19. The one or more non-transitory computer-readable storage media of claim 18, wherein the computing performance comprises at least one of a latency, a frequency, an accuracy, a completeness, or a bandwidth impact of processing the computing workload.

* * * * *